United States Patent
Little et al.

(10) Patent No.: US 11,308,490 B2
(45) Date of Patent: Apr. 19, 2022

(54) SECURITY SYSTEM AND METHOD THAT ALLOWS USERS TO SECURELY SETUP AND MAINTAIN SYSTEM SECURITY FOR ALL BUSINESS SYSTEMS

(75) Inventors: Brenda B. Little, Alpharetta, GA (US); Kirk H. Warren, Cumming, GA (US)

(73) Assignee: Cox Communications, Inc., Atlanta, GA (US)

( * ) Notice: Subject to any disclaimer, the term of this patent is extended or adjusted under 35 U.S.C. 154(b) by 268 days.

(21) Appl. No.: 12/845,086

(22) Filed: Jul. 28, 2010

(65) Prior Publication Data
US 2012/0030119 A1  Feb. 2, 2012

(51) Int. Cl.
*G06Q 20/40* (2012.01)
*G06F 21/60* (2013.01)

(52) U.S. Cl.
CPC .......... *G06Q 20/40* (2013.01); *G06F 21/604* (2013.01)

(58) Field of Classification Search
CPC .................................................. G06F 21/604
See application file for complete search history.

(56) References Cited

U.S. PATENT DOCUMENTS

| | | | | |
|---|---|---|---|---|
| 5,696,898 A * | 12/1997 | Baker | ................... | G06F 21/604 707/999.009 |
| 5,781,908 A * | 7/1998 | Williams | ............... | G06F 16/178 709/223 |
| 7,653,668 B1 * | 1/2010 | Shelat | ................... | G06F 16/184 707/610 |
| 7,739,239 B1 * | 6/2010 | Cormie | ............. | H04L 29/08135 707/626 |
| 7,765,229 B2 * | 7/2010 | Samji | ................... | G06F 16/192 707/770 |
| 7,860,827 B1 * | 12/2010 | Ayyad | ............... | G06F 17/30578 707/610 |
| 8,069,117 B1 * | 11/2011 | Gay | ....................... | G06Q 20/206 705/54 |
| 2003/0018719 A1 * | 1/2003 | Ruths | ........................ | G06F 9/52 709/205 |
| 2004/0078569 A1 * | 4/2004 | Hotti | ................... | G06F 21/6227 713/165 |
| 2004/0199540 A1 * | 10/2004 | Nojima | ......................... | 707/102 |
| 2005/0021713 A1 * | 1/2005 | Dugan | .................. | H04M 15/00 709/223 |
| 2006/0020581 A1 * | 1/2006 | Dettinger | ............... | G06F 21/604 |
| 2006/0080397 A1 * | 4/2006 | Chene | .................... | H04L 67/00 709/213 |

(Continued)

OTHER PUBLICATIONS

Saeed K. Rahimi, Frank S. Haug, Distributed Database Management Systems: A Practical Approach. First Published Jul. 19, 2010 (Year: 2010).*

(Continued)

*Primary Examiner* — Jacob C. Coppola
*Assistant Examiner* — Eduardo Castilho
(74) *Attorney, Agent, or Firm* — Merchant & Gould P.C.

(57) ABSTRACT

A system, method and computer-readable medium for providing comprehensive security to business systems by distributing the security for accessing the business systems across databases at a plurality of locations. The distributed security simplifies security maintenance and is used to control all aspects of a business. The generation of bills, pings converter boxes, schedules pay per view, etc. are handled by the distributed security.

42 Claims, 73 Drawing Sheets

(56) References Cited

U.S. PATENT DOCUMENTS

| | | | | |
|---|---|---|---|---|
| 2006/0190243 A1* | 8/2006 | Barkai | ............... | G06F 16/278 |
| | | | | 704/8 |
| 2006/0294578 A1* | 12/2006 | Burke | ............... | H04L 63/101 |
| | | | | 726/2 |
| 2007/0100834 A1* | 5/2007 | Landry | ............... | G06F 16/27 |
| 2009/0178109 A1* | 7/2009 | Nice et al. | ............... | 726/1 |
| 2010/0153346 A1* | 6/2010 | Thode | ............... | 707/690 |
| 2011/0277027 A1* | 11/2011 | Hayton et al. | ............... | 726/8 |

OTHER PUBLICATIONS

Kun Sun et al., "Securing MANET databases using metadata and context information," MILCOM 2008—2008 IEEE Military Communications Conference, 2008, pp. 1-6, doi: 10.1109/MILCOM.2008.4753194. (Year: 2008).*

Z. Yangqing, Y. Hui, L. Hua and Z. Lianming, "Design of a New Web Database Security Model," 2009 Second International Symposium on Electronic Commerce and Security, 2009, pp. 292-295, doi: 10.1109/ISECS.2009.180. (Year: 2009).*

Z. S. Zubi, "On distributed database security aspects," 2009 International Conference on Multimedia Computing and Systems, 2009, pp. 231-235, doi: 10.1109/MMCS.2009.5256696. (Year: 2009).*

\* cited by examiner

FUNCTIONS POSITIONER

```
10/30/02 15:56:23          COX SECURITY SYSTEM                        CSSLIB/CSS10SR
QPADEV0023   COUNT: 12        USER FUNCTIONS                          WS_SFC201
FILTERS:  *ALL    *ALL                                                GRN=SLU  RED=SLG
ENTER A FUNCTION, PRESS ENTER OR THE DESIRED FUNCTION KEY.            BLU=MLU  YLW=MLG
ENTER ACCESS CODE AND PRESS F10/F14 (AL=APPLY ALL).                   POS▮
1=SET-UP  3=COPY  4=DELETE  5=DSP ICOMS  6=PRINT  8=SEND CSS  18=CREATE PROFILE
                                                              --SYSTEM ACCESS--
OPT  PROFILE    AS/400    LOC  USER NAME (WHITE = CORP)          IC  SV  KR  ID  SC  SG
 M   AAACORP    ICOMSDEV  ALE  CORPORATE TEST PROFILE            Y               Y   Y
     AAAGRP     ICOMSDEV  ALE  CORP GROUP                        Y                   Y
 G   AAAGRP1    ICOMSDEV  ALE  TEST GROUP                        Y                   Y
 G   AAAGRP2    ICOMSDEV  ALE  TEST GROUP                        Y                   Y
 M   AAAGRP3    ICOMSDEV  ALE  ALE CABLE PRODUCTION TEST PROF    Y                   Y
     AAAGRP4    ICOMSDEV  ALE  TEST GROUP                        Y   Y   Y       Y   Y
     AAAPROD    ICOMSDEV  ALE  ALE CABLE PRODUCTION TEST PROF    Y       Y       Y   Y
 M   AAATEST2   ICOMSDEV  ALE  00000000000 PPPPPPPPPP            Y   Y   Y   Y   Y   Y
     AAAUUU     ICOMSDEV  ALE  KJB, KJB, UJB  B, B, UBUB         Y           Y   Y   Y
     AAA01      ICOMSDEV  ALE  TEST J. O' USER                   Y   Y   Y       Y   Y
     AAA03      ICOMSDEV  ALE  TEST J. O' USER                       Y           Y   Y
     AAA04      ICOMSDEV  ALE  ALE CABLE TEST J. O' USER         Y   Y   Y       Y   Y
                                                                                MORE...

F3=EXIT   F5=REFRESH  F8=SEND CSS  F10=MAINT   F12=CANCEL  F13=REPLICATE
F14=APPLY F15=FILTERS F16=PRINT    F18=JOB CTL F19=FOLD/UNFOLD F24=FILL SUBFILE
```

400 — F KEYS — BLANK LINE

Fig. 4

| 10/30/02  19:54:10 | | | COX SECURITY SYSTEM | | | CSSLIB/CSS12BR |
| QPADEV0023 | | | CREATE MLU USER PROFILES | | | WS_SFC001 |
| USER: AAATESTR | | ALE | TEST USER | | | AS/400 |
| OUTPUT QUEUE: QPRINT | | | LIBRARY: QGPL | ASSIGN POPLIB/CL?: N | | |

SELECT LOCATIONS AND PRESS F10 TO CREATE USER PROFILES.
THE AS/400 VALUE IS RED IF A PROFILE EXISTS.
1=SELECT
                                                                    OVERRIDES

| SEL | AS/400 | LOC | LOCATION NAME | TYPE | QUEUE | LIBRARY | POP |
|-----|--------|-----|---------------|------|-------|---------|-----|
| _ | ATLDEV | DEV | ATLANTA DEVELOPMENT | *PROD | ___ | ___ | _ |
| _ | | EUR | HUMBOLDT BAY | | | | |
| _ | CENTRAL | BTR | BATON ROUGE | *PROD | ___ | ___ | _ |
| _ | | GOK | GREATER OKLAHOMA | | | | |
| _ | | KAN | KANZAS | | | | |
| _ | | LOU | JEFFERSON PARISH | | | | |
| _ | | OMA | OMAHA | | | | |
| _ | | PEN | PENSACOLA | | | | |
| _ | | TUL | TULSA | | | | |
| _ | DATA1 | LAS | LAS VEGAS | *PROD | ___ | ___ | _ |
| _ | | ORC | ORANGE COUNTY | | | | |
| _ | | PAL | PALOS VERDES | | | | |
| _ | | PHX | PHOENIX | | | | |

More ___
F3=Exit    F4=Display OUTQ S    F5=Refresh    F10=Continue    F12=Return

10/30/02  19:58:24                  Cox Security System                CSSLIB/CSS150R
QPADEV0023                          Comment Maintenance                WS_SF0001

User Profile:    AAATEST2
User Name:       oooooooooo  pppppppp                                  Last Change
Production AS/400:  1COMSDEV Location: ALE                             CSSWRITER
Enter comments, press enter.                                           10-10-2002
                                                                       16:52:12

710
1  Hi there
2  _____
3  _____
4  _____
5  _____
6  _____
7  _____
8  _____
9  _____
10 _____
11 _____
12 _____
13 _____
14 _____
                                                                       More ......

720
F3=Exit       F5=Refresh      F12=Cancel      F21=QCMD      F23=Delete

Fig. 7

```
1000 ──┐
        ┌─────────────────────────────────────────────────────────────────────┐
        │ 10/30/02  15:18:58        Cox Security System           CSSLIB/CSS100R │
        │ QPADEV0023                    User Set-up                WS_100DA     │
        │                                                                       │
        │ Requester User Profile ......... CSSWRITER               ** ADD **   │
        │ Requester Type/Location ........ Corporate   PHX         _____    │
        │                                                                       │
        │ Enter group values. Press F10 to add or update the group.            │
1010 ──┤                                                                       │
        │ AS/400 User Profile ........... _____                            │
        │ Location Code ................. _____                            │
        │ Production AS/400 ............. DATA1                                 │
        │ Request Date .................. 10-30-2002          Mult Loc? (Y/N) N │
        │ First Name/Middle Initial ..... _____                Tech Bch? N │
        │ Last Name ..................... _____                            │
        │ AS/400 Output Queue/Library ... ____ *LIBL                           │
        │ Employee Type ................. _  E=Empl  M=Mgr/Sup/Mis  O=Other    │
        │ AS/400 Attention Key Program .. _____  Assign POPUPCL? (Y/N) N  │
        │ User Type ..................... _   P=Production  C=Corporate        │
        │ Equipment Type ................ __  GS=Green Screen  PC=PC/Rumba     │
1020 ──┤                                                                       │
        │                        System Access Codes                            │
        │ iCOMS  N   SpyView  N   Kronos  N   JDE  N   Showcase  N   SNDGRPMSG Y│
        │                                                                       │
        │ F3=Exit   F4=Prompt   F5=Refresh   F7=User Functions   F8=User   F10=Add │
        │ F12=Cancel                                                            │
        └─────────────────────────────────────────────────────────────────────┘
```

```
2/17/83  18:28:23                    Cox Security System                    CSSLIB/CSS100R
QPADEV0018                              User Set-up                         WS_100DA Requester User Profile .............. CSSWRITER                        Last Change
Requester Type/Location ............. Corporate    TUC                 CSSWRITER
                                                                       02-12-2003
                                                                       19.13.43

Enter group values. Press F10 to add or update the user.

AS/400 User Profile ................. TUCBRITE                   Created by : CSSWRITER
Location Code ....................... TUC    TUCSON
Production AS / 400 ................. DATA1                      Kronos Company: TUCS1
Request Date ........................ 02-12-2003
First Name/Middle Initial ........... Brian                       I    Tech Bch?  Y
Last Name ........................... Teets
AS/400 Output Queue/Library ......... ATLAPN1C        QGPL
Employee Type ....................... E  E=Empl        M=Mgr/Sup/MIS   O=Other
AS / 400 Attention Key Program ...... MDSKUSRCL                  Assign POPUPCL? [Y/N]  N
User Type ........................... P  P=Production  C=Corporate
Equipment Type ...................... PC  GS=Green Screen  PC=PC/Rumba
                                              System Access Codes ICOMS  Y   SpyView  N   Kronos  Y   JDE  N   Showcase  N   SNDGRPMSG  Y F3=Exit     F4=Prompt     F5=Refresh      F7=Functions     F9=Add      F10=Update    F12=Cancel
F14=System Access    F16=Create User Profile    F24=Comments
```

Fig. 13

```
12/04/00  10:53:29                      Cox Security System                          CSSLIB/CSS10SR
TELNETC040   Count 12                      User Functions                            WS_SFC001
Filters:   *ALL      *ALL       *ALL                                                 GRN=SLU  RED=SLG
Enter a function, press enter of the desired function key.                           BLU=MLU  YLW=MLG
Enter access code and press F10/F14 (AL=Apply All).                                  USER:_____
1=Set-Up  3=Copy  4=Delete  5=Dsp ICOMS  6=Print  10=Create Profile
                                                                              ..SYSTEM ACCESS..
Opt  Profile    AS/400   Loc   UserName                                       IC SV KR ID SC SG
___  G  *ALL    DATA2    CLE   Default    —   *ALL Group                      Y
___  G  *ALL    DATA2    CON   Default    —   *ALL Group                      Y
___  G  *ALL    DATA2    GAN   Default    —   *ALL Group                      Y
___  G  *ALL    DATA2    HRD   Default    —   *ALL Group                      Y
___  G  *ALL    DATA2    MAC   Default    —   *ALL Group                      Y
___  G  *ALL    DATA2    NCA   Default    —   *ALL Group                      Y
___  G  *ALL    DATA2    NVA   Default    —   *ALL Group                      Y
___  G  *ALL    DATA2    RHI   Default    —   *ALL Group                      Y
___  G  *ALL    DATA2    ROA   Default    —   *ALL Group                      Y
___  G  AAANOC  DATA2    ROA   NOC                                            Y
___  G  AAANOC2 DATA2    ROA   NOC                                            Y
___  M  AAA01   DATA1    EUR   Test J. O'User                                 Y
                                                                                       MORE ......
F3=Exit      F5=Refresh    F8=Send CSS    F10=Maint       F12=Cancel       F13=Replicate
F14=Apply    F15=Filters   F16=Print      F18=Job Control F19=Fold/Unfold
```

Fig. 14

```
12/04/00 10:53:29                    COX SECURITY SYSTEM                             CSSLIB/CSS10SR
TELNETG040   Count  12                   USER FUNCTIONS                              WS_SFO201
Filters:    *ALL      *ALL        *ALL                                               GRN=SLU  RED=SLG
Enter a function, press enter or the desired function key.                           BLU=MLU  YLW=MLG
Enter access code and press F10/F14 (AL=Apply All).                                  USER:_____
1=Set-Up  3=Copy  4=Delete  5=Dsp ICOMS  6=Print  18=Create Profile
                                                                        --SYSTEM ACCESS--
Opt  Profile   AS/400                Loc     User Name                 IC  SV  KR  ID  SC  SG
___  *ALL      DATA2                 CLE     DEFAULT - *ALL GROUP
 G             EMP  TYP  EQP  POP  KR  ATTN  KEY  MLU                 ------LAST CHANGE------
RE1  *OUTQ      O    P    **    N   *NONE    N    BBJAMIN                   01-14-2000          Y                 12:27:07
30.0
___  *NONE     DATA2                 CON     DEFAULT - *ALL GROUP
 G             EMP  TYP  EQP  POP  KR  ATTN  KEY  MLU                 ------LAST CHANGE------
RE1  *OUTQ      O    P    **    N   *NONE    N    BBJAMIN                   01-14-2000          Y                 12:27:12
45.0
___  *ALL      DATA2                 GAN     DEFAULT - *ALL GROUP
 G             EMP  TYP  EQP  POP  KR  ATTN  KEY  MLU                 ------LAST CHANGE------
RE1  *NONE      O    P    **    N   *NONE    N    BBJAMIN                   01-14-2000          Y                 12:27:19
30.0
___  *ALL      DATA2                 HRD     DEFAULT - *ALL GROUP
 G             EMP  TYP  EQP  POP  KR  ATTN  KEY  MLU                 ------LAST CHANGE------
RE1  *OUTQ      O    P    **    N   *NONE    N    BBJAMIN                   04-24-2000          Y                 17:33:31
45.0
                                                                                                      MORE...
F3=Exit        F5=Refresh       F8=Send CSS         F10=Maint          F12=Cancel       F13=Replicate
F14=Apply      F15=Filters      F16=Print           F18=Job Control                     F19=Fold/Unfold
```

Fig. 15

| 04/05/00 10:27:14 | | | Cox Security System | | | | CSSLIB/CSS105R300 |
| | | | User Functions | | | | WS_SFO001 |

TELNETB092
Filters:   *ALL       *ALL       *ALL                                    USER:_____
Enter a function and press enter or the appropriate function key.
Enter access code and press F10/F14 (AL=Apply All).
1=Set-Up  3=Copy  4=Delete  5=Dsp ICOMS  6=Print  18=Create Profile
R=Restore Saved  V=View Saved

| OPT | PROFILE | AS/400 | LOC | USER NAME | | --SYSTEM ACCESS-- | | | | | |
|-----|---------|--------|-----|-----------|------|---|----|----|----|----|----|
|     |         |        |     |           |      | IC | SV | KR | ID | SC | SG |
| G   | *ALL    | DATA1  | EUR | Default   | ---  | Y  | N  | N  | N  | N  | N  |
| G   | *ALL    | DATA1  | LAS | Default   | ---  | Y  | N  | N  | N  | N  | N  |
| G   | *ALL    | DATA1  | ORG | Default   | ---  | Y  | N  | N  | N  | N  | N  |
| G   | *ALL    | DATA1  | PAL | Default   | ---  | Y  | N  | N  | N  | N  | N  |
| G   | *ALL    | DATA1  | PHX | Default   | ---  | Y  | N  | N  | N  | N  | N  |
| G   | *ALL    | DATA1  | SAB | Default   | ---  | Y  | N  | N  | N  | N  | N  |
| G   | *ALL    | DATA1  | SAN | Default   | ---  | Y  | N  | N  | N  | N  | N  |
| G   | *ALL    | DATA1  | SIE | Default   | ---  | Y  | N  | N  | N  | N  | N  |
| G   | *ALL    | DATA1  | TUC | Default   | ---  | Y  | N  | N  | N  | N  | N  |
| G   | *ALL    | DATA1  | TUC | NOC       | *ALL Group | Y | N | N | Y | N | N |
| M   | AAANOC  | DATA1  | SAN | Test J. OUser | *ALL Group | Y | N | N | N | N | N |
| M   | AAA01   | DATA1  | LAS | LAS Cable Test J. OUser | *ALL Group | Y | N | N | N | N | Y |
| M   | AAA22   | DATA1  |     |           |      |    |    |    |    |    |    |

MORE...

F3=Exit        F5=Refresh      F8=Send CSS     F12=Cancel      F13=Replicate
F14=Apply      F15=Filters     F16=Print       F18=Job Control F19=Fold/Unfold
Last request was canceled by the user.

Fig. 18

```
4/05/00  10:51:30              Cox Security System                CSSLIB/CSS100R
TELNETB092                        User Set-up                     WS_100DA Requester User Profile .........  JACKSOR                         Last Change
Requester Type/Location .......           Corporate   ATL          KIRKW
                                                                   02-04-2000
Enter user values, press F10 to add or update the user.            06.01.05

AS/400 User Profile ...........  AAA222
Location Code .................  LAS    LAS VEGAS
Production AS/400 .............  DATA1
Request Date ..................  02-04-2000              Mult Loc? (Y/N)  N
First Name/Middle Initial .....  Test          J            Tech Bch?     N
Last Name .....................  OUser
AS/400 Output Queue/Library ...  QPRINT                QGPL
Employee Type .................  E   E=Empl   M=Mgr/Sup/MIS   O=Other
AS/400 Attention Key Program ..  HDSKUSRCL                  Assign POPUPCL? [Y/N]  N
User Type .....................  P   P=Production   C=Corporate
Equipment Type ................  PC  GS=Green Screen  PC=PC/Rumba
                                    System Access Codes ICOMS  Y   SpyView  N   Kronos  N   JOE  N   Showcase  N   SNDGRPMSG  Y F3=Exit    F4=Prompt    F5=Refresh       F7=Functions    F9=Add      F10=Update   F12=Cancel
F14=System Access                        F18=Create User Profile                  F24=Comments
```

```
10/30/02  21:48:04                    COX SECURITY SYSTEM                              CSSLIB/CSS110R472
QPADEV0023                              ICOMS SECURITY                                      WS_100DA
  USER TYPE:     PRODUCTION USER
  USER PROFILE:  AAAPROD        PROD AS/400 : ICOMSDEV                                  LAST CHANGE
  LOCATION:      ALE            ALEXANDRIA                                                CSSWRITER
  USER NAME:     ALE CABLE PRODUCTION TEST PROF                                           10-30-2002
                                                                                          11.13.57
                            ICOMS ACCESS
  CASH ENTRY ..............  N_ (Y/N)
  SECURITY TYPE ...........  P_ (P/N)      SIGN ON MENU ..........  *  MASTERC
  GROUP USER ..............  N_ (P/C/N)    GROUP ID ..............  *  ___
  ADJUSTMENT GROUP ........  *_            DEFAULT SITE ID .......  *  301

MENU OPTIONS
  USER / GROUP TO COPY ....  _____       RESTRICT EXCPTNS ......  *  NO
  SELECT MENU OPTIONS .....  Y_ (Y/N)

AUTHORIZED FUNCTIONS
  USER / GROUP TO COPY ....  * AAACORP     RESTRICT EXCPTNS ......  *  *YES
  SELECT FUNCTIONS ........  Y_ (Y/N)

F3=EXIT    F4=PROMPT      F5=REFRESH       F10=UPDATE      F12=CANCEL   F18=SITE CONTROL
  F20=MENU OPTIONS          F22=FUNCTIONS                                 F24=COMMENTS
```

```
2/08/99  08:55:11              COX SECURITY SYSTEM                      CSSLIB/CSS130R
TELNETA124                    SITE CONTROL MAINTENANCE                  WS_130DA
USER PROFILE:  JJJJJJ    PROD AS/400 : DATA2                            ADD
LOCATION:      CLE       CLEVELAND
USER NAME:     JACKI JACKSON
SITE ID:       609       CLEVELAND

MASTER MENU ACCESS . . . . . . . . . . . . . . . .  N  (Y/N)
ALLOW ACCESS TO BILL MSG? . . . . . . . . . . . .   N  (Y/N)  CMPY DIVN
                                                              *  ____  (BLANK = ALL)
PARAMETERS DEFINING USER'S GROUPING AREA.
LEAVING ANY PARAMETER BLANK WILL RESULT IN ALL BEING SELECTED.
COMPANY NUMBER . . . . . . . . . . . . . . . . . .  *  _____      FINANCIAL AREA
DIVISION NUMBER . . . . . . . . . . . . . . . . . . *  _____      REPORTING AREA
POOL  . . . . . . . . . . . . . . . . . . . . . . .                  OPERATIONS AREA

ENTER APPROPRIATE LEVEL CODE FOR EACH GROUPING CATEGORY.
ORDER ENTRY CASH CATEGORY . . . . . . . . . . . . . ____
DISPATCH/OPERATIONS CATEGORY . . . . . . . . . . .  ____
SUBSCRIBER REPORTING CATEGORY . . . . . . . . . . . ____
EQUIPMENT CATEGORY . . . . . . . . . . . . . . . .  ____           CODES F AND R ONLY

F3=EXIT     F4=PROMPT     F5=REFRESH     F10=ADD     F12=CANCEL     F24=COMMENTS
```

Fig. 25

```
7/13/00  10:00:10                COX SECURITY SYSTEM                        CSSLIB/CSS131R
TELNETA029                  MLU SITE SELECTION FOR MAINTENANCE                WS_SFC001

USER: AAA91  EXT TEST J. EXT USER

AS/400 FILTER:
SELECT SITES FOR MAINTENANCE, PRESS F10 TO CONTINUE.
1=SELECT  2=MASTERC 'Y'  3=MASTERC 'N'
                                                                          MASTERC
SEL   AS/400  LOC   LOCATION DESCRIPTION            SITE                  ACCESS?
      CENTRAL EXT   EAST TEXAS                      ID    DESCRIPTION
 _                                                  017   SULPHUR SPRIN
 _                                                  010   VICTORIA
 _                                                  022   MINERAL WELLS
 _                                                  023   LUFKIN
 _                                                  024   GAINESVILLE
 _                                                  026   TYLER
 _                                                  027   JACKSONVILLE
 _                                                  028   MT PLEASANT
 _                                                  029   NEW BOSTON
 _                                                  030   GEORGETOWN
 _    KAN     KANSAS                                500   KANZAS
 _                                                  502   OKLAHOMA (PEA
 _    LOU     JEFFERSON PARISH                      125   LOUISIANA
                                                                         MORE...

F3=EXIT   F5=REFRESH   F10=CONTINUE   F12=CANCEL   F13=REPLICATE OPTION
DOM OBJECT CBRSRE1ALE IN CSDDM USES REMOTE OBJECT ALEF1 / CBRSREL1.
```

Fig. 26

```
4/10/00  20:20:46                      COX SECURITY SYSTEM                              CSSLIB/CSS120R
TELNET0011                        ICOMS MENU OPTION SELECTION                         WS_SFC001     ICOMS
USER PROFILE:  AAA03              ATLDEV    CON                      GROUP ID: *NONE                LEVEL
USER NAME:     TEST    SLU                                           COPY FROM: *NONE                 3 0
SELECT OPTIONS AND PRESS F10 WHEN SELECTION IS COMPLETE.                       MENU NAME
                          FILTER: *ALL
1=SELECT                  SECURITY TYPE:   POSITIVE                   ------ RECORD ADDED ------
         MENU       MENU                                       REQUESTER    DATE        TIME
OPT  MENU NAME      OPT  DESCRIPTION
                         *** ICO300PGMS/CBF9REL1
  1  COLL01C         1   CREATE COLLECTION MASTER ENT          KIRKW       03-28-2000   08.25.57
 _   COLL01C         2   EDIT A/R CUT OFF AMTS AND BLC
 _   COLL01C         3   ASSIGN OPERATORS TO ACCOUNTS
 _   COLL01C         4   ATTACH SCHEMES TO ACCOUNTS
 _   COLL01C         5   COLLECTION ACCOUNTS MAINTENA
 _   COLL01C         6   DAILY COLLECTION EVENTS INQU
 _   COLL01C         7   OPERATOR CUSTOMER EVENTS
 _   COLL01C         8   ASSIGN PREFIELD WORK ORDERS
 _   COLL01C         9   CHECK-IN PREFIELD WORK ORDER
 _   COLL01C        10   PREFIELD WORK ORDER INQUIRY
 _   COLL01C        11   CREATE COLLECTION AGENCY TAP
                                                                                        MORE ......
F3=EXIT  F5=REFRESH    F10=UPDATE   F11=REL LEVEL    F12=CANCEL    F15=FILTER
F23=DELETE ALL         F24=COMMENTS
```

Fig. 27

```
2/17/03  11:18:01              COX SECURITY SYSTEM                    CSSLIB/CSS125R472
QPADEV0010  COUNT: 257      ICOMS FUNCTION SELECTION                  WS_SFC001         ICOMS
USER PROF: TUCBRTTE      DATA1:  TUC     GRP ID:  *ALL                AUTC101472        LEVEL
USER NAME: BRIAN T. TEETS                CPY FRM: *NONE                CSSDDM            4.72
SELECT OR REMOVE AUTHORIZED FUNCTIONS, PRESS F10 TO UPDATE.            FUNCTIONS
1=SELECT                       FILTER:  *ALL
SECURITY TYPE:  Positive                              ALLOW
OPT  FUNCTION      OPT  DESCRIPTION (RLRESTR)         ENTRY    1ST NUMERIC    2ND NUMERIC
_    BANK DRAFT 1  AA   METHOD OF PAYMENT
_    CASH/ADJ      AA   ADJ ENTRY & ADJS LIMITS
_    CASH/ADJ      AB   RESTRICT ADJUSTMENT CODES
_    CASH/ADJ      AD   BATCH DATE CHANGE
_    CASH/ADJ      AE   BATCH POSTING
_    CASH/ADJ      AF   BATCH ITEM CHANGES / DELETE
_    CASH/ADJ      AG   COUNTER CASH RCPT COMMENT
_    CASH/ADJ      AM   PPV ADJUSTMENT VERIFY
_    CASH/ADJ      CA   CREDIT APPLY
_    CASH/ADJ      LB   CLEAR LOCKBOX WORK FILE
_    CASH/ADJ      OV   MOP AUTHORIZATION OVR
_    CFM           AA   CFM FTP MAINTENANCE
                                                                              MORE.....
F3=EXIT   F5=REFRESH   F10=UPDATE   F12=CANCEL    F13=REPLICATE    F15=FILTER
F19=FOLD/UNFOLD        F22=SUPPL FUNCTIONS        F23=DELETE       F24=COMMENTS
```

```
2/17/03  11:22:28                    COX SECURITY SYSTEM              CSSLIB/CSS127R472
QPADEV0010  COUNT: 272             ICOMS ADJ CODE SELECTION           WS_SFC001  ICOMS
USER PROFILE: TUCBRTTE       DATA1    TUC                             CF29L41VC  LEVEL
USER NAME:    BRIAN T. TEETS                    GRP ID: *ALL          CSSDOM     4.72
SITE ID:      474  TUCSON – COX COMMUNICATIONS  CPY FRM: *NONE
SELECT ADJ CODES AND PRESS F10 WHEN SELECTION IS COMPLETE.            ADJ CD ____

1=SELECT       FILTER: *ALL
SECURITY TYPE: Positive                              ———————RECORD ADDED———————
OPT  ADJ CD  DESCRIPTION                   REQUESTER    DATE         TIME
 1    1      INSTALL REFUND-ON TIME GUARANT CSSWRITER    02-17-2003   11.22.06
 1    2      SERVICE CALL-ON TIME GUARANTEE CSSWRITER    02-17-2003   11.22.06
 1    3      WRONG DISCONNECT DATE          CSSWRITER    02-17-2003   11.22.06
 1    4      ADDTL OUTLET ADJUSTMENT        CSSWRITER    02-17-2003   11.22.06
 1    5      MONEY BACK GUARANTEE           CSSWRITER    02-17-2003   11.22.06
 1    6      WELCOME CERTIFICATE            CSSWRITER    02-17-2003   11.22.06
 1    7      COLLECTION AGENCY FEE          CSSWRITER    02-17-2003   11.22.06
 1    8      NSF CHECK – MANUAL             CSSWRITER    02-17-2003   11.22.06
 1    9      RETURN CHECK CHARGE            CSSWRITER    02-17-2003   11.22.06
 1   10      RETURN CHECK                   CSSWRITER    02-17-2003   11.22.06
                                                                      MORE......

F3=EXIT  F5=REFRESH  F10=UPDATE  F12=CANCEL  F15=FILTER  F23=DELETE
F24=COMMENTS
```

Fig. 33

```
8/12/99  06:54:34                  COX SECURITY SYSTEM                           CSSLIB/CSS126R
TELNETB020                       ICOMS CM FUNCTION SELECTION                     WS_SFC001
USER PROFILE: AAA01              DATA2    GAN                    GROUP ID.  *NONE
USER NAME:    JACKI JACKSON                                      COPY USER: *NONE
SELECT FUNCTIONS AND PRESS F10 WHEN SELECTION IS COMPLETE.                  FUNC
1=SELECT                         FILTER: *ALL                               _____
SECURITY TYPE: Positive
                                                     ------ RECORD ADDED ------
OPT  FUNC  CODE   DESCRIPTION                        REQUESTER    DATE    TIME
___  AC    25     A/R COMMENTS
___  AO    31     AOT CALLS TAKEN
___  BA    07     CUSTOMER BALANCING
___  CA    13     COUNTER CASH
___  CC    15     CUSTOMER COMMENTS
___  CF    12     CUSTOMER FLASHES
___  CH    19     ACCOUNT CHANGE ACTIVITY
___  CL    03     CUSTOMER LEDGER
___  CM    33     CUSTOMER MAINTENANCE
___  CN    60     CANCEL ORDER
___  CO    14     COLLECTIONS
___  CS    04     CUSTOMER SERVICES
                                                                              MORE ......
F3=EXIT      F5=REFRESH      F10=UPDATE      F12=CANCEL      F15=FILTER      F23=DELETE ALL
F24=COMMENTS
```

Fig. 34

```
12/19/00 13:51:12                  COX SECURITY SYSTEM                         CSSLIB/CSS129R
TELNETG107                      ICOMS APPLY/DELETE - MLU'S                     WS_SFC001

USER: AAA01    EUR TEST J. OUSER

AS/400 FILTER:_____
SELECT SITES, PRESS F10/F22 TO APPLY USER TO ICOMS.
1=SELECT    2=MASTERC "Y"     3=MASTERC "N"     4=DLT LOCN
                                                                    MASTERC
SEL  AS/400  LOC  LOCATION DESCRIPTION         SITE ID  DESCRIPTION  ACCESS?
 1   CENTRAL ALE  ALEXANDRIA                   301      ABBEVILLE      Y
 1                                             302      ALEXANDRIA     Y
                                               303      BASTROP        Y
                                               304      CROWLEY
                                               305      DERIDDER
                                               306      FRANKLIN
                                               307      JONESBORO
                                               308      LAFAYETTE
                                               309      MINDEN
                                               310      NEW IBERIA
                                               311      NATCHITOCHES
                                               313      RUSTON
                                                                       MORE......

F3=EXIT    F5=REFRESH    F10=APPLY/SUBMIT    F12=CANCEL    F13=REPLICATE  F15=RESET
F18=SITE CTL MAINT    F20=UPDATE CSSMULT   F22=APPLY VIA DOM   F23=DELETE
CSSMULT HAS BEEN RESET FOR THIS USER.
```

Fig. 37

```
4/05/00  22:05:10                    COX SECURITY SYSTEM                          CSSLIB/CSS10SR300
TELNETA185                              USER FUNCTIONS                                 WS_SFC001
FILTERS:    *ALL        *ALL        *ALL
ENTER A FUNCTION AND PRESS ENTER OR THE APPROPRIATE FUNCTION KEY.              USER:_____
ENTER ACCESS CODE AND PRESS F10/F14 (AL=APPLY ALL).

1=SET-UP   3=COPY   4=DELETE   5=DSP ICOMS   6=PRINT   18=CREATE PROFILE
R=RESTORE SAVED    V=VIEW SAVED
                                                             ----SYSTEM ACCESS----
OPT  PROFILE  AS/400  LOC  USER NAME                    IC  SV  KR  JD  SC  SG
___   *ALL    DATA2   CLE  DEFAULT - * ALL GROUP         Y   N   N   N   N   N
___   *ALL    DATA2   CON  DEFAULT - * ALL GROUP         Y   N   N   N   N   N
___   *ALL    DATA2   GAN  DEFAULT - * ALL GROUP         Y   N   N   N   N   N
___   *ALL    DATA2   HRD  DEFAULT - * ALL GROUP         Y   N   N   N   N   N
___   *ALL    DATA2   MAC  DEFAULT - * ALL GROUP         Y   N   N   N   N   N
___   *ALL    DATA2   NVA  DEFAULT - * ALL GROUP         Y   N   N   N   N   N
___   *ALL    DATA2   RHI  DEFAULT - * ALL GROUP         Y   N   N   N   N   N
___   *ALL    DATA2   ROA  DEFAULT - * ALL GROUP         Y   N   N   N   N   N
___   AAANOC  DATA2   ROA  NOC                           Y   N   N   N   N   N
___   AAA01   DATA2   CLE  TEST J OUSER                  Y   N   N   N   N   N
___   AAA04   ATLDEV  CON  TEST USER                     Y   N   N   N   N   N
_SV_  AAA04   DATA2   HRD  TEST SLU                      Y   N   N   N   N   N
                                                                        MORE......
F3=EXIT    F5=REFRESH    F8=SEND CSS    F10=MAINT    F12=CANCEL     F13=REPLICATE
F14=APPLY  F15=FILTERS   F16=PRINT      F18=JOB CONTROL             F19=FOLD/UNFOLD
ALL EDITS WERE PASSED. PRESS THE PROPER FUNCTION KEY TO CONTINUE.
```

Fig. 38

```
CSS107R                    SPYVIEW SUBSCRIBER LIST SELECTION              WS_SELECT
1/06/98        LOCN: SAN        SAN DIEGO                                 12:02:50
               USER: AAA01      PROGRAMMER ANALYST
SELECT DESIRED SUBSCRIBER LIST(S), PRESS F10 TO UPDATE.
1=SELECT
    SUBSCRIBER                                                   ACCESS
SEL LIST        DESCRIPTION                                      LEVEL
___ ACCT        ** NAME IS BLANK **                              A
___ CORPSTAFF   CORP STAFF -- ATLANTA/IRVINE                     A
___ SANDIEGO    ** NAME IS BLANK **                              B
___ SANDNORTH   ** NAME IS BLANK **                              B
                                                                 BOTTOM

ALL RECORDS ON FILE RSUBLIST ARE DELETED FOR THE USER, AND THE SELECTED LISTS ARE
ADDED BACK. SELECT ALL LISTS THE USER SHOULD HAVE ACCESS TO AND PRESS F10 TO
UPDATE. IF F10 IS PRESSED WITH NO SELECTIONS, THE USER WILL BE COMPLETELY REMOVED
FROM THE REPORT DISTRIBUTION SUBSCRIBER FILE.

F3=EXIT  F10=UPDATE  F12=CANCEL              POSITION TO: _____
```

Fig. 41

```
4/05/00  22:05:10                    COX SECURITY SYSTEM              CSSLIB/CSS10SR30
TELNETA16S                              USER FUNCTIONS                    WS_SFC001
  FILTERS:    *ALL         *ALL                       *ALL                  USER.
ENTER A FUNCTION AND PRESS ENTER OR THE APPROPRIATE FUNCTION KEY.
ENTER ACCESS CODE AND PRESS F10/F14 (AL=APPLY ALL).
 1=SET-UP   3=COPY   4=DELETE   5=DSP ICOMS   6=PRINT   18=CREATE PROFILE
 R=RESTORE SAVED     V=VIEW SAVED
                                                                -----SYSTEM ACCESS-----
OPT  PROFILE     AS/400    LOC   USER NAME                  IC SV KR JD SC SG
___  *ALL        DATA2     CLE   DEFAULT - * ALL GROUP      Y  N  N  N  N  N
_G_  *ALL        DATA2     CON   DEFAULT - * ALL GROUP      Y  N  N  N  N  N
_G_  *ALL        DATA2     GAN   DEFAULT - * ALL GROUP      Y  N  N  N  N  N
_G_  *ALL        DATA2     HRD   DEFAULT - * ALL GROUP      Y  N  N  N  N  N
_G_  *ALL        DATA2     MAC   DEFAULT - * ALL GROUP      Y  N  N  N  N  N
_G_  *ALL        DATA2     NVA   DEFAULT - * ALL GROUP      Y  N  N  N  N  N
_G_  *ALL        DATA2     RHI   DEFAULT - * ALL GROUP      Y  N  N  N  N  N
_G_  *ALL        DATA2     ROA   DEFAULT - * ALL GROUP      Y  N  N  N  N  N
_M_  AAANOC      DATA2     ROA   NOC                        Y  N  N  N  N  N
_M_  AAA01       DATA2     CLE   TEST J. O'USER             Y  N  N  N  N  N
_M_  AAA04       ATLDEV    CON   TEST USER                  Y  Y  Y  Y  N  N
_M_  AAA04       DATA2     HRD   TEST SLU                   Y  Y  Y  Y  N  Y
KR                                                                    MORE......
F3=EXIT     F5=REFRESH    F8=SEND CSS      F10=MAINT      F12=CANCEL    F13=REPLICATE
F14=APPLY   F15=FILTERS   F16=PRINT        F18=JOB CONTROL              F19=FOLD/UNFOLD
ALL EDITS WERE PASSED. PRESS THE PROPER FUNCTION KEY TO CONTINUE.
```

Fig. 42

```
                                                            CLK503-03
                                                            JACKSON

2/10/98         KRONOS TIMEKEEPERS -- SECURITY FILE MAINTENANCE
11:42:21

USER-ID: AAA01    NAME: RODNEY JACKSON

DIVISION CODES (AL=ALL): * AL __

ACCESS TO ALL DEPARTMENTS: Y (Y/N)   IF NO, ENTER SPECIFIC DEPARTMENTS:
  __ __ __ __             __ __ __ __ __ __ __ __
  __ __ __ __             __ __ __ __ __ __ __ __
  __ __ __ __             __ __ __ __ __ __ __ __

ACCESS TO ALL SUPERVISORS: Y (Y/N)   IF NO, ENTER SPECIFIC SUPERVISORS:
  __ __ __ __             __ __ __ __ __ __ __ __
  __ __ __ __             __ __ __ __ __ __ __ __

F4=WINDOW   F12=CANCEL
```

Fig. 46

```
JC100R                    JOB CONTROL MAINTENANCE                        JC100DA
10/30/02                        SELECT FILTERS                           11:40:08
LEAVE BLANK TO SELECT ALL FOR ALL ENTRIES EXCEPT STATUS.

FROM SUBMIT DATE/TIME ........  2012-02-04  00:00:00   BLANK DATES FOR
TO SUBMIT DATE/TIME ..........  2012-02-04  24:00:00   TODAY'S DATE
STATUS CODES .................  *ALL  ===>      *ALL = ALL CODES
REQUESTER ....................  _____  *RMT=S, R, C
USER PROFILE OR GENERIC* .....  _____      *INC=S, R, (OR *CRP)
LOCATION .....................  _____      L=LOCAL UPDATE
FROM AS/400 ..................  _____      D=DDM UPDATE
TO AS/400 ....................  _____      S=SEND $AUTO
FROM CONTROL NUMBER ..........         1        R=RESENT $AUTO
TO CONTROL NUMBER ............  999999999       C=COMPLETE $AUTO
                                                A=ARCHIVED
DESCRIPTION CONTAINS .........  _____ (CHAR STRING)

ENTER THE DESIRED FILTERS AND PRESS ENTER.

F3=EXIT       F4=PROMPT     F12=CANCEL    F15=JOB CTL MSGS
F20=ALL INCOMPLETE          F21=CMD ENTRY
```

Fig. 48

| 12/04/00 11:57:54 | | | JOB CONTROL MAINTENANCE | | | COXGPLJC100R |
| TELNETGO40 COUNT: 12 | | | JOB SELECTION | | | WS_SFO002 |
| CSS COX SECURITY SYSTEM | | | | | | GRN=SLU RED=SLG |
| STATUS CODES: *ALL | | | | | | BLU=MLU YLW=MLG |

SELECT OPTIONS AND PRESS ENTER WHEN SELECTION IS COMPLETE.
1=RESEND 4=DELETE 6=$AUTO MSGS 7=REQUESTER MSGS C=FLAG COMPLETE

| OPT | S | REQUESTER | CONTROL # | DESCRIPTION | USER PROFL | LOC | FROM | TO |
|-----|---|-----------|-----------|-------------|------------|-----|------|----|
|     |   | ISSUE PGM | ===SUBMIT DATE=== | ===RESENT DATE=== | ===COMPLETE DATE=== | | | |
| _   | L | MACJADPO  | 140089 | UPDATE ADJ CODES    | MACCSGRP  | MAC | DATA2 | |
| _   | L | MACJADPO  | 140090 | UPDATE FUNCTIONS    | MACCSGRP  | MAC | DATA2 | |
| _   | L | MACJADPO  | 140091 | UPDATE ICOMS        | MACCSGRP  | MAC | DATA2 | |
| _   | L | MACJADPO  | 140092 | APPLY ICOMS         | MACCSGRP  | MAC | DATA2 | |
| _   | L | NVAJACPE  | 140093 | UPDATE CSS USER     | NVAISCSO  | NVA | DATA2 | |
| _   | L | NVAJACPE  | 140094 | CREATE USER PROFILE | NVAISCSO  | NVA | DATA2 | |
| _   | L | MACJADPO  | 140095 | UPDATE FUNCTIONS    | MACCSGRP  | MAC | DATA2 | |
| _   | L | MACJADPO  | 140096 | UPDATE FUNCTIONS    | MACCSGRP  | MAC | DATA2 | |
| _   | L | MACJADPO  | 140097 | UPDATE ICOMS        | MACCSGRP  | MAC | DATA2 | |
| _   | L | MACJADPO  | 140098 | APPLY ICOMS         | MACCSGRP  | MAC | DATA2 | |
| _   | L | MACJADPO  | 140099 | UPDATE FUNCTIONS    | MACCSGRP  | MAC | DATA2 | |
| _   | L | MACJADPO  | 140100 | UPDATE FUNCTIONS    | MACCSGRP  | MAC | DATA2 | |

MORE......

F3=EXIT  F5=REFRESH  F8=JOB SEQ  F12=CANCEL  F13=REPLICATE OPT  F14=SHOW DATE
F15=FILTERS  F16=PRINT  F19=FOLD/UNFOLD  F23=ARCHIVE COMPLETED  F24=PARM TOGGLE

Fig. 49

| | | | | | | COXGPLJC100R |
|---|---|---|---|---|---|---|
12/04/00 12:01:02 | | JOB CONTROL MAINTENANCE | | | | |
TELNETGO40 | | JOB SELECTION | | | | WS_SFC003 |
CSS      COX SECURITY SYSTEM | | | | | | |
STATUS CODES: *ALL | | | | | | JOB CTL # |
SELECT OPTIONS AND PRESS ENTER WHEN SELECTION IS COMPLETE. | | | | | | |
1=RESEND  4=DELETE | | | | | | |

| OPT | S T | CONTROL # ISSUE PGM | REQUESTER ===SUBMIT DATE==== | DESCRIPTION ===RESENT DATE==== | USER PROFL DATE==== | LOC ===COMPLETE DATE==== | FROM | TO |
|---|---|---|---|---|---|---|---|---|
| __ | L | 500 | MACJADPO | APPLY CABLEMASTER | | MAC | DATA2 | |
| __ | L | 502 | PENMRHA | APPLY CABLEMASTER | | PEN | DATA2 | |
| __ | L | 503 | LOUREOMWE | CREATE USER PROFILE | | LOU | DATA2 | |
| __ | L | 504 | MACJADPO | CREATE USER PROFILE | | MAC | DATA2 | |
| __ | L | 505 | MACJADPO | APPLY CABLEMASTER | | MAC | DATA2 | |
| __ | L | 506 | LOUREOMWE | DELETE CSS | | LOU | DATA2 | |
| __ | L | 507 | LOUREOMWE | DELETE CABLEMASTER | | LOU | DATA2 | |
| __ | L | 508 | LOUREOMWE | DELETE USER PROFILE | | LOU | DATA2 | |
| __ | L | 509 | LOUREOMWE | CREATE USER PROFILE | | LOU | DATA2 | |
| __ | L | 590 | MACJADPO | APPLY CABLEMASTER | | MAC | DATA2 | |
| __ | L | 591 | MACJADPO | APPLY CABLEMASTER | | MAC | DATA2 | |
| __ | L | 592 | MACJADPO | APPLY CABLEMASTER | | MAC | DATA2 | |

MORE .....

F3=EXIT   F5=REFRESH   F8=REQ SEQ   F12=CANCEL   F13=REPLICATE OPT   F14=SHOW DATE
F16=PRINT   F19=FOLD/UNFOLD   F23=ARCHIVE COMPLETED   F24=PARAMETER TOGGLE

Fig. 50

```
10/28/02  19:18:36                                                CSSLIB/CSS121R
QPADEV0066                COX SECURITY SYSTEM                     WS_SFC003
COL01C               MASS MENU ADD GROUP SELECTION                GROUP
LOCATION  ALE    ALEXANDRIA      ALL OPTIONS                      _____
SELECT GROUPS AND PRESS F10 TO ADD ALL OPTIONS FOR THIS MENU
1=SELECT
             PRODUCTION
OPT  GROUP   AS/400    LOC    GROUP NAME
     AAAGRP  ICOMSDEV  ALE    CORP GROUP
___  AAAGRP1 ICOMSDEV  ALE    TEST GROUP
___  AAAGRP2 ICOMSDEV  ALE    TEST GROUP
___  AAAGRP4 ICOMSDEV  ALE    TEST GROUP

BOTTOM
F3=EXIT  F5=REFRESH  F10=ADD TO GROUP  F12=CANCEL  F16=PRINT  F18=SELECT ALL
```

Fig. 53

```
10/28/02  20:44:04                    COX SECURITY SYSTEM                        CSSLIB/CSS121R
QPADEV0066                      MASS MENU OPTION ADD GROUP SELECTION             WS_SFC003
COLL01C            5       COLLECTION ACCOUNTS MAINTENANCE                       GROUP
LOCATION:   ALE        ALEXANDRIA
SELECT GROUPS AND PRESS F10 TO ADD THE MENU OPTION.
1=SELECT
                   PRODUCTION
OPT  GROUP    AS/400     LOC   GROUP NAME
     AAAGRP   ICOMSDEV   ALE   CORP GROUP
___  AAAGRP1  ICOMSDEV   ALE   TEST GROUP
___  AAAGRP2  ICOMSDEV   ALE   TEST GROUP
___  AAAGRP4  ICOMSDEV   ALE   TEST GROUP
                                                                                 BOTTOM
F3=EXIT  F5=REFRESH  F10=ADD TO GROUP  F12=CANCEL  F16=PRINT  F18=SELECT ALL
```

Fig. 57

```
10/28/02  21:04:02                    COX SECURITY SYSTEM                    CSSUB/CSS122R
QPADEV0066                          MASS FUNCTION ADD/DELETE                 WS_SFC001
                                                                             FUNC POSN

SELECT A FUNCTION AND PRESS ENTER TO SELECT USERS OR GROUPS.
 1=ADD OPTION   4=DELETE OPTION   7=ADD FUNCTION   9=DELETE FUNCTION
                                                      ALLOW
OPT  FUNCTION   OPT  DESCRIPTION                      ENTRY    1ST NUMERIC   2ND NUMERIC
___  CASH/ADJ   OV   MOP AUTHORIZATION OVR             Y
CHAR VALUE: ▓
            TYPE Y/N OR TO ALLOW/RESTRICT USING OVERRIDE FIELD WHEN AUTHORIZING
            AN MOP PAYMENT. TYPE THE 3-CHARACTER OVERRIDE CODE IN THE FIRST 3
            POSITIONS OF THE CHARACTER FIELD.

___  CFM        AA   CFM FTP MAINTENANCE               Y
CHAR VALUE:
            TYPE Y/N TO ALLOW/RESTRICT THE USE OF ADD, CHANGE AND DELETE WITHIN CFM
            FTP MAINTENANCE.
                                                                              MORE...

F3=EXIT  F5=REFRESH  F12=CANCEL  F19=FOLD/UNFOLD
THE HIGHLIGHTED ENTRY IS REQUIRED. PLEASE ENTER THE APPROPRIATE VALUE.
```

Fig 61

```
10/28/02  19:18:36                COX SECURITY SYSTEM                    CSSLIB/CSS121R
QPADEV0066                    MASS MENU ADD GROUP SELECTION              WS_SFO003
COLL01C       ALL OPTIONS                                                GROUP
LOCATION:  ALE   ALEXANDRIA
SELECT GROUPS AND PRESS F10 TO ADD ALL OPTIONS FOR THIS MENU.
1=SELECT
           PRODUCTION
OPT  GROUP    AS/400     LOC   GROUP NAME
     AAAGRP   ICOMSDEV   ALE   CORP GROUP
___  AAAGRP1  ICOMSDEV   ALE   TEST GROUP
___  AAAGRP2  ICOMSDEV   ALE   TEST GROUP
___  AAAGRP4  ICOMSDEV   ALE   TEST GROUP
                                                                           BOTTOM
F3=EXIT  F5=REFRESH  F10=ADD TO GROUP  F12=CANCEL  F16=PRINT  F18=SELECT ALL
```

Fig. 63

```
10/28/02  21:30:54              COX SECURITY SYSTEM                    CSSLIB/CSS122R
QPADEV0066                   MASS AUTH OPT GROUP SELECTION             WS_SFC003
COLLCODES    AA     COLLECTION ACTIVITY CODES                          GROUP
LOCATION:    ALE    ALEXANDRIA
SELECT GROUPS AND PRESS F10 TO ADD AUTHORIZED OPTION
1=SELECT
              PRODUCTION
OPT   GROUP    AS/400     LOC    GROUP NAME
      AAAGRP   ICOMSDEV   ALE    CORP GROUP
___   AAAGRP1  ICOMSDEV   ALE    TEST GROUP
___   AAAGRP2  ICOMSDEV   ALE    TEST GROUP
___   AAAGRP4  ICOMSDEV   ALE    TEST GROUP
                                                                          BOTTOM
F3=EXIT  F5=REFRESH  F10=ADD TO GROUP  F12=CANCEL  F16=PRINT  F18=SELECT ALL
```

Fig. 67

```
8/18/99  14:42:27                    COX SECURITY SYSTEM                      CSSLIB/CSS122R300
TELNET0002                        MASS FUNCTION ADD/DELETE                    WS_SFC001
                                                                              FUNCTION
SELECT A FUNCTION AND PRESS ENTER TO SELECT USERS OR GROUPS.                  _____
1=ADD OPTION    4=DELETE OPTION    7=ADD FUNCTION    9=DELETE FUNCTION
                                          ALLOW
OPT  FUNCTION     OPT  DESCRIPTION        ENTRY    1ST NUMERIC    2ND NUMERIC
__   CASH / ADJ   AH   PPV ADJUSTMENT VERIFY  Y
      CHAR VALUE: _
        TYPE Y/N TO ALLOW/RESTRICT PPV CREDIT ADJUSTMENT OVERRIDE.
  1  CASH / ADJ   OV   CREDIT CARD AUTMO OVERIDE   Y
      CHAR VALUE: 123
        TYPE Y/N OR TO ALLOW/RESTRICT USING OVERRIDE FIELD WHEN AUTHORIZING
        A CREDIT CARD PAYMENT. TYPE THE 3-CHARACTER OVERRIDE CODE IN THE FIRST 3
        POSITIONS OF THE CHARACTER FIELD.
                                                                     MORE......
F3=EXIT     F5=REFRESH     F12=CANCEL     F19=FOLD/UNFOLD
THE HIGHLIGHTED ENTRY IS REQUIRED. PLEASE ENTER THE APPROPRIATE VALUE.
```

Fig. 69

```
8/16/99  14:54:39                    COX SECURITY SYSTEM                        CSSLIBCSS122R300
TELNET0002                        MASS FUNCTION ADD/DELETE                      WS_SFC001
                                                                                FUNCTION

SELECT A FUNCTION AND PRESS ENTER TO SELECT USERS OR GROUPS.
1=ADD OPTION    4=DELETE OPTION    7=ADD FUNCTION    9=DELETE FUNCTION

ALLOW
OPT  FUNCTION   OPT  DESCRIPTION                      ENTRY    1ST NUMERIC   2ND NUMERIC
_    CASH/ADJ   AH   PPV ADJUSTMENT VERIFY              Y
CHAR VALUE: _
     TYPE Y /N TO ALLOW/RESTRICT PPV CREDIT ADJUSTMENT OVERRIDE.

1_   CASH/ADJ   OV   CREDIT CARD AUTHO OVERIDE          Y
CHAR VALUE: 123456
     TYPE Y/N OR TO ALLOW/RESTRICT USING OVERRIDE FIELD WHEN AUTHORIZING
     A CREDIT CARD PAYMENT. TYPE THE 3-CHARACTER OVERRIDE CODE IN THE FIRST 3
     POSITIONS OF THE CHARACTER FIELD.
                                                                              MORE...

F3=EXIT   F5=REFRESH    F12=CANCEL    F19=FOLD/UNFOLD
THE HIGHLIGHTED ENTRY IS REQUIRED. PLEASE ENTER THE APPROPRIATE VALUE.
```

```
8/16/99 15:00:21           COX SECURITY SYSTEM              CSSLIB/CSS122R300
TELNETG002           MASS AUTH OPT ADD USER SELECTION       WS.SFO002
CASH/ADJ       OV   CREDIT CARD AUTHO OVERIDE               USER PROFILE
LOCATION:      DEV  ATLANTA DEVELOPMENT                     _____
SELECT USERS AND PRESS F10 TO ADD THE AUTHORIZED OPTION.
1=SELECT                  FILTER : GROUP AND USER ASSIGNED
                                                       CHAR /
   USER         PRODUCTION                             ENTRY GROUP ID
OPT PROFILE   AS/400    LOC   USER NAME
    AAA01     ATLDEV    DEV   TEST J. O'USER           12*V
    AAA50     ATLDEV    DEV   TEST J. O'USER           12*V
                                                       BOTTOM
F3=EXIT  F5=REFRESH  F10=ADD TO USER  F12=CANCEL  F15=FILTER  F16=PRINT
F18=SELECT ALL  F19=FOLD/UNFOLD
```

```
CSS121R              SELECTION FILTER                WS_121DG

ENTER SELECTION FILTER........ 1_
  1 = SHOW BOTH USER AND GROUP
  2 = USER ASSIGNED ONLY
  3 = GROUP ASSIGNED ONLY

F12=CANCEL
```

7300, 7310

SECURITY SYSTEM AND METHOD THAT ALLOWS USERS TO SECURELY SETUP AND MAINTAIN SYSTEM SECURITY FOR ALL BUSINESS SYSTEMS

FIELD OF THE INVENTION

The present invention relates to systems, methods, and computer-readable media of a comprehensive security system, and more particularly to systems, methods, and computer-readable media that enables employees to securely setup and maintaining system security for all business systems.

BACKGROUND OF THE INVENTION

Businesses rely on many systems to run their operations. For example, most businesses run an accounting system that maintains the financial records of the business. Timekeeping and billing systems enable businesses to track employee work hours and to justify invoices provided to their customers. Many businesses also rely on asset management systems, inventory systems, payroll systems, etc. Still further, some types of business need complicated project management, system maintenance and customer communication systems.

While all of these tools enable a complex business to operate smoothly, one problem associated with such a vast array of systems is authentication and access control. Often an employee will have to logon and logout of several systems to accomplish all of the tasks involved in their job responsibilities. However, the systems are often provided by different vendors and manufacturers. Thus, using the systems becomes cumbersome to manage as well as use.

Accordingly, it can be seen that businesses need a way to enable authorized employees to setup and maintain systems involved in a business in a secure manner.

SUMMARY OF THE INVENTION

Embodiments of the present invention address these issues by providing methods, computer-readable media, and systems for distributing the security for accessing the business systems across databases while simplifying security maintenance.

According to one embodiment of the present invention, a method for securing business systems accessed by a plurality of users over a plurality of locations is disclosed. The method includes providing a user interface on a display device for entering data for authenticating and authorizing a user associated with the data, providing security across a plurality of business modules distributed over a plurality of locations using a distributed security platform by processing the data entered by the user to determine rights related to the user associated with the entered data, upon determining rights related to the user associated with the entered data, providing the user access and control to the business modules according to the determined rights, controlling communication between the plurality of business modules distributed over the plurality of locations by the distributed security platform using an Internet Protocol and distributed data management (DDM) files on databases distributed over the plurality of locations and ensuring data integrity by the distributed security platform despite concurrent user accesses and faults.

In another embodiment, a computer-readable medium includes computer-executable instructions stored thereon for implementing a system for securing business systems accessed by a plurality of users over a plurality of locations. The computer-executable instructions, when executed by a computer, cause the computer to provide a user interface on a display device for entering data for authenticating and authorizing a user associated with the data, provide security across a plurality of business modules distributed over a plurality of locations using a distributed security platform, the distributed security platform processing the data entered by the user to determine rights related to the user associated with the entered data, upon determining rights related to the user associated with the entered data, provide the user access and control to the business modules according to the determined rights, control communication between the plurality of business modules distributed over the plurality of locations by the distributed security platform using an Internet Protocol and distributed data management (DDM) files on databases distributed over the plurality of locations and ensure data integrity by the distributed security platform despite concurrent user accesses and faults.

In another embodiment, a distributed security system includes memory configured to store information for implementing the distributed security system and a processor, coupled to the memory, the processor providing a user interface on a display device for entering data for authenticating and authorizing a user associated with the data, providing security across a plurality of business modules distributed over a plurality of locations using a distributed security platform, the distributed security platform processing the data entered by the user to determine rights related to the user associated with the entered data, upon determining rights related to the user associated with the entered data, providing the user access and control to the business modules according to the determined rights, controlling communication between the plurality of business modules distributed over the plurality of locations by the distributed security platform using an Internet Protocol and distributed data management (DDM) files on databases distributed over the plurality of locations and ensuring data integrity by the distributed security platform despite concurrent user accesses and faults.

These and other features and advantages, which characterize the present invention, will be apparent from a reading of the following detailed description and a review of the associated drawings. It is to be understood that both foregoing general description and the following detailed description are exemplary and explanatory only and are not restrictive of the invention, as claimed.

BRIEF DESCRIPTION OF THE DRAWINGS

Referring now to the drawings in which like reference numbers represent corresponding parts throughout:

FIG. 4 shows the User Function screen according to one embodiment;

FIG. 5 shows the CCS Create MLU User Profiles screen according to one embodiment;

FIG. 7 shows the CSS Comment Maintenance screen according to one embodiment;

FIG. 10 shows the User Set-Up screen according to one embodiment;

FIG. 11 shows the User Functions screen according to one embodiment;

FIG. 13 shows the User Set-Up screen exhibiting a Kronos company according to one embodiment;

FIG. 14 shows the User Functions screen according to one embodiment;

FIG. 15 shows the User Functions screen exhibiting the Fold/Unfold function key option according to one embodiment;

FIG. 18 shows the User Functions screen according to one embodiment;

FIG. 19 shows the User Set-up screen for AAA22 in Las Vegas according to one embodiment;

FIG. 22 shows the User Functions screen exhibiting the print option 6 according to one embodiment;

FIG. 24 shows the CSS ICOMS Security screen according to one embodiment;

FIG. 25 shows the Site Control Maintenance screen according to one embodiment;

FIG. 26 shows the MLU Site Selection for Maintenance according to one embodiment;

FIG. 27 shows the ICOMS Menu Option Selection according to one embodiment;

FIG. 30 shows the ICOMS Function Selection screen according to one embodiment;

FIG. 31 shows the ICOMS Function Selection screen from an unfolded information view according to one embodiment;

FIG. 33 shows the ICOMS Adj Code Selection screen according to one embodiment;

FIG. 34 shows the ICOMS CM Function Selection screen according to one embodiment;

FIG. 37 shows the ICOMS Apply/Delete-MLUs screen according to one embodiment;

FIG. 38 shows the CSS User Function screen according to one embodiment;

FIG. 41 shows the SpyView Subscriber List Selection screen according to one embodiment;

FIG. 42 shows the CSS User Function screen according to one embodiment;

FIG. 46 shows the Kronos Timekeeper/AS-Security File Maintenance screen according to one embodiment;

FIG. 48 shows the Job Control Maintenance Select Filters screen according to one embodiment;

FIG. 49 shows the Job Control Maintenance/Job Selection screen according to one embodiment;

FIG. 50 shows the Job Control Maintenance/Job Selection screen according to one embodiment;

FIG. 53 shows the Mass Menu ADD Group Selection screen according to one embodiment;

FIG. 57 shows the Mass Menu Option ADD Group Selection screen according to one embodiment;

FIG. 61 shows the Mass Function Option Add/Delete screen 6100 according to one embodiment;

FIG. 63 shows the Mass Function ADD Group Selection screen according to one embodiment;

FIG. 67 shows the Mass Auth Opt ADD Group Selection screen according to one embodiment;

FIG. 69 shows the Mass Function Add/Delete screen according to one embodiment with an override code of three values added to a function;

FIG. 71 shows the Mass Function Add/Delete screen according to one embodiment;

FIG. 72 shows the Mass Auth Opt ADD User Selection screen with the override code of more than three values displayed;

FIG. 73 shows the Selection Filter screen according to one embodiment; and

DETAILED DESCRIPTION OF THE PREFERRED EMBODIMENT

Embodiments of the present invention are directed to a security management system that provides comprehensive security to business systems by distributing the security for accessing the business systems across databases and that simplifies security maintenance. The security management system is used to control all aspects of a business. The security management system handles the generation of bills, pings converter boxes, schedules pay per view, etc. Employees may log in to the security management system and the management system gives them their permissions to go into the billing module. Dispatchers that need to do execute their tasks also need permissions, which are also granted through the security management system.

Figure 1:
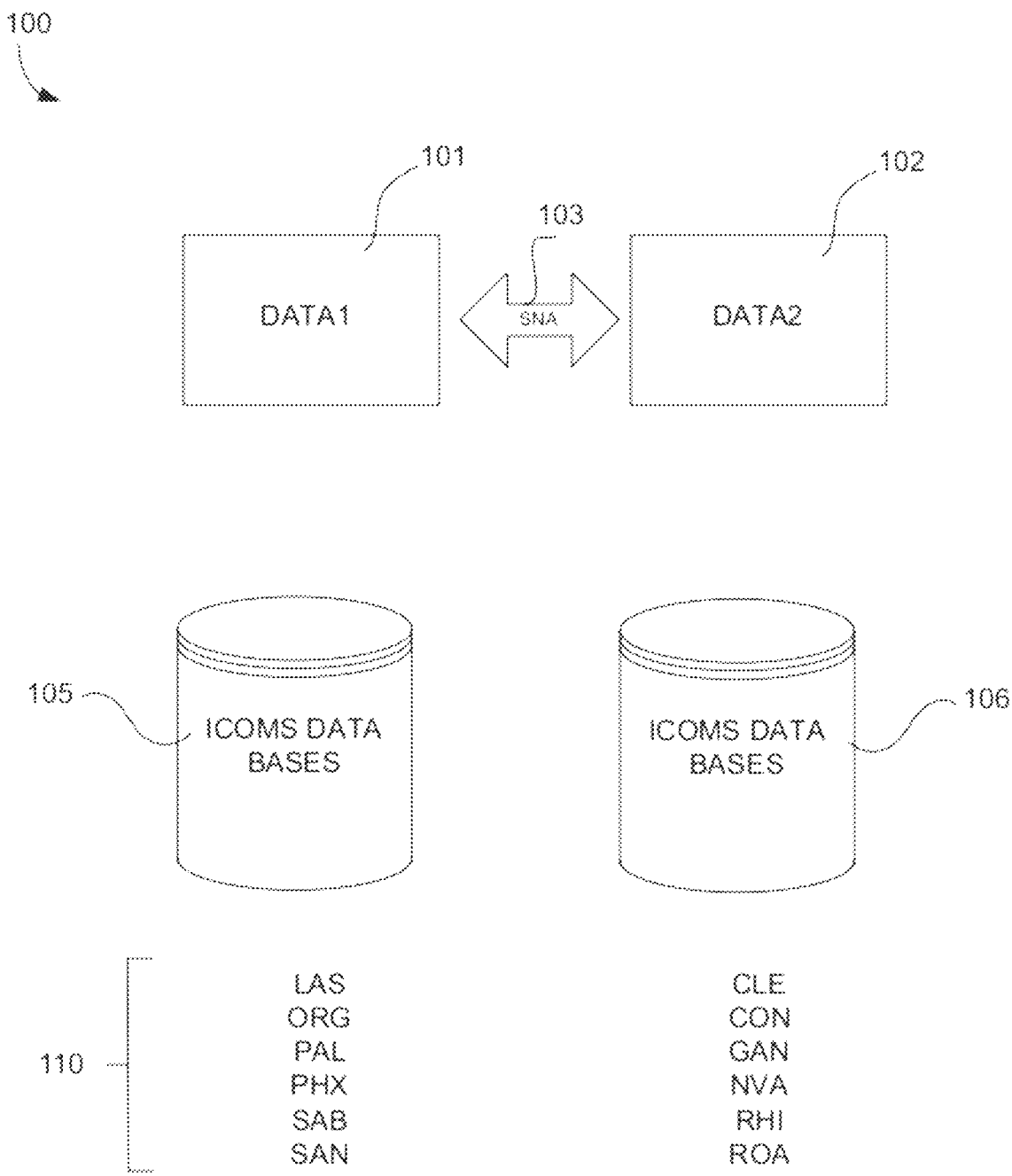
FIG. 1 shows the functioning of a typical business data system.

FIG. 1 shows a business data system 100. In FIG. 1, DATA1 101 and DATA2 102 communicate using the SNA (System Network Architecture) protocol 103. DATA1 101 is used for a first location and DATA2 102 is used for a second location. Business data is maintained in ICOMS databases 105, 106 for each of the locations 101, 102. The offices 110 supported by each of the databases are listed below each machine.

Figure 2:
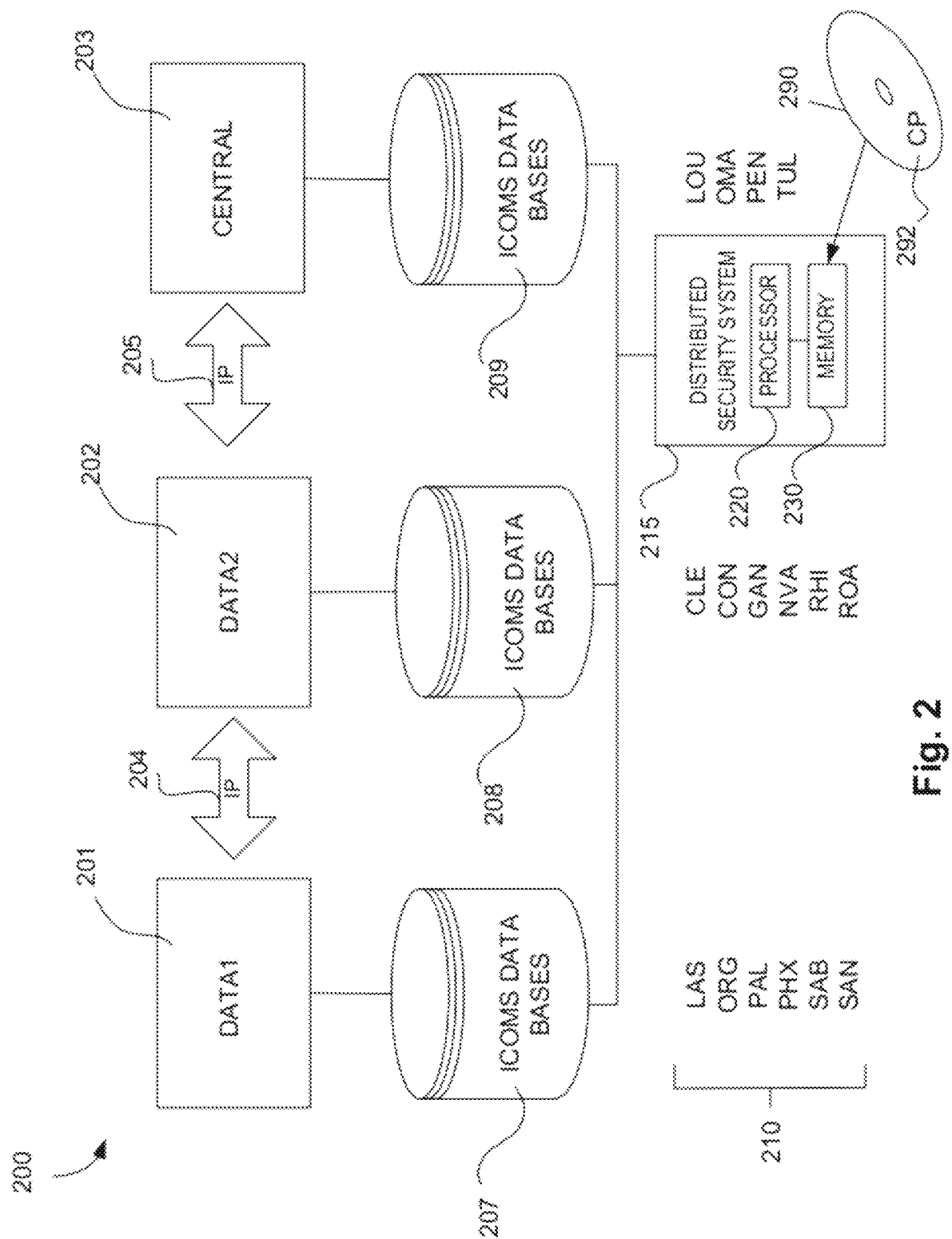
FIG. 2 shows a business data system having a security arrangement according to one embodiment.

FIG. 2 shows a business data system 200 with a security arrangement according to one embodiment. In FIG. 2, DATA1 201, DATA2 202, and CENTRAL 203 communicate using an IP (Internet Protocol) signaling method 204, 205. DATA1 201 is used for a first set of locations, DATA2 202 for the second set of locations, and CENTRAL 203 for those locations on central time. Business data is maintained in ICOMS databases 207, 208, 209 for each of the locations 201, 202, 203, respectively.

The locations 210 listed below each machine on the diagram are the locations that are running on that machine. The security system 200 provides an automated method that allows security to the system to be distributed across databases and simplifies security maintenance. The security management system may be used to control all aspects of business thereby providing increased security across all functions of the business. For example, the security system 200 handles the generation of bills, pings converter boxes, schedules pay per view, etc.

Accordingly, the security system 200 provides the following features and enhancements:

- All processes involving communication between the locations 201-203 use IP (Internet Protocol) 204, 205 in place of SNA (System Network Architecture).
- Active Directory names may be downloaded and retained from each of the servers 201, 202, 203 for selection when setting up new users needing ICOMS access.
- Users that have moved to a new location 210 on the AD user file may be assigned to that new location without waiting for the AD process to run.
- A file driven Mass ICOMS Apply process is implemented across the ICOMS databases 207-209 to assist with an AD name conversion project as well as with additional projects.

A password reset option is also provided for field and corporate security personnel to allow such personnel to reset expired or disabled profiles for users.

The memory 230 is configured to store information for implementing the distributed security system 215. The processor 220 provides a user interface on a display device for entering data for authenticating and authorizing a user associated with the data, provides security across a plurality of business modules distributed over a plurality of locations using a distributed security platform 215. The distributed security platform 215 processes the data entered by the user to determine rights related to the user associated with the entered data. Upon determining rights related to the user associated with the entered data, the processor 220 provides the user access and control to the business modules according to the determined rights, controls communication between the plurality of business modules distributed over the plurality of locations by the distributed security platform 215 using an Internet Protocol and distributed data management (DDM) files on databases distributed over the plurality of locations and ensures data integrity by the distributed security platform 215 despite concurrent user accesses and faults.

The processor 220 ensures data integrity by periodically synchronizing the DDM files to logically interrelate the plurality of databases to maintain a single version of the data in each of the plurality of databases. The processor 220 periodically synchronizes the DDM files to logically interrelate the plurality of databases to maintain a single version of the data in each of the plurality of databases. The processor 220 implements an active directory process to download active directory names from each of the plurality of locations to select when new users needing access are setup. Users are assigned to a new location without waiting for the active directory process to run when users have moved to the new location on the active directory user file. Active directory names are converted using a global process across the plurality of databases in the plurality of locations. A password reset option is presented to the user to allow security personnel to reset expired or disabled profiles for users. A security interface enables a user to create and manage profiles.

The processor 220 causes a user interface to be displayed allowing a user to create a multiple location user profile to allow the user to access multiple locations. A user may add comments to a profile. A user may view profiles assigned to a particular group. A user may perform at least one of setting up user functions, selecting locations, interfacing with a workforce management module, performing maintenance operations, selecting menu options, and selecting filters for listing job control numbers. A user may define authorization rights for single location users and multiple location users at each site. Data associated with at least one parameter chosen from the group consisting of locations, profiles, users, group profiles, menus, menu options, functions, and authorization options, may be manipulated. A user may add or delete parameters. A user may add or delete a single parameter or a plurality of parameters.

Figure 3:
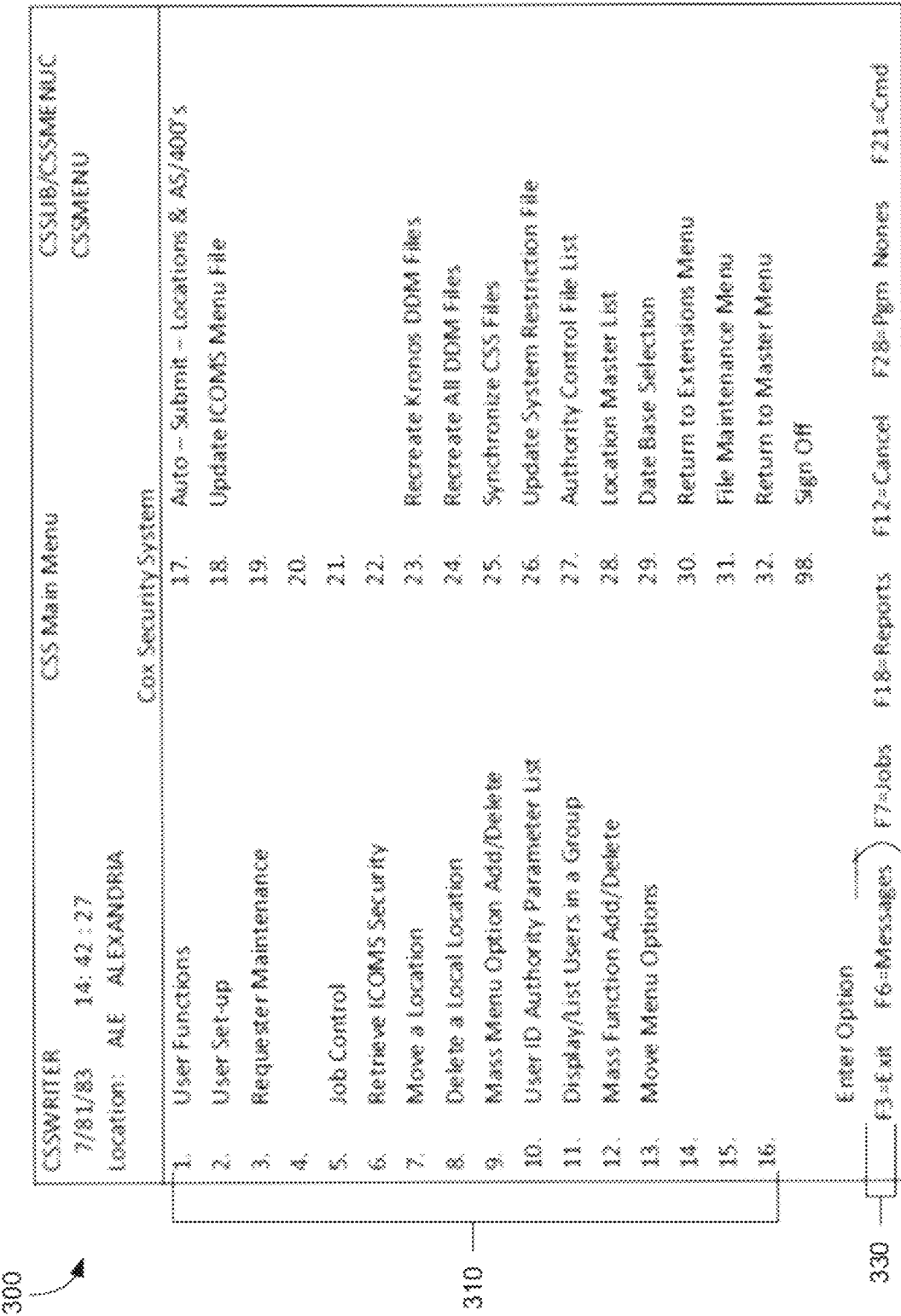
FIG. 3 shows the CSS Main Screen according to one embodiment.

FIG. 3 shows the CSS Main Screen 300 according to one embodiment that list various options 310 related to creating and managing profiles for users and user groups of CCI security systems. The user will enter an option number from the menu 310 in the Enter Option field 320. For example, to change between databases, the user will type 29 in the option field 320. Function keys may be selected from the menu 330 to perform particular jobs.

Table 1 describes the functions of the CSS Main Menu screen.

TABLE 1

| Function Key | Description |
| --- | --- |
| F3 = Exit | Takes you back to the Cox Extensions menu. |
| F5 = Refresh | Restores the last values retrieved prior to an F10 (Update). |
| F6 = Messages | Shows you any messages that have been issued. |
| F7 = Jobs | Shows you any submitted jobs. |
| F10 = Reports | Shows you any spool files. |
| F12 = Cancel | Returns you to the previous screen. |

FIG. 4 shows the User Function screen 400 according to one embodiment that demonstrates the different input methods CSS uses to navigate through the system.

Table 2 describes the various methods for the user to interact with the AS/400 screens.

TABLE 2

| Input Method | Description |
| --- | --- |
| F keys | "F" keys (e.g., F2 on the keyboard) process data or navigate from screen to screen. For F keys above F12, you may have to use the shift key in conjunction with another key. For example, F13 is [Shift + F1]; F14 is [Shift + F2]; and so on. Also, a mouse can be used to start an F key command. |
| Position line | To locate a particular user, location, function, or option, type in any character string in the Posn field and press [Enter]. The nearest match beginning with those characters will be displayed. To return to the top of the subfile, clear the positioner entry and press [Enter]. |
| Functions & Blank Lines | Often items listed on a screen will have a blank line to input optional functions. Each function will start a process based on the item selected. Put your cursor on the blank line to enter the desired function number or abbreviation. Occasionally, a field will have a list of possible inputs and you must click F4 to open the list to choose the input. This field has an * next to the blank line. |

Table 3 shows how the four types of users are displayed on the User Function screen.

TABLE 3

| User Type | PC | Green Screen |
| --- | --- | --- |
| SLU | Green | No letters by profile name |
| SLG | Red | The letter 'G' by the profile name |
| MLU | Blue | The letter 'M' by the profile name |
| MLG | Yellow | The letter 'M' by the profile name |

Figure 6:
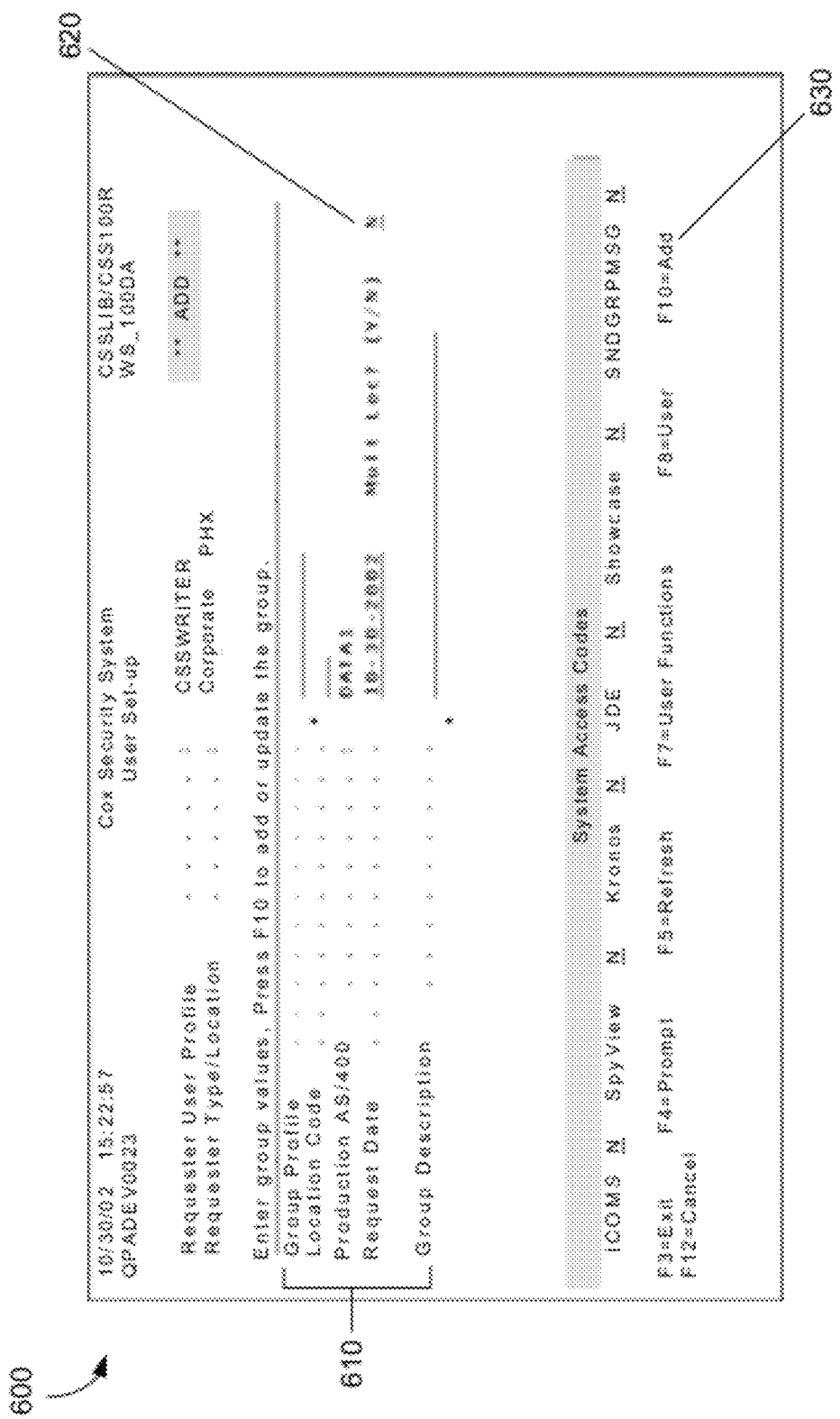
FIG. 6 shows the User Set-Up screen with group fields according to one embodiment.

FIGS. 5-7 show the various screens used to create profiles. All procedures start from the User Set-up screen (see FIG. 10) by pressing the F10 (add) function key. Table 4 shows the four types of profiles created in CSS along with a description.

TABLE 4

| Type | Description |
| --- | --- |
| Single Location User (SLU) | A user who has a profile on one AS/400 for a single location. |
| Single Location Group (SLG) | A group who has a profile on one AS/400 for a single location. |
| Multiple Location | A user who has a profile on several AS/400s and |

TABLE 4-continued

| Type | Description |
| --- | --- |
| User (MLU) | may be applied to multiple locations. |
| Multiple Location Group (MLG) | A group who has a profile on several AS/400s and may be applied to multiple locations. |

FIG. 5 shows the CCS Create MLU User Profiles screen 500 according to one embodiment which allows the user to create a MLU in order to access multiple locations. The user will enter a 1 in the Sel column 510 to select one location per AS/400 machine. The F10 function key 520 can be pressed on the keyboard from the list of function key options 530 to continue on to create the profiles.

FIG. 6 shows the User Set-Up screen with group fields 600 according to one embodiment. If the user presses function key F8 for Group from the User Set-Up screen (see FIG. 10), the screen refreshes with the group fields 610. The user will enter the required information 610. If the user is creating a Single Location Group made for a group that will access only one location, the user will enter N in the "Mult Loc?" Field 620. If the user is creating a Multiple Location Group made for a group that will access multiple locations, the user will enter Y in the Mult Loc? Field 620. After entering the appropriate information, press the F10 key to add or update the Group user.

FIG. 7 shows the CSS Comment Maintenance screen 700 according to one embodiment that enables a user to add comments to a profile. The user may enter up to 98 lines of comments in the appropriate fields 710 to a user or group, and then press [Enter] to add the comments. To return to the User Set-up screen (see FIG. 10), the user may press the F3 function key 720.

Figure 8:
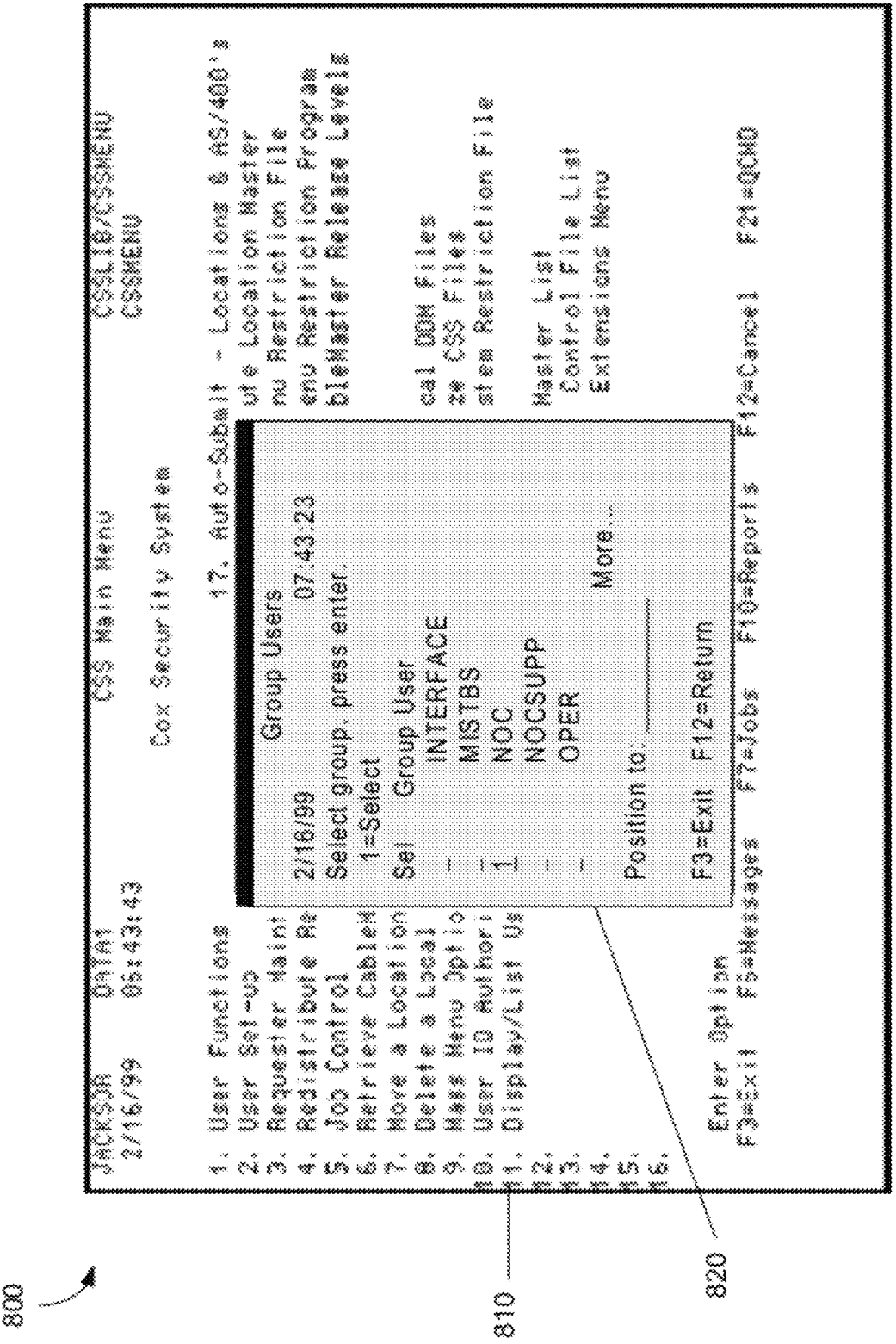
FIG. 8 shows the CSS Main Menu screen with the Group Users window according to one embodiment.

FIG. 8 shows the CSS Main Menu screen with the Group Users window 800 according to one embodiment. From the Main Menu screen the user entered option 11 (Display/List Users in a Group) 810 to display all profiles assigned to a particular group when connected to a database in ICOMS. The user chose to display all profiles attached to the NOC group by typing a 1 in the Sel column to select the NOC group 820.

Figure 9:
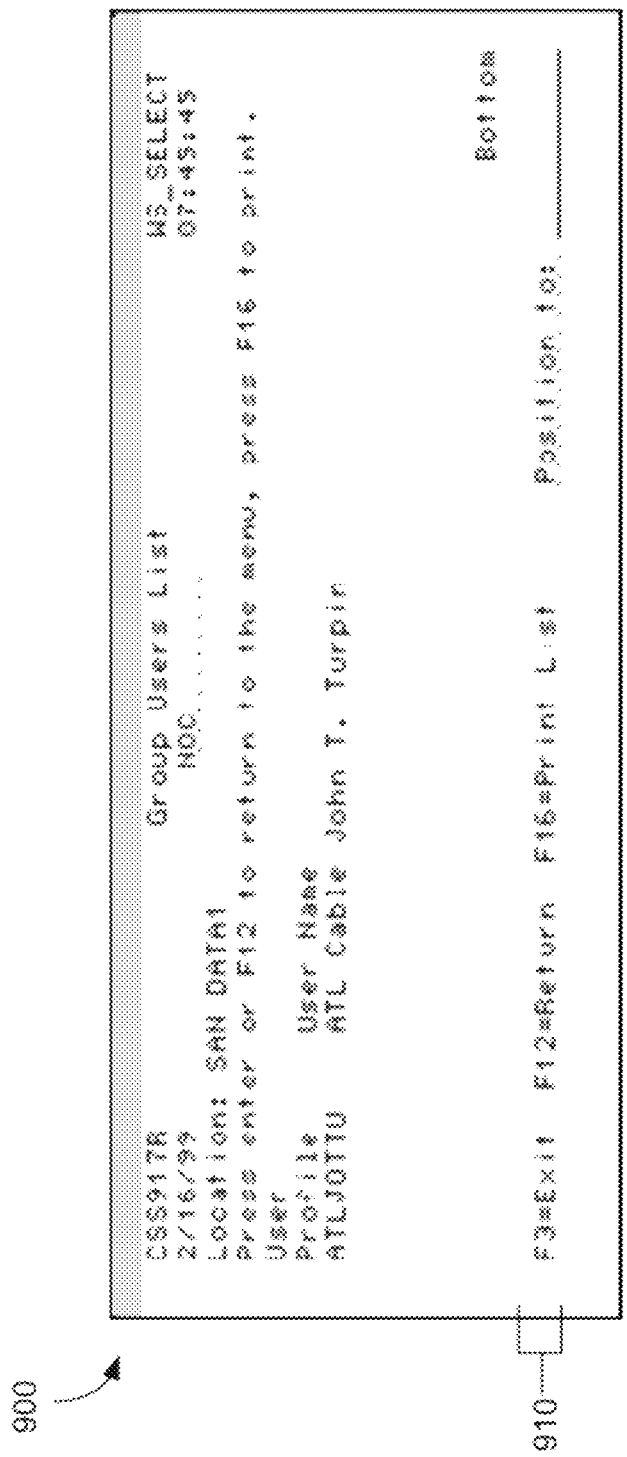
FIG. 9 shows the Group User's List according to one embodiment.

FIG. 9 shows the Group User's List 900 according to one embodiment where a list of profiles assigned to the group NOC is displayed. The user may select from the function key options 910, for example pressing F16 will print a report for the selected profile.

FIG. 10 shows the User Set-Up screen 1000 according to one embodiment which creates user profiles for the AS/400 based on the selections made for the new user. A user can be defined as a Single or Multiple Location User. To add a profile the user will enter the appropriate data fields 1010, and then press the F10 function key from the options 1020.

Table 5 describes the fields and function keys of the User Set-up screen.

TABLE 5

| User Value | Description |
| --- | --- |
| AS/400 User Profile (for a group: "Group Profile") | For User Profile: The name will be automatically generated. For Group Profile: This name will be generated by the system unless you enter one. |
| Location Code | Promptable field. The three character abbreviated title of the ICOMS location. Result: Fills out Location Code and Production AS/400 fields. |

TABLE 5-continued

| User Value | Description |
|---|---|
| Production AS/400 | The user will connect with this production machine. This parameter is filled in by the system. |
| Request Date | Date user is being added. Generated by the system. |
| Mult Loc? (Y/N) | Allows you to enable a user as a MLU. Enter 'Y' if the user is to be set up as an MLU or accept the default 'N' if user is to be set up as a SLU. For more information, refer to the MLU section in this chapter. |
| Tech Bch? | Enables users with Tech Batch privileges only and prevents them from being deleted during a weekly purge. Note: Field is not shown when working with a Group. |
| First Name/Middle Initial/Last Name | The first two letters of the first name, the middle initial and the first two letters of the last name will be used to form the AS/400 User Profile. If . . . then . . . <br> there is no middle initial, — system will choose the first two letters of the first name and the first three letters of the last name. <br> this name already exists, — system will treat the name as if no middle name exists and will choose the first two letters of the first name and the first three letters of the last name. <br> there is no middle initial and the name already exists — an error message will occur and user input will be required to create a different User Profile name. <br> Note: Field is not shown when working with a Group. |
| AS/400 Output Queue/Library | This is a promptable field. Default library is *LIBL. The entry must be either a valid AS/400 output queue/library name. Note: Field is not shown when working with a Group. |
| Employee Type | E = Employee: All general users <br> M = Manager, Supervisor, or MIS personnel: Allows re-enable User IDs <br> O = Other (i.e., Group): Default if there is no ICOMS access. <br> Note: Field is not shown when working with a Group. |
| AS/400 Attention Key Program | This parameter is set by the system according to the employee type. Note: Field is not shown when working with a Group. |
| Assign POPUPCL? | Overrides ICOMS security. Specifies that the profile should be created with POPUPCL as the initial program. The POPUPCL screens are the only screens this user will be able to access. Requesters who are not authorized in Requester Maintenance will not see this entry. Default = N for 'No'. Note: Field is not shown when working with a Group. |
| User Type | P = Production, C = Corporate <br> Determines levels of access in CSS. <br> Note: Protected field. A production requester cannot access this field. This field is not shown when working with a Group. |
| Equipment Type | GS = Green screen Terminal <br> PC = Personal Computer/Rumba <br> Note: Field is not shown when working with a Group. |
| System Access Codes | Provides selection of the various COX applications. Default for all systems is 'N' for No. At least one application flag must be set to 'Y'. The SNDGRPMSG flag should be set to 'Y' for all users. SNDGRPMSG allows them to send and receive messages within their location via the "Attention key program." |

TABLE 5-continued

| User Value | Description |
|---|---|
| | Note: Field is not shown when working with a Group. |
| F3 = Exit | Takes you back to the CSS Main Menu. |
| F4 = Prompt | If a field has an asterisk (*), press F4 to display a selection list. |
| F5 = Refresh | It will restore the last values retrieved prior to an F10 (Update). |
| F7 = User Functions | Takes you to the User Functions screen. |
| F8 = Group/User | Toggles between setting up for a Group and a User. |
| F9 = Add | Must be in Last Change Mode. Allows you to add a new user. This key can only be seen after at least one user has been added/updated or retrieved. |
| F10 = Add/Update | Updates the current user/group or adds a new one, depending on the mode. After all entries have been made, you must press F10 (Add/Update) to add or update the user. Pressing the [Enter] key is only used for editing. |
| F12 = Cancel | Returns you to the previous screen. |
| F14 = System Access | Must be in Last Change mode. Takes you to the Select System Access screen. Allows you to apply or maintain security within each system. |
| F18 = Create User Profile | Takes you to the Create User Profile screen. Allows you to create a new user profile to make changes to an existing profile. |
| F24 = Comments | Takes you to the Comment Maintenance screen. Allows you to enter comments for the current user. |

Figure 11:
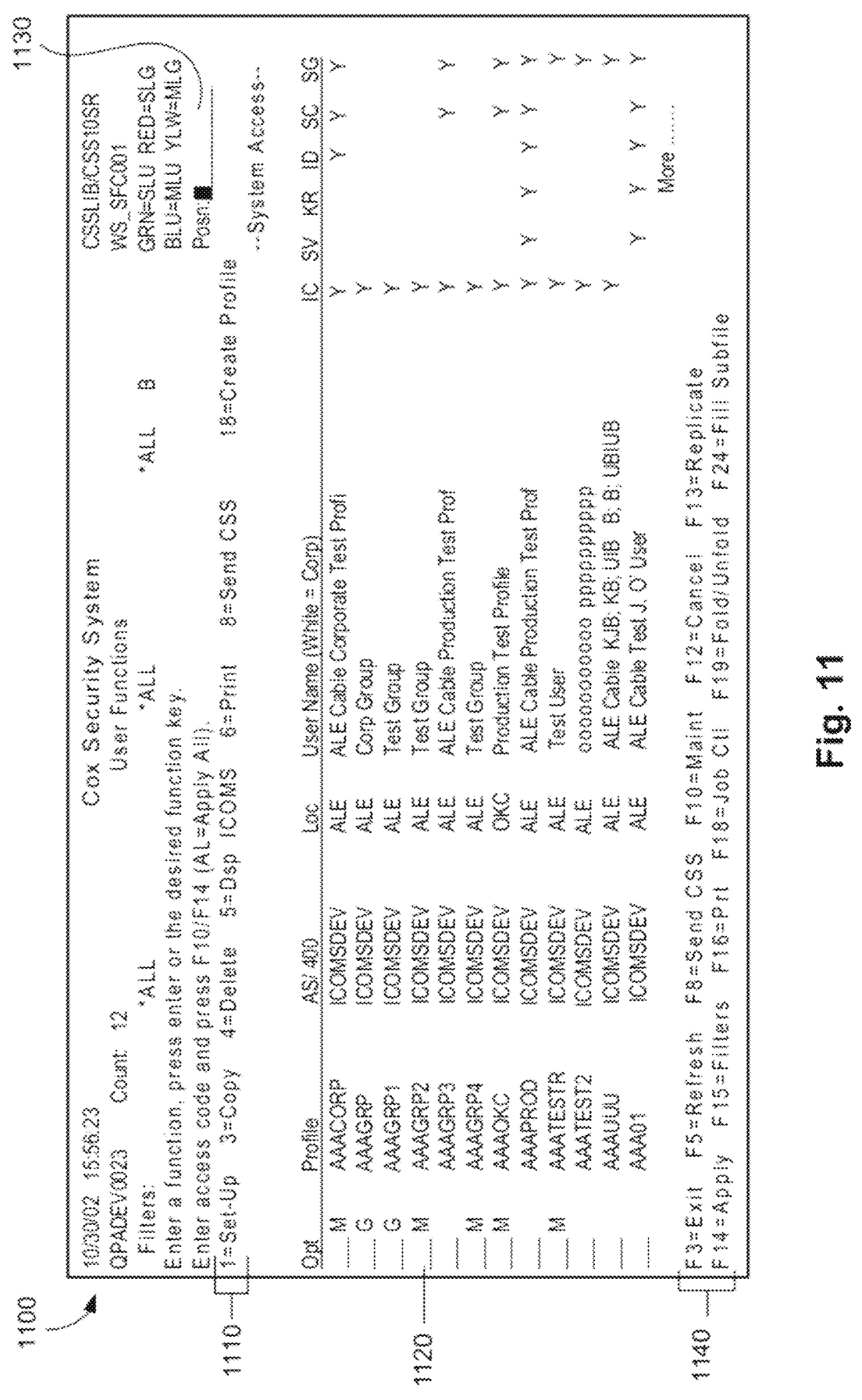

FIG. 11 shows the User Functions screen 1100 according to one embodiment. The user may position the profile list by typing in any character string in the Posn field 1130 and pressing [Enter]. The nearest match beginning with those characters will be displayed. The user may choose from the options 1110 and enter the corresponding number in the Opt column field 1120. The user will then press [Enter] or the desired function key from the function key menu 1140.

Figure 12:
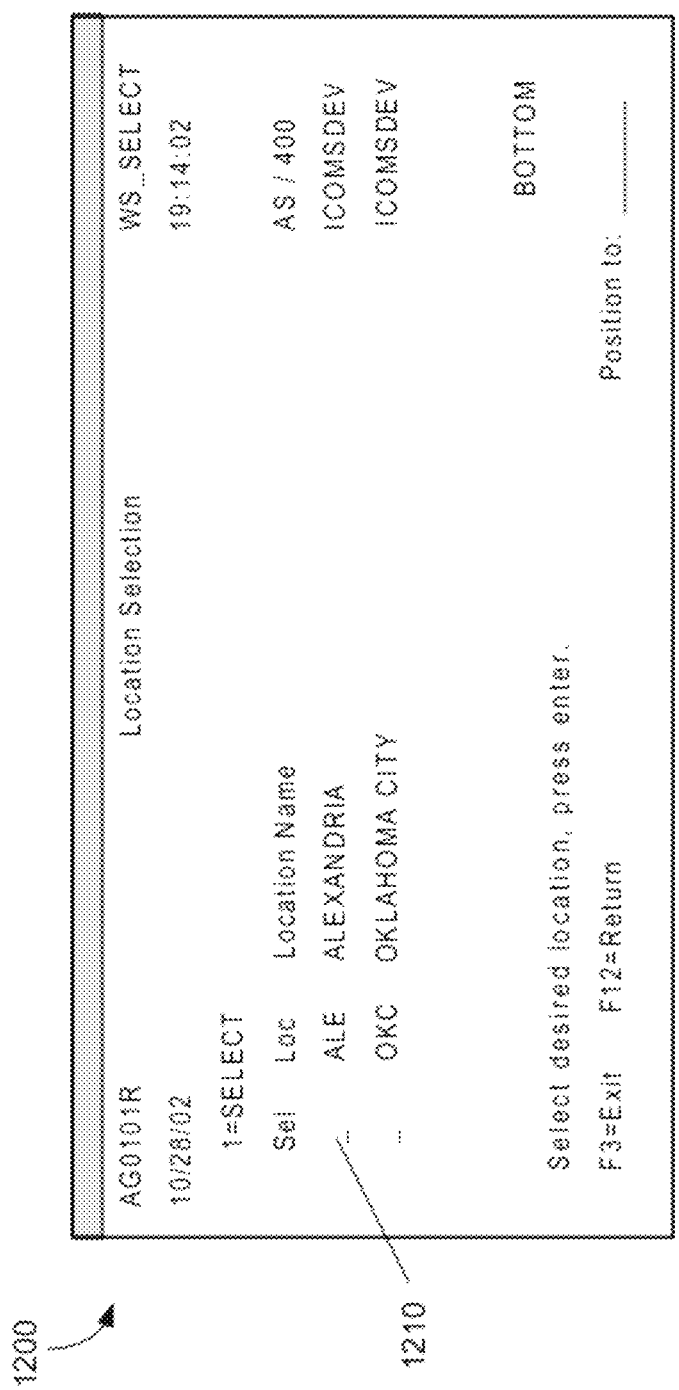
FIG. 12 shows the Location Selection window according to one embodiment.

FIG. 12 shows the Location Selection window 1200 according to one embodiment accessed from the User Set-Up screen (see FIG. 10). The user may place a 1 in the Sel column field 1210 to select the location that your new user will have access rights to, and then press [Enter]. After pressing [Enter] the user will be returned to the User Set-up screen where the Location Code and Production AS/400 fields will be automatically be filled in.

FIG. 13 shows the User Set-Up screen exhibiting a Kronos module 1300 according to one embodiment. When adding a new user with Kronos selected 1310, the user will press [enter] and a Kronos module is displayed 1320.

FIG. 14 shows the User Functions screen 1400 according to one embodiment where security set-up may be applied to one or more systems. If applying set-up to a system, type the System Access Code, for example KR (Kronos), in the Opt column field 1410. If applying security set-up to all systems, type AL in the Opt field 1410. The user will then press the F14 function key 1420 to apply the security set-up to the systems selected.

Table 6 describes the options and function keys of the User Function screen.

TABLE 6

| Option/Function Key | Description |
|---|---|
| 1 = Set-up | Opens the profile in the User Set-up screen (only AS/400 |

TABLE 6-continued

| Option/Function Key | Description |
|---|---|
| | user profile information). |
| 3 = Copy | Allows requester to copy the CSS set-up from one profile to another. A location restricted user may only copy to his/her specified location.<br>For existing profiles, this function overwrites the set-up. For new profiles, you must create a new profile in User Set-up, then copy to that profile. |
| 4 = Delete | Deletes the selected security for the selected profile from CSS/ICOMS.<br>Note: This does not delete JDE security. You must request ATL to change this security. |
| 5 = Display ICOMS | Displays ICOMS security in Inquiry mode. No changes can be made in this mode. |
| 6 = Print | Prints the profile set-up report for all profiles selected. A separate report is printed for each profile. Reports default to the requester's output queue. |
| 18 = Create Profile | Creates AS/400 profiles or changes an existing one. |
| AL = Apply all or System Access Code | Applies security for all system access codes flagged Y. |
| F3 = Exit | Takes you back to the previous screen. |
| F5 = Refresh | It will restore the last values retrieved prior to an F10 (Update). |
| F10 = Maint | Brings up ICOMS Security screen in Last Change mode so you can modify ICOMS security. |
| F12 = Cancel | Returns you to the previous screen. |
| F13 = Replicate | Replicates the value in all fields under the initial field. |
| F14 = Apply | Applies the security set-up to all of the systems (AL) or the systems you select (i.e., IC, KR, SV). |
| F15 = Filters | Allows you to select or limit what is displayed in the User Function screen. |
| F16 = Print | Prints everything according to how the filters are set. A single report is generated and put in the requester's default output queue. |
| F18 = Job Ctl | Provides an audit trail of CSS activities. |
| F19 = Fold/Unfold | Allows you to view additional User Set-up information on profiles. See below. |

FIG. 15 shows the User Functions screen exhibiting the Fold/Unfold function key option 1500 according to one embodiment. The function key option F19 Fold/Unfold 1510 allows the user to view additional user Set-up information on profiles 1520.

Figure 16:
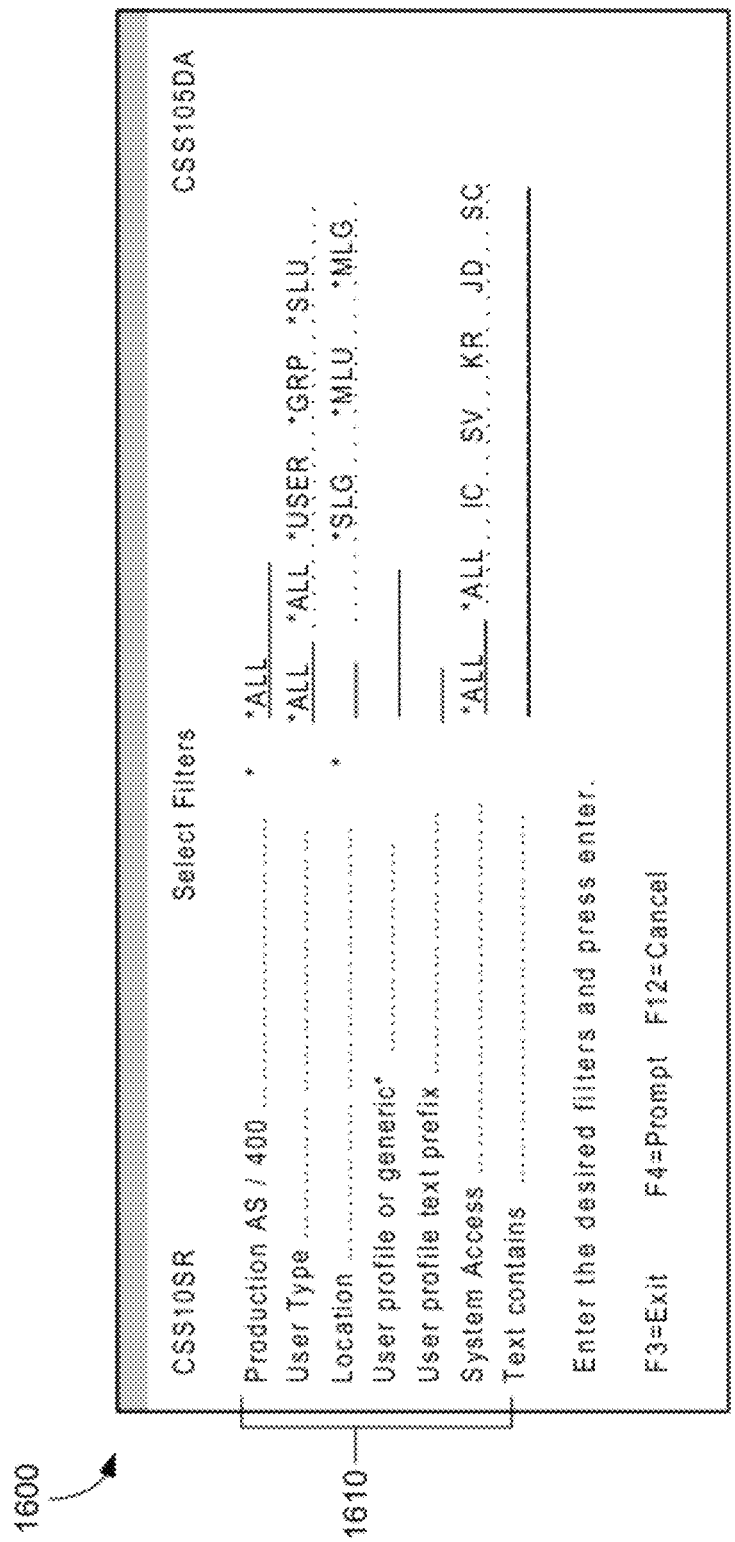
FIG. 16 shows the Select Filters screen according to one embodiment.

FIG. 16 shows the Select Filters screen 1600 according to one embodiment which allows the user to narrow down a list by specifying variables concerning the list. The user may enter the desired filters to the appropriate fields 1610.

Table 7 describes the fields of the Select Filters window.

TABLE 7

| Field | Description |
|---|---|
| User Profile or generic | Type desired profile name or partial name with wildcards. Wildcards are typically with location prefix (e.g., ORG* for all profiles in Orange County). |
| Production AS/400 | Defaults if location restricted. If not location restricted, prompts to all authorized AS/400 machines. |
| Location | Defaults if location restricted. If not location restricted, prompts to all authorized sites. |
| User Type | *ALL—Shows all users and groups.<br>*USER—Filter displays all users, no groups.<br>*GRP—Filter displays all groups, no users.<br>*SLU—Filter displays only SLU users.<br>*SLG—Filter displays only SLG users.<br>*MLU—Filter displays only MLU users.<br>*MLG—Filter displays only MLG users. |

TABLE 7-continued

| Field | Description |
|---|---|
| User Profile Text Prefix | Allows you to limit display profiles with three character profile ID prefix. |
| System Access | *ALL—All access codes below<br>*IC—ICOMS<br>*SV—SpyView<br>*KR—Kronos<br>*JD—JD Edwards<br>*SC—Showcase |
| Production/Corporation | P—Production profiles<br>C—Corporate profiles<br>B—Both Production and Corporate profiles |
| Text Contains | Any character string may be entered into the "Text Contains" field, resulting in users being selected that contain the string anywhere in the user profile text. |

Figure 17:
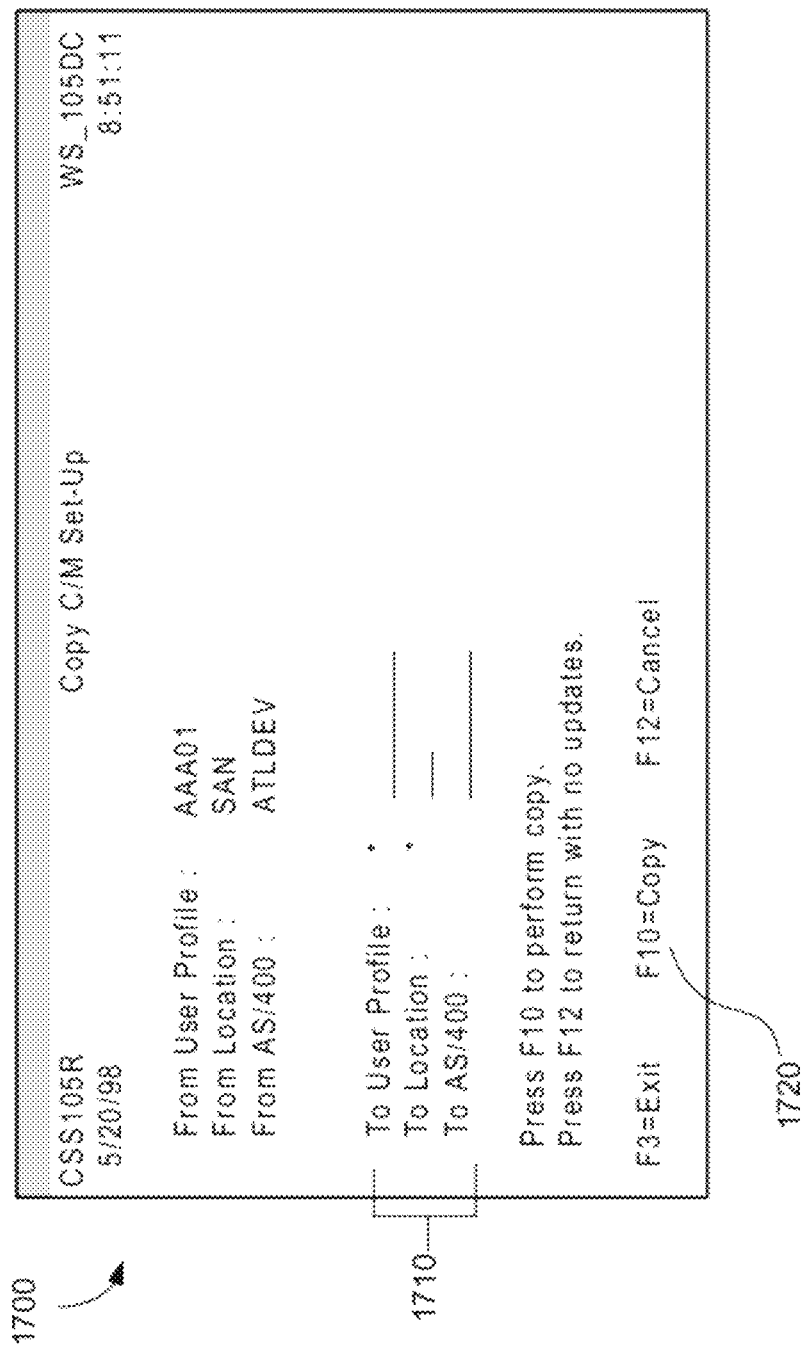
FIG. 17 shows the Copy C/M Set-up window according to one embodiment.

FIG. 17 shows the Copy C/M Set-up window 1700 according to one embodiment used to copy the ICOMS security set-up from a profile selected on the User Functions screen (see FIG. 14) to another user profile. The user will enter the appropriate data into the fields 1710 and press [Enter] to edit. The F10 function key 1720 is then pressed to copy the user profile.

Figure 20:
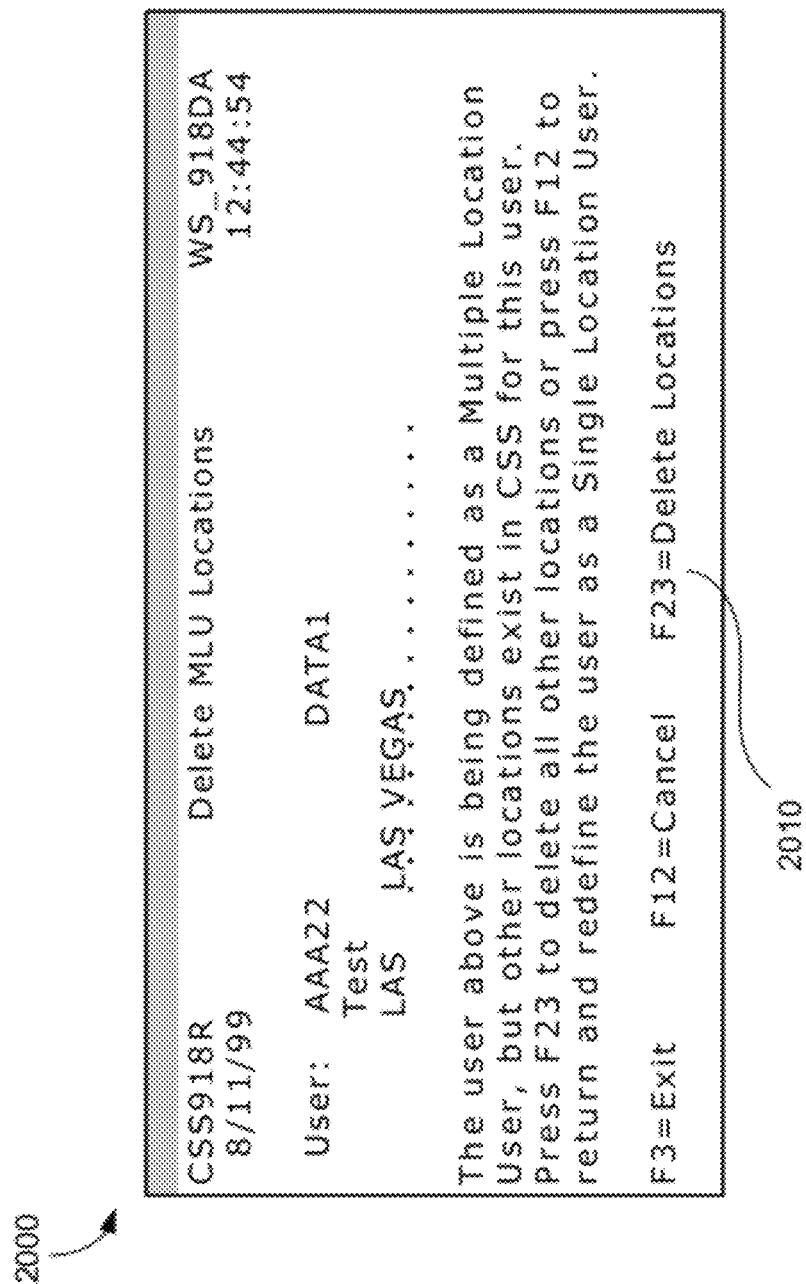
FIG. 20 shows the Delete MLU Locations window for AAA22 in Las Vegas according to one embodiment.

FIGS. 18-20 exemplify the changing of a SLU to a MLU by using the single user profile AAA22. FIG. 18 shows the User Functions screen 1800 according to one embodiment in which the user may select the AAA22 profile, for example, by typing a 1 in the Opt column 1810 and pressing [Enter] to display the User Set-up screen for this user.

FIG. 19 shows the User Set-up screen for AAA22 in Las Vegas 1900 according to one embodiment. The user will change the Mult Loc (Y/N) field 1910 to Y and press F10 function key 1920 to update. The Set-up program checks for other locations for this user.

FIG. 20 shows the Delete MLU Locations window 2000 for AAA22 in Las Vegas according to one embodiment. By pressing F23 (Delete Locations) function key 2010, removes the AAA22 user from duplication in CSS and completes the process of adding him/her as an MLU.

Figure 21:
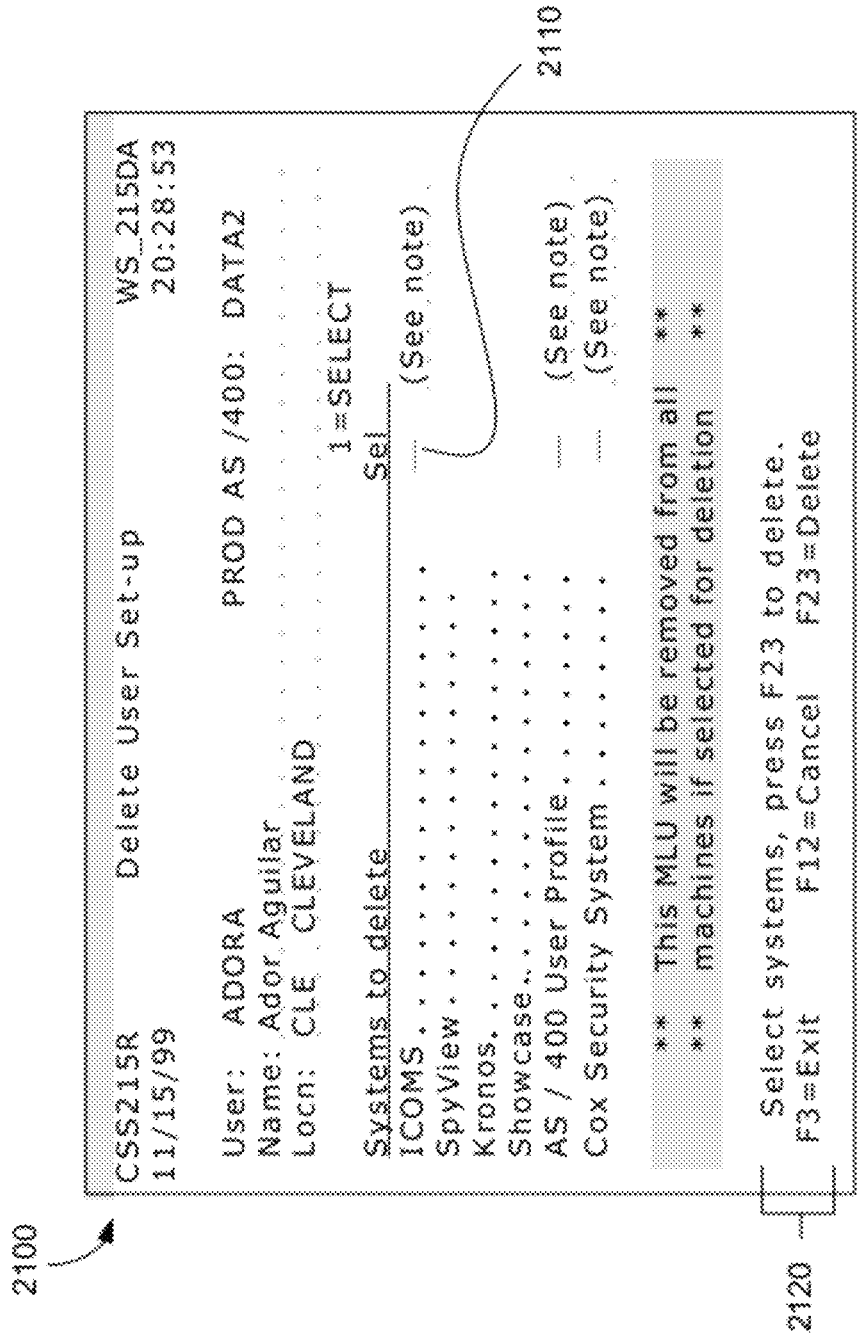
FIG. 21 shows the Delete User Set-up screen according to one embodiment.

FIG. 21 shows the Delete User Set-up screen 2100 according to one embodiment exhibiting a message indicating the MLU will be removed from all systems if any system is selected for deletion. The user may type a 1 in the Sel field 2110 to select the systems from which to delete the set-up. After selecting the systems to be deleted, the user may press F23 from the function key options menu 2120 in order to display the confirmation screen.

Figure 22:
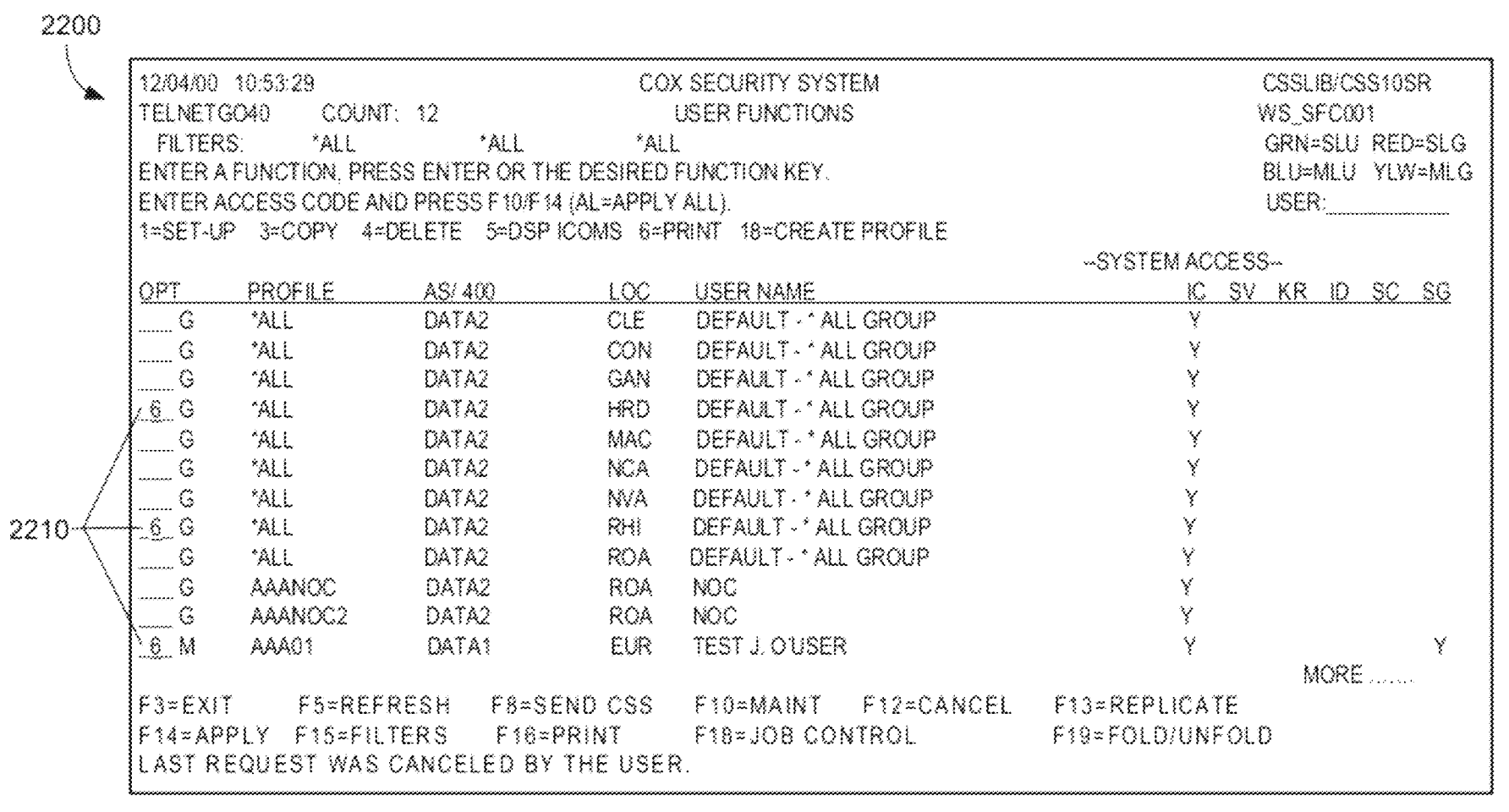

FIG. 22 shows the User Functions screen 2200 exhibiting the print option 6 according to one embodiment. The user will enter a 6 in the Opt column 2210 for all profiles to be printed and then press [Enter]. The Print Options window appears in which the user may choose one of three ways to print a profile's set-up (see FIG. 23).

Figure 23:
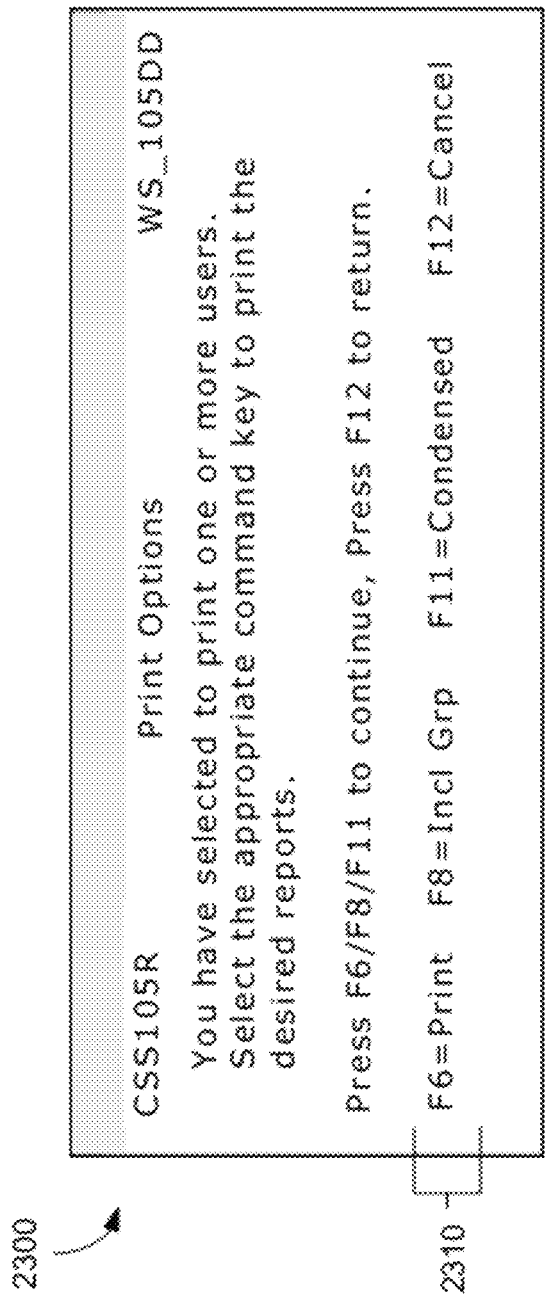
FIG. 23 shows the Print Options screen according to one embodiment.

FIG. 23 shows the Print Options screen 2300 according to one embodiment. The user may select a print option from the function key menu 2310. Press F6 (Print) to print all ICOMS information for profiles. Press F8 (Include Group) to include user options plus Group options, functions and IC functions. The user may also choose F11 (Condensed) to print AS/400 profile screen information.

FIG. 24 shows the CSS ICOMS Security screen 2400 according to one embodiment. The user may enter the appropriate fields 2410, and press F10 to update the profile. The user may also choose to press function key F18 from the option menu 2420 to access the Site Control Maintenance screen (see FIG. 25).

Table 8 describes the ICOMS Security screen fields and function keys.

TABLE 8

| Field/Function Key | Description |
| --- | --- |
| Cash Entry | (Y/N) Allow or restricts cash ability in ICOMS. |
| Group User | P: Production User<br>C: Corporate User<br>N: Group |
| Adjustment Group | Not required. Allows for online adjustment entries. Select from list or enter manually. |
| Sign On Menu | Required and promptable field. Enter the initial menu the user defaults to when signing into ICOMS. |
| Group ID | Not required. Allows a user to have the rights of a group. Select security group that is attached to ICOMS. |
| Default Site ID | Promptable field if not location restricted. Sets up the default Site ID for ICOMS. If only one site exists for the location, this value will already be set. |
| User/Group to Copy (Menu Option) | Promptable field. Copies existing menu options from another user or group. |
| User/Group to Copy (Authorized Functions | Required and promptable field. Copies existing functions from another user or group. |
| F3 = Exit | Takes you back to the previous screen. |
| F4 = Prompt | If a field has an asterisk (*), press F4 to display a selection list. |
| F5 = Refresh | It will restore the last values retrieved prior to an F10 (Update). |
| F10 = Add | Allows you to add an ICOMS security record for a user. |
| F12 = Cancel | Returns you to the previous screen. |
| F18 = Site Control | Takes you to the User Site Control Selection screen. Note: You must be in the process of adding a Site Control record. This function key only becomes available after a profile has been add20ed. |
| F20 = Menu Options | Takes you to the ICOMS Menu Options Selection screen. Note: This function key only becomes available after a user has been added using F10. |
| F22 = Functions | Takes you to the ICOMS Functions Selection screen. This is for ICOMS users parameters. Note: This function key only becomes available after a user has been added w/ access to Cash/Adj AB or Maint CM. |
| F24 = Comments | Takes you to the Comment Maintenance screen. |

FIG. 25 shows the Site Control Maintenance screen 2500 according to one embodiment used to define the ICOMS authorization rights for SLU and MLU users at each site. The user will enter the appropriate fields 2510, and then press F10 to add/update the Site Control Record from the function key menu options 2620.

FIG. 26 shows the MLU Site Selection for Maintenance 2600 according to one embodiment. To select site(s) for the MLU to access, enter a 1, 2, or 3 in the Sel column 2610. The user will then press F10 to continue to the Site Control Maintenance screen (see FIG. 25) from the function key menu options 2620.

Table 9 shows the three ways to select sites and the screen's function keys along with a description of each field.

TABLE 9

| Function | Description |
| --- | --- |
| 1 = Select | Type a 1 by each desired location. |
| 2 = MASTERC "Y" | This option allows for mass addition of the Master Menu Access to the Site Control Maintenance file. Type a 2 next to all Site IDs that you want this MLU user to have Master Menu Access. |
| 3 = MASTERC "N" | This option allows for mass addition of the Master Menu Access to the Site Control Maintenance file. Type a 3 next to all Site IDs that you do not want this MLU user to have Master Menu Access. |
| F3 = Exit | Takes you back to the previous screen. |
| F5 = Refresh | It will restore the last values retrieved prior to an F10 (Update). |
| F10 = Continue | After you have made your selections, press F10 displays the Site Control Maintenance screen. |
| F12 = Cancel | Returns you to the previous screen. |
| F13 = Replicate | Replicates a field's value in all fields under the initial field. |

FIG. 27 shows the ICOMS Menu Option Selection 2700 according to one embodiment accessed from the ICOMS Security screen (see FIG. 24) by pressing F20 function key for Menu Options. To update the menu options, select the appropriate options by entering a 1 in the Sel column 2710. The user will then press the F10 function key from the function key options menu 2720 to update.

Table 10 describes the function keys for the ICOMS Menu Option Selection screen.

TABLE 10

| Function Key | Description |
| --- | --- |
| F3 = Exit | Takes you back to the previous screen. |
| F4 = Prompt | If a field has an asterisk (*), press F4 to display a selection list. |
| F5 = Refresh | It will restore the last values retrieved prior to an F10 (Update). |
| F10 = Update | Updates the menu option selection for current user. |
| F11 = Release Level | Displays a list of available ICOMS release levels. This function key is active only when working with an MLU. |
| F12 = Cancel | Returns you to the previous screen. |
| F13 = Replicate | Replicates an option in a field to all field below it. |
| F15 = Filter | Displays a list of several filter options. |
| F20 = Copy U)ser | Copy and obtains selection from User/Group to Copy ICOMS Security. Retains option selections for profile from User/Group to Copy. Restores copied menu options (or functions) from the copied user group. Note: Only shown if a User/Group to Copy field has profile entered. These options are retained if User/Group to Copy is removed. |
| F23 = Delete All | Deletes all selected menu options. When pressing F23, a confirmation screen appears to ensure that you want to perform this function. Note: If a user is attached to a group, F23 deletes the options assigned to only the user. |
| F24 = Comments | Takes you to the Comment Maintenance screen. |

Figure 28:
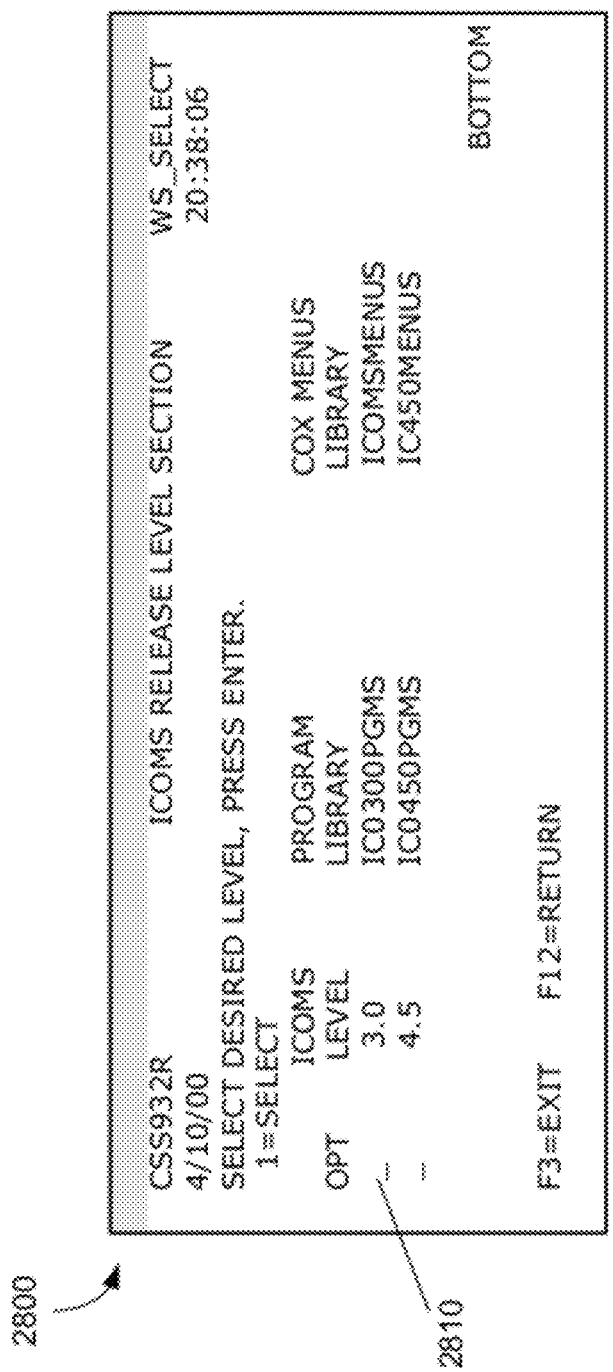
FIG. 28 shows the ICOMS Release Level Selection screen according to one embodiment.

FIG. 28 shows the ICOMS Release Level Selection screen 2800 according to one embodiment which displays the menus available for other release levels when working with an MLU. The user will type a 1 in the Opt field 2810 and then press [Enter] to display menu options for that level.

Figure 29:
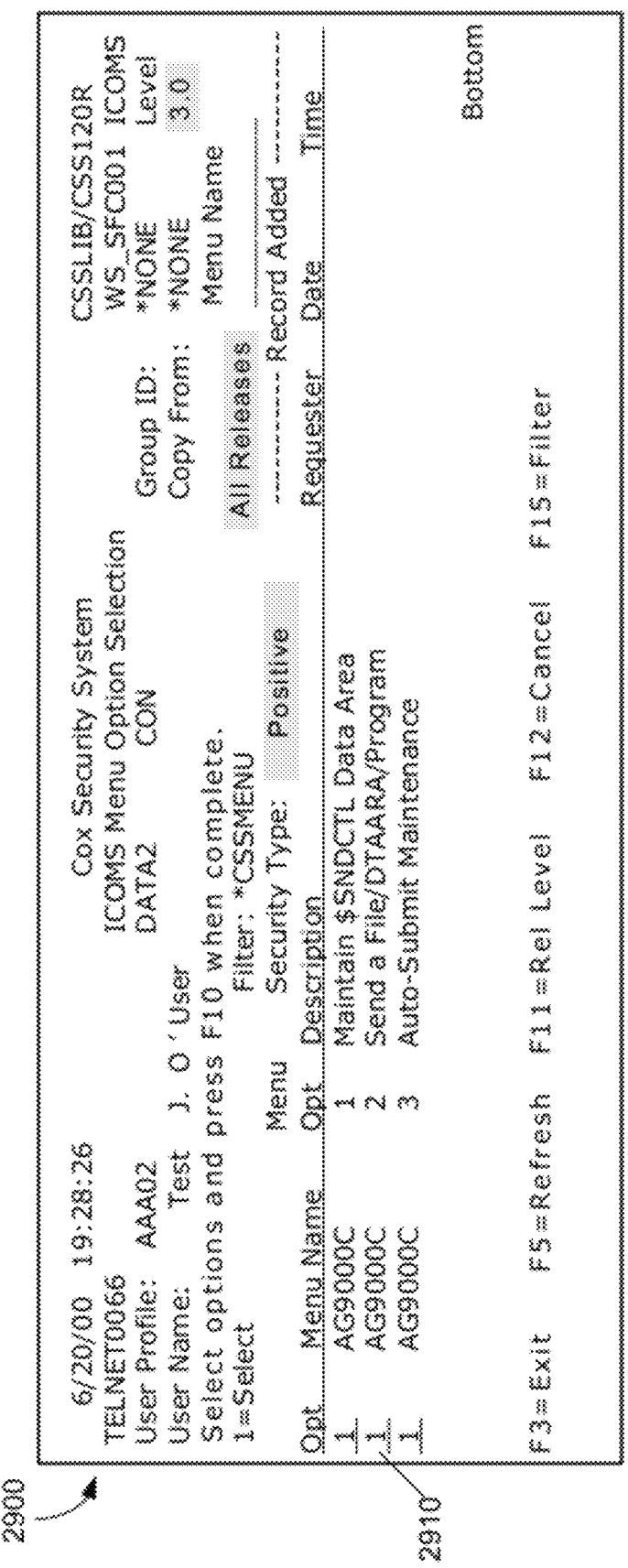
FIG. 29 shows the ICOMS Menu Option Selection according to one embodiment.

FIG. 29 shows the ICOMS Menu Option Selection 2900 according to one embodiment exhibiting all menu options for all release levels of *CSSMENU. The user has selected all menu options by typing a 1 in the Opt fields 2910.

FIG. 30 shows the ICOMS Function Selection screen 3000 according to one embodiment. To display the ICOMS Function Selection screen 3000, the user will press F22 from the ICOMS Security screen (see FIG. 24). To add or update a function, type a 1 in the Opt field 3010 of the desired function and press the F10 function key from the function key options 3020. The F22 Suppl Functions option 3030 is only functional if Cash/Adj AB or Maint/INQ is selected.

Table 11 defines the ICOMS Function Selection screen's functions.

TABLE 11

| Function Key | Description |
| --- | --- |
| F3 = Exit | Takes you back to the previous screen. |
| F5 = Refresh | It will restore the last values retrieved prior to an F10 (Update). |
| F10 = Update | Allows you to add the functions for a user. |
| F12 = Cancel | Returns you to the previous screen. |
| F13 = Replicate | Replicates an option in a field to all field below it. |
| F15 = Filter | Allows you to see all, selected or non-selected functions. |
| F19 = Fold/Unfold | Allows you to see a more expanded or condensed explanation of a given field(s). Also displays the character input field. |
| F20 = Copy User | Copy and obtains selection from User/Group to Copy ICOMS Security. Retains option selections for profile from User/Group to Copy. Restores copied menu options (or functions) from the copied user group. Note: Only shown if a User/Group to Copy field has profile entered. These options are retained if User/Group to Copy is removed. |
| F22 = Suppl Functions | Displays a list of supplemental functions to choose. |
| F23 = Delete All | Deletes all selected functions. When pressing F23, a confirmation screen appears to ensure that you want to perform this function. |
| F24 = Comments | Takes you to the Comment Maintenance screen. |

Figure 31:
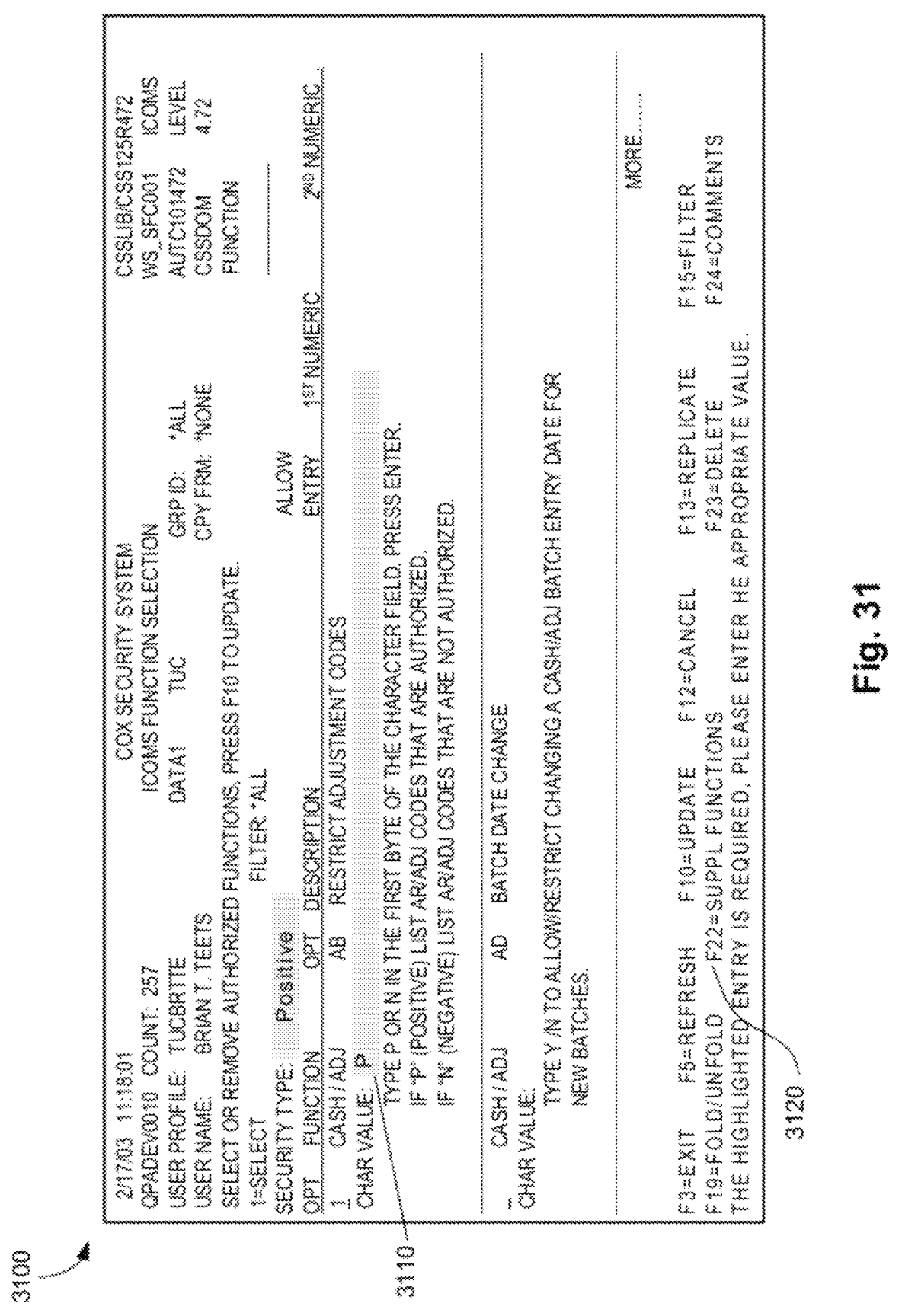

FIGS. 31-34 show the screens used to modify supplemental functions when the Suppl Functions option F22 is chosen from the ICOMS Function Selection screen. FIG. 31 shows the ICOMS Function Selection screen 3100 from an unfolded information view according to one embodiment. From the ICOMS Function Selection screen 3100, set the options' value to either P for Positive logic (authorized) or N for Negative logic (restricted) in the Character Value field 3110. This indicates the security logic for these functions. The user will then press F22 function key 3120 to display the Supplemental Functions Selection window (see FIG. 32).

Figure 32:
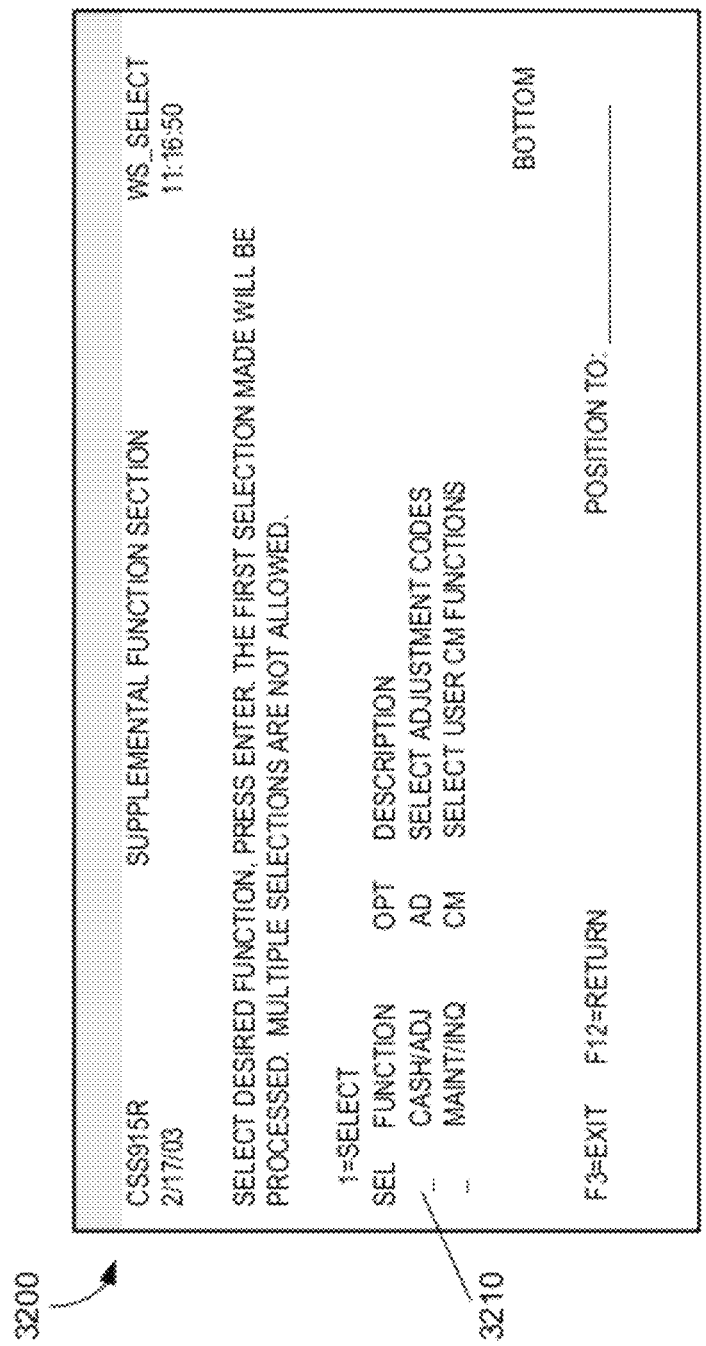
FIG. 32 shows the Supplemental Function Selection screen according to one embodiment.

FIG. 32 shows the Supplemental Function Selection screen 3200 according to one embodiment. The user will enter a 1 in the Sel column field 3210 to select one option and then press [Enter]. Multiple selections are not allowed. If the CASH/ADJ option is selected the ICOMS Adj Code Selection screen appears (see FIG. 33).

FIG. 33 shows the ICOMS Adj Code Selection screen 3300 according to one embodiment that is displayed if the user selects the CASH/ADJ option. All options have been selected indicated by the 1 in all the Opt column fields 3310.

FIG. 34 shows the ICOMS CM Function Selection screen 3400 according to one embodiment that is displayed if the user selects a MAINT/INQ option from the Supplemental Functions Selection window (see FIG. 32). To select functions, type a 1 in the desired Opt column fields 3410 and then press the F10 function key 3420 to update.

Table 12 lists and defines the functions for the ICOMS Adj Code Selection and ICOMS CM Function Selection screens.

TABLE 12

| Function Key | Description |
| --- | --- |
| F3 = Exit | Takes you back to the previous screen. |
| F5 = Refresh | It will restore the last values retrieved prior to an F10 (Update). |
| F10 = Update | Allows you to add the functions for a user. |
| F12 = Cancel | Returns you to the previous screen. |
| F15 = Filter | Allows you to see all, selected or non-selected functions. |
| F23 = Delete All | Deletes all selected functions. When pressing F23, a confirmation screen appears to ensure that you want to perform this function. |
| F24 = Comments | Takes you to the Comment Maintenance screen. |

Figure 35:
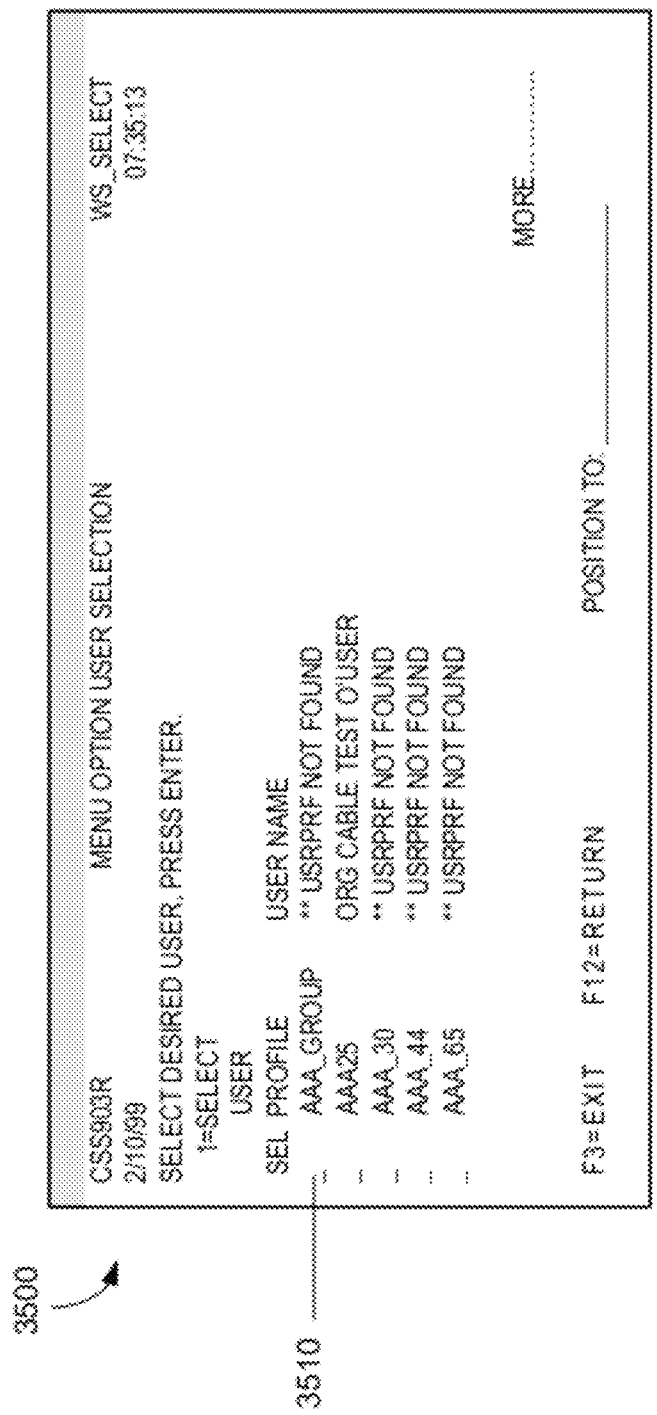
FIG. 35 shows the Menu Option User Selection screen according to one embodiment.

FIG. 35 shows the Menu Option User Selection screen 3500 according to one embodiment used to select menu options to be copied from one profile to another profile. The user will type a 1 in the Opt field 3510 for the profiles to be copied and press [Enter].

Figure 36:
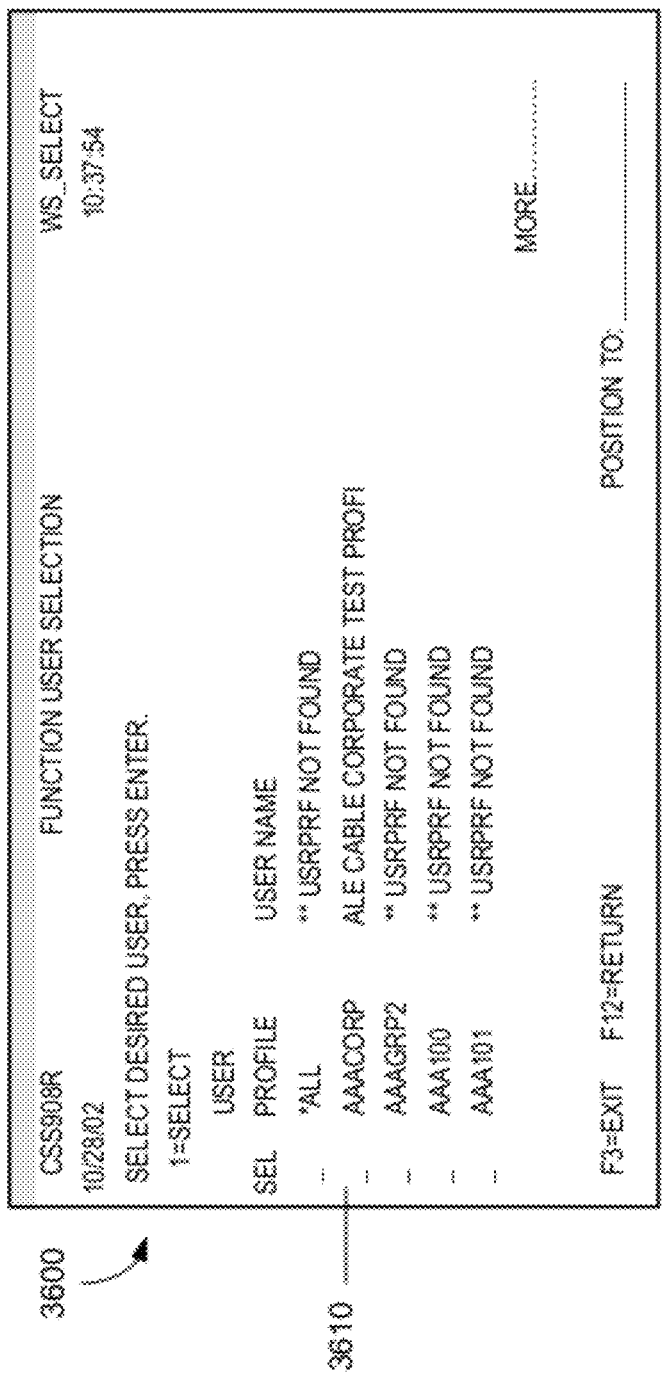
FIG. 36 shows the Function User Selection screen according to one embodiment.

FIG. 36 shows the Function User Selection screen 3600 according to one embodiment used to select authorized functions to be copied from one profile to another. The user will type a 1 in the Opt field 3610 for the profiles to be copied and press [Enter].

FIG. 37 shows the ICOMS Apply/Delete-MLUs screen 3700 according to one embodiment that displays a list of all locations and Site IDs that may be selected to allow access to the sites. The user has selected two locations by typing a 1 in the Sel column 3710. The user may then press a function key from the option menu 3720. For example, F10 will apply the selections to ICOMS.

Table 13 shows the functions and function keys for the ICOMS Apply/Delete-MLU screen along with a description.

TABLE 13

| Option/Function Key | Description |
| --- | --- |
| 1 = Select | Place a 1 by each desired location and press F22 . . . F10 is acceptable for SLUs. |
| 2 = MASTERC "Y" | This option allows for mass authorization of the Master Menu Access (Site Control Maintenance). Type a 2 next to all Site IDs that you want this MLU to have Master Menu Access and press F10. |
| 3 = MASTERC "N" | This option allows for mass restriction of the Master Menu Access (Site Control Maintenance). Type a 3 next to all Site IDs that you do not want this MLU to have Master Menu Access and press F10. |
| F3 = Exit | Takes you back to the previous menu. |
| F10 = Apply/Update | After you have made your selections, press F10 to apply the profile to the selected site IDs. |
| F12 = Cancel | Returns you to the previous screen. |
| F13 = Replicate | Replicates a field's value in all fields under the initial field. |
| F15 = Reset | Selects only the machine to which the profile has ICOMS access. Examines each site on each machine to determine if a user has been applied and in ICOMS for that site. If so, reset places a 1 in that field. Also, it deselects rest. |
| F18 = Site Maintenance | Takes you to the Site Control Maintenance screen. |
| F20 = Update CSSMULT | Updates CSSMULT file. The selected values will be retained. |
| F22 = Apply via DDM | This is the preferred method for MLU or MLGs. Applies a chosen selection, but it does not submit job. Allows the Apply process to take place a lot faster via DDM rather than by $AUTO. Note: If a machine is down this function will not execute. |
| F23 = Delete | Deletes all ICOMS security selected locations. |

FIG. 38 shows the CSS User Function screen 3800 according to one embodiment with a profile selected for SpyView Security. The user entered SV in the Opt column 3810 for the specific profile. The user may then press F14 (Apply) from the function key menu 3820 to access the Select System Access window (see FIG. 39).

Figure 39:
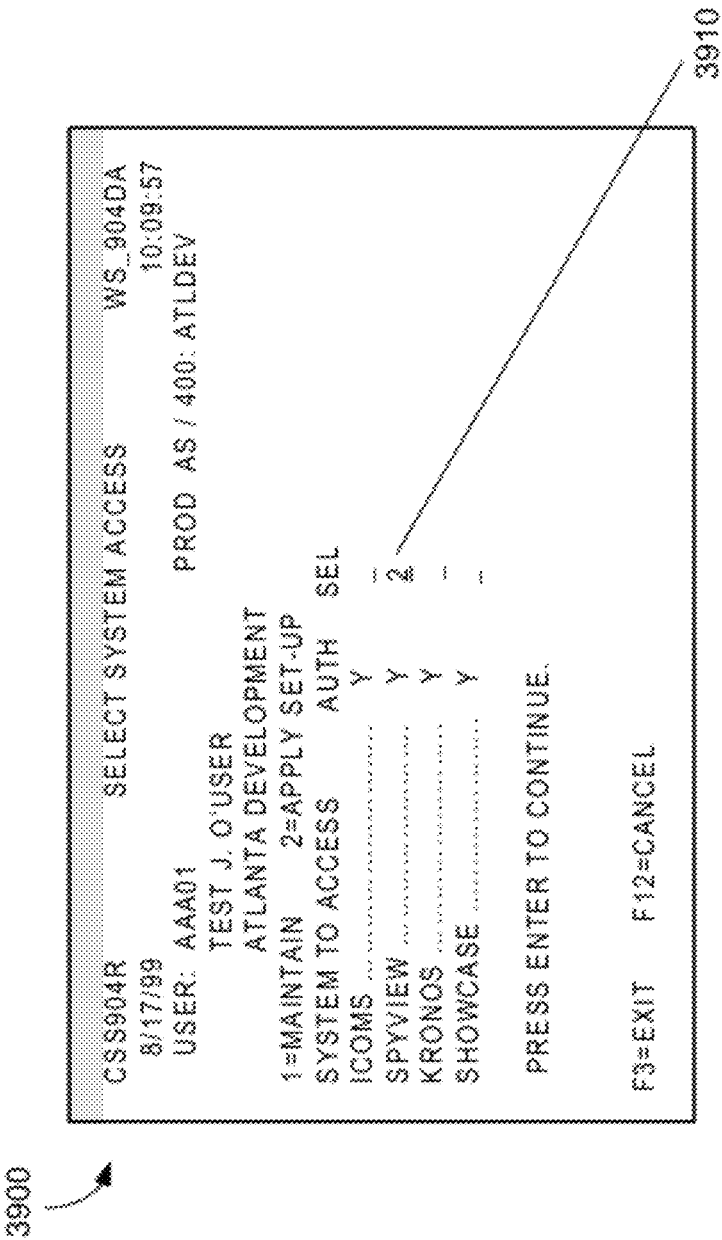
FIG. 39 shows the Select System Access window according to one embodiment.

FIG. 39 shows the Select System Access window 3900 according to one embodiment. Spyview was selected by typing a 2 in the Sel column 3910 and pressing [Enter]. This prompts the Apply User Set-Up Confirmation screen to appear for SpyView.

Figure 40:
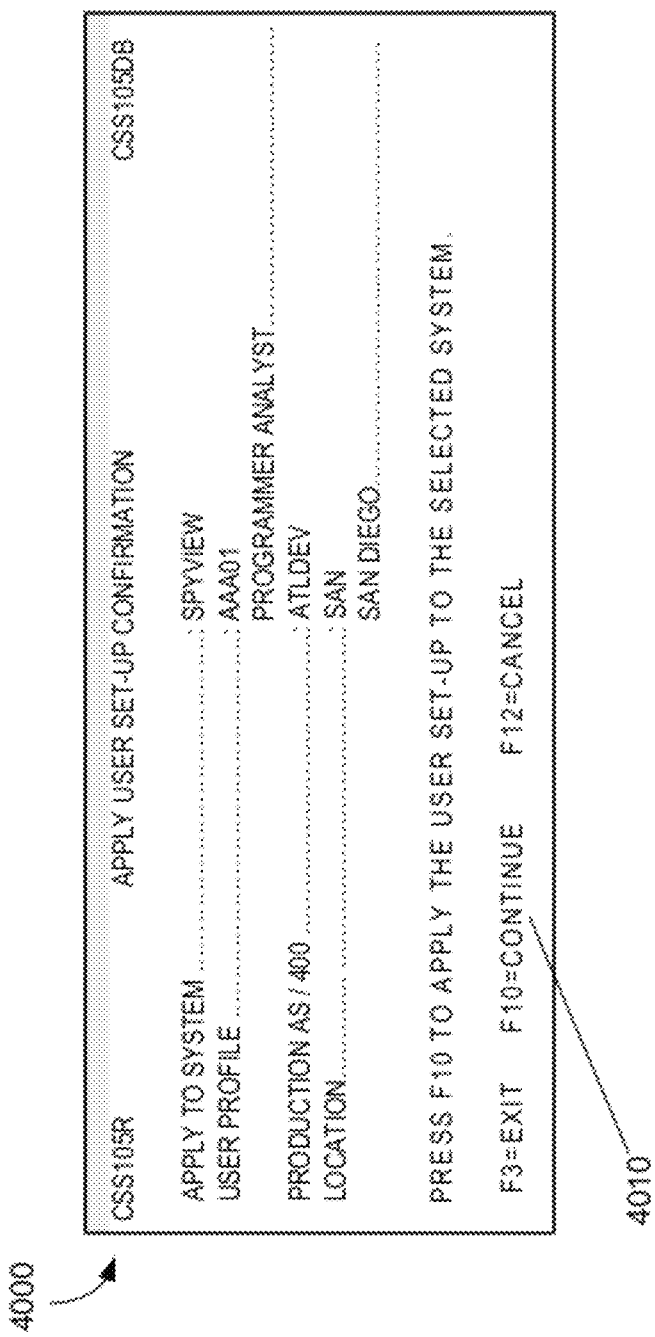
FIG. 40 shows the Apply User Set-Up Confirmation screen according to one embodiment.

FIG. 40 shows the Apply User Set-Up Confirmation screen 4000 according to one embodiment. To apply the user set-up to the selected system, the user will press the F10 function key from the menu 4010.

FIG. 41 shows the SpyView Subscriber List Selection screen 4100 according to one embodiment which completes the process for applying Spyview Security on the corporate machine. The user will select the desired subscriber list by typing a 1 in the Sel column 4110 and then press F10 from the function key options 4120 to update the file.

FIGS. 42-46 shows the various screens used to apply Kronos Security to user profiles. FIG. 42 shows the CSS User Function screen 4200 according to one embodiment with a profile selected for Kronos Security. The user entered KR in the Opt column 4210 for the specific profile. The user may then press F14 from the function key menu 4220 to access the Apply User Set-Up Confirmation screen (see FIG. 40) for Kronos.

Figure 43:
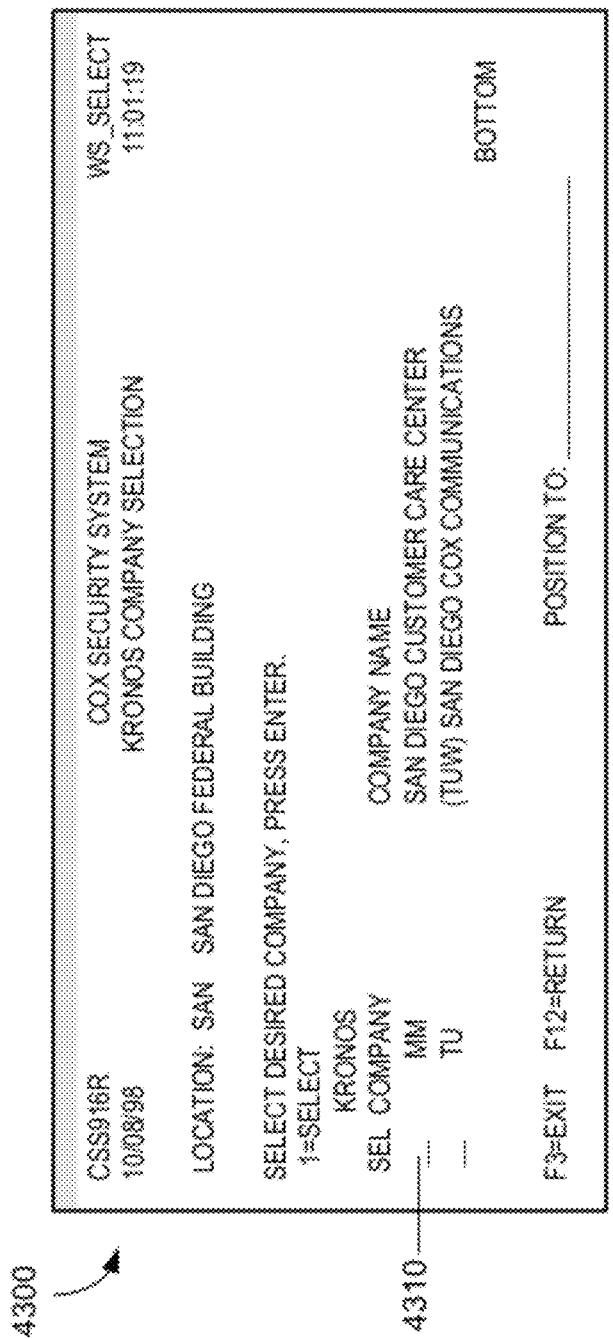
FIG. 43 shows the Kronos Company Selection screen according to one embodiment.

FIG. 43 shows the Kronos Company Selection screen 4300 according to one embodiment that is accessed if the Kronos Company has multiple locations. The user will type 1 on the desired selection line 4310 and press [Enter] to access the Kronos Template Selection (see FIG. 44).

Figure 44:
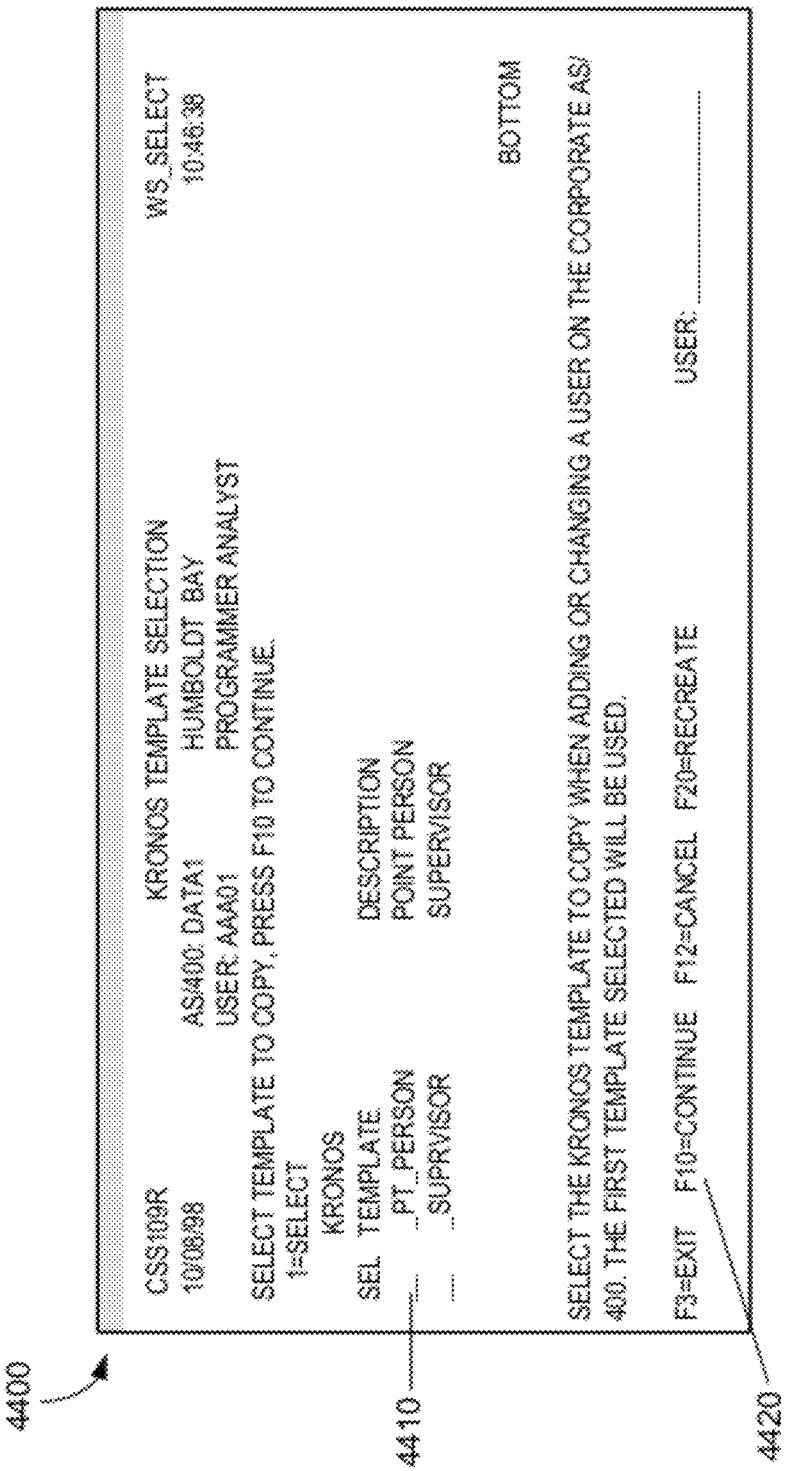
FIG. 44 shows the Kronos Template Selection screen according to one embodiment.

FIG. 44 shows the Kronos Template Selection screen 4400 according to one embodiment. Select a template to copy by typing a 1 in the Sel field 4410 and then pressing F10. The program then links with the Kronos files on the corporate machine (ATL). It copies the Kronos template to a new profile as seen in the User ID field on the Kronos Timekeeper screen.

Figure 45:
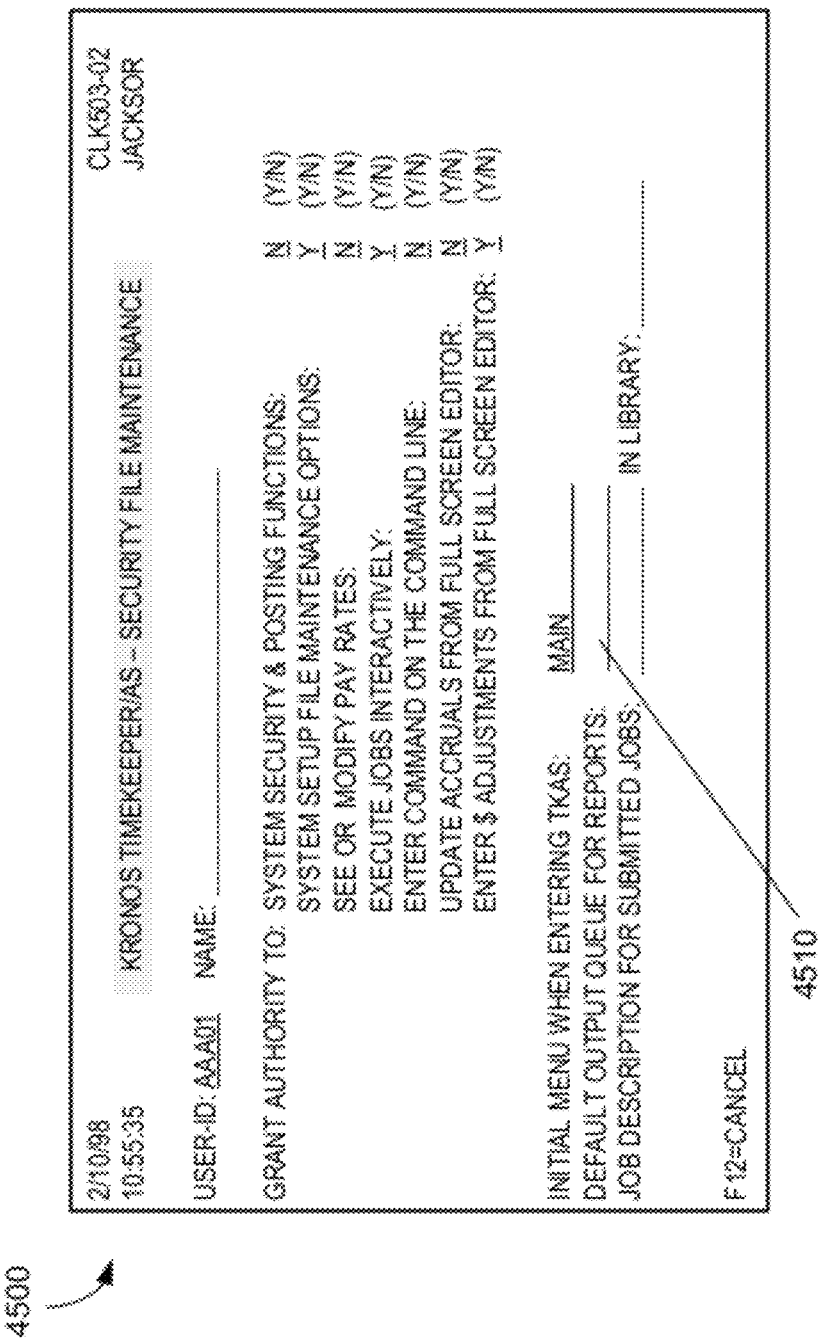
FIG. 45 shows the Kronos Timekeeper/AS screen according to one embodiment.

FIG. 45 shows the Kronos Timekeeper/AS screen 4500 according to one embodiment. The user may type 1 in the Default Output Queue for Reports Field 4510 and press [Enter] to refresh the screen with the Security File Maintenance fields (see FIG. 46).

FIG. 46 shows the Kronos Timekeeper/AS-Security File Maintenance screen 4600 according to one embodiment which allows the user to select access to specific Departments and Supervisors. The fields to enter specific departments and supervisors are promptable fields 4610 by using the F4 function key. The user may enter a Y in the Access to all Departments field 4620 or the Access to all Supervisors field 4630 for total access.

Figure 47:
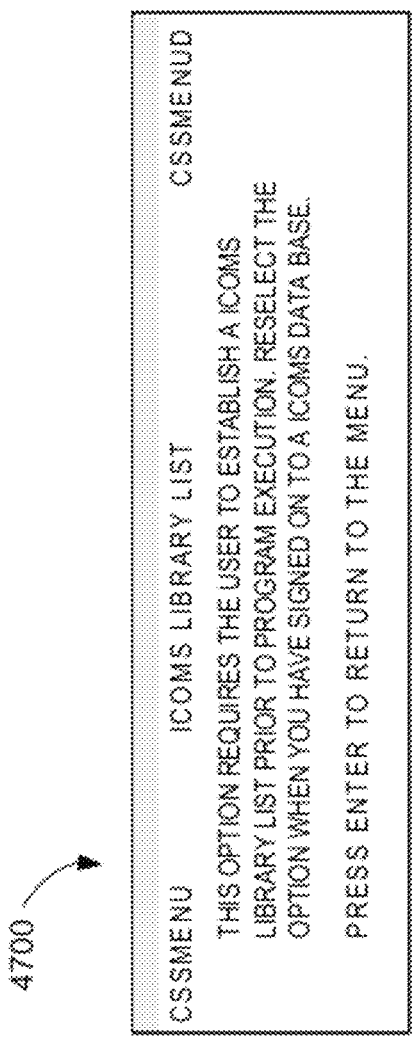
FIG. 47 shows the File Open Error Window according to one embodiment.

FIGS. 47-50 shows the Job Control screens used to verify that jobs sent from one machine to another were actually received and properly completed. Job Control is accessed by typing 5 (Job Control) in the Enter Option field on the CSS Main Menu (see FIG. 3) or use F18 (Job Control) from the User Functions screen (see FIG. 4). It provides a complete history of all job transactions, local or remote. FIG. 47 shows the File Open Error Window 4700 according to one embodiment that appears if the requester has not established an ICOMS library list.

FIG. 48 shows the Job Control Maintenance Select Filters screen 4800 according to one embodiment. The user will enter data into the appropriate fields 4810 and press [Enter]. The Job Control Maintenance/Job Selection screen (see FIG. 49) by Job Control number appears. The user may also choose from the function key menu list 4820. Table 14 describes the fields to be entered and function keys options for the Job Control Maintenance Select Filters window.

TABLE 14

| Option/Function Key | Description |
| --- | --- |
| From Submit Date/Time | The job start date/time of desired date range. |
| To Submit Date/Time | The job end date/time of desired date range. |
| Status Codes Status codes appear to the left of the requestor in new. | *ALL = Show all status codes (default) *RMT = Show all remote status codes (Submitted, Resent & Complete) *INC (*CRP) = Shows all incomplete status codes (Submitted & Resent) L = Local Update D = DDM Update S = Sent but not complete R = Resent: to send again C = Complete A = Archived to the archive jobs |
| Requester | Allows you to filter by requester name. |
| User profile or generic | To search for a specific profile or generic search (e.g., ORG*). |
| Location | Allows you to filter by location name if not restricted. |
| From AS/400 | Promptable field. Allows you to filter by AS/400 |
| To AS/400 | Promptable field. Allows you to filter by AS/400 to see jobs sent from one machine to another. |
| From Control Number | Defaults to 1. This establishes the start number for the control number range. |
| To Control Number | Defaults to 999999999. Can be changed to any number less than this value. This establishes the end number for the control number range. |
| Description contains . . . | Further filtering by including a character string. |
| F3 = Exit | Takes you back to the previous screen. |
| F4 = Prompt | Takes you to a selection pop-up window. |
| F12 = Cancel | Returns you to the previous screen. |
| F15 = Job Ctl Msgs | Specify by control number to retrieve messages. |
| F20 = All Incomplete | Lists all incomplete jobs. |

FIGS. 49-50 show the Job Control Maintenance screen sorted two different ways. Once the user has completed the Job Control Maintenance fields (see FIG. 48), jobs can be displayed by Job Control number or by Requester Sequence. FIG. 49 shows the Job Control Maintenance/Job Selection screen 4900 according to one embodiment displayed by Job Control number. The user may enter an option number in the Opt field column 4910 selected from the options menu 4920 and press [enter]. The user may also choose to press a function key from the options 4930.

FIG. 50 shows the Job Control Maintenance/Job Selection screen 5000 according to one embodiment displayed by Requester Sequence. The user may enter an option number in the Opt field column 5010 selected from the options menu 5020 and press [Enter]. The user may also choose to press a function key from the options 5030.

Table 15 lists and describes the Job Control Maintenance screen options and function keys.

TABLE 15

| Option/Function Key | Description |
| --- | --- |
| 1 = Resend | Resends incomplete jobs. |
| 6 = $Auto Msgs | Produces a report and prints them in the default output queue. |
| 7 = Requester Msgs | Prints messages sent back to the requester as to why a particular job or request failed. This option produces a report and prints them in the default output queue. |
| F3 = Exit | Takes you back to the previous screen. |
| C = Flag Complete | If a job is completed, put a C in the Opt field. |
| F5 = Refresh | Repaints current screen with information last saved. |

TABLE 15-continued

| Option/Function Key | Description |
| --- | --- |
| F8 = Req Seq/Job Seq | Toggles between requester and job control number sequence. |
| F12 = Cancel | Cancels the information input for the current job control and returns you to the previous screen. |
| F13 = Replicate | Replicates the value in all fields under initial field. |
| F14 = Show Date/Show AS/400's | Toggles between the job submitted date and time versus showing the AS/400's on the right columns. |
| F15 = Filter | Set viewing limits for each parameter listed. |
| F16 = Print | Prints the job list as set in the filters. |
| F19 = Fold/Unfold | Allows additional job control information viewing. |
| F23 = Archive Completed | Stores the current job control information. |
| F24 = Parameter Toggle | Shows the right or left hand parameters not visible on the current screen. |

Figure 51:
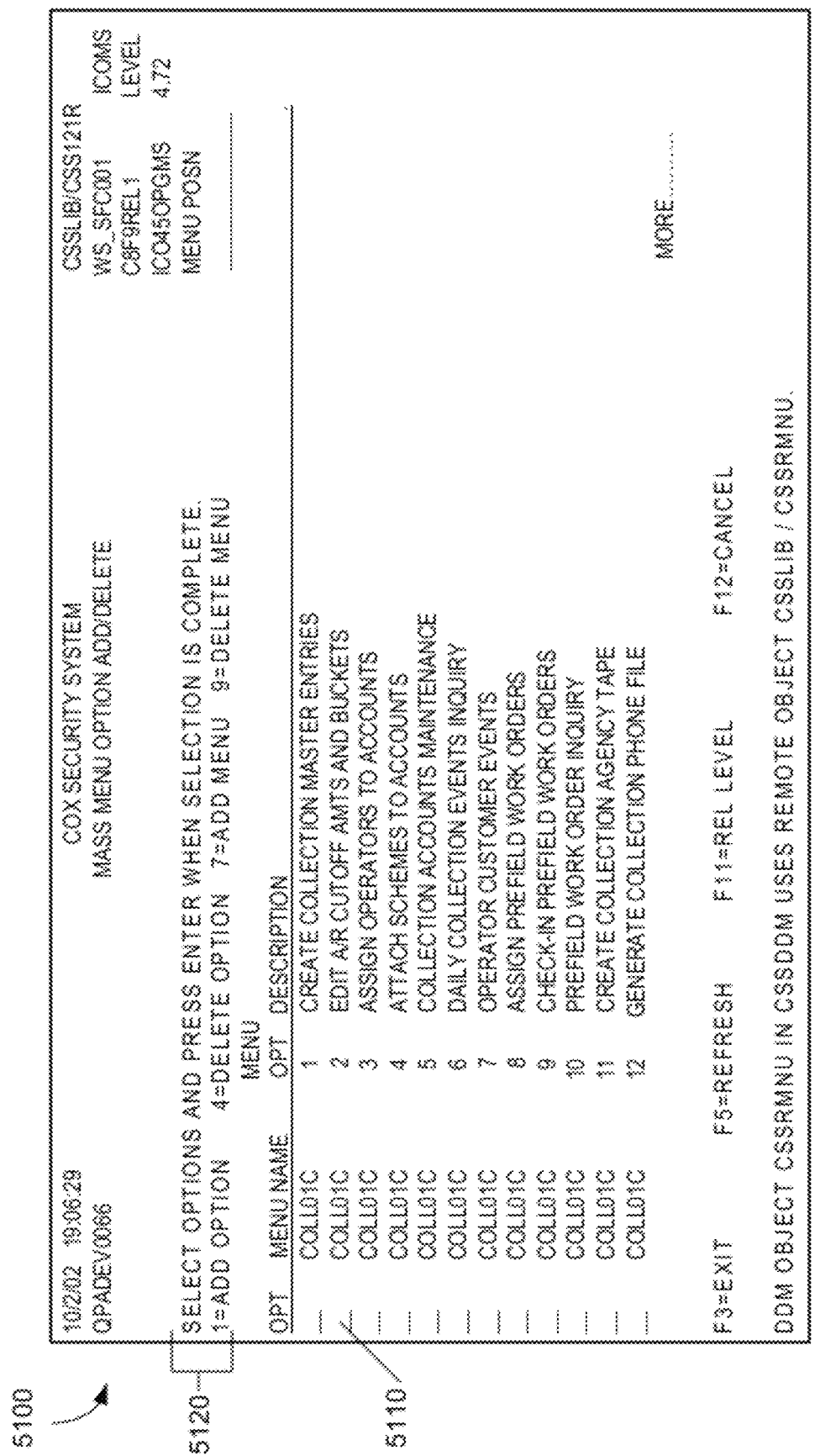
FIG. 51 shows the Mass Menu Option Add/Delete screen according to one embodiment.

FIG. 51 shows the Mass Menu Option Add/Delete screen 5100 according to one embodiment that allows the users to add or delete menu options to/from several users at one time rather than having to update the individual users one by one. The Mass menu Option Add/Delete screen is accessed from the CSS Main Menu (see FIG. 1) by selecting option 9. The screen displays all options valid for ICOMS and Cox Extensions Menu Selections. The user will enter a option in the Opt field 5110 of any of the menus from the Option selection 5120 and press [Enter].

Figure 52:
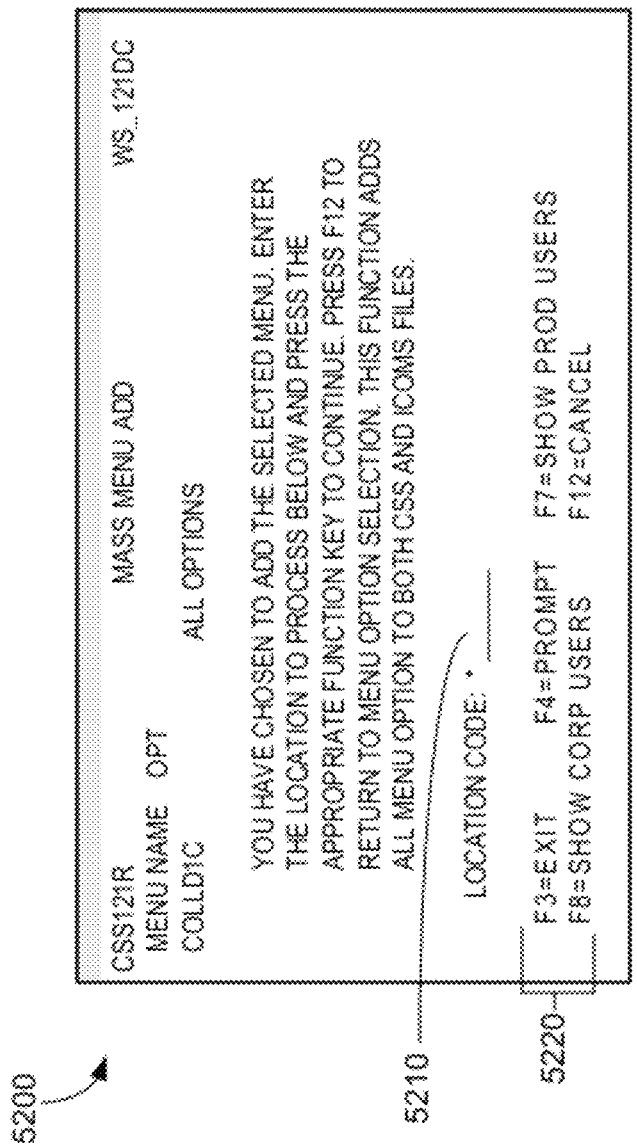
FIG. 52 shows the Mass Menu Add screen according to one embodiment.

FIG. 52 shows the Mass Menu Add screen 5200 according to one embodiment which will add an entire Mass menu to user or group profiles. This screen is accessed from the Mass Menu Option Add/Delete (see FIG. 51) by typing 7 in the Opt field of any of the menus. The user may place the cursor in the Location Code field 5210 and press F4 from the Function key menu selections 5220 to prompt the Location Selection screen (see FIG. 60) to open in order to choose the locations to add.

FIG. 53 shows the Mass Menu ADD Group Selection screen 5300 according to one embodiment that displays a list of profiles for selection to add to another group. To select a profile to add to another group, enter a 1 in the Opt field line 5310. To select all users, press the F18 function key from the menu options 5320. The user will then press the F10 function key to add the profile to another group. The users may also print the subfile by selecting the profile and pressing F16 from the function key menu options 5320.

Figure 54:
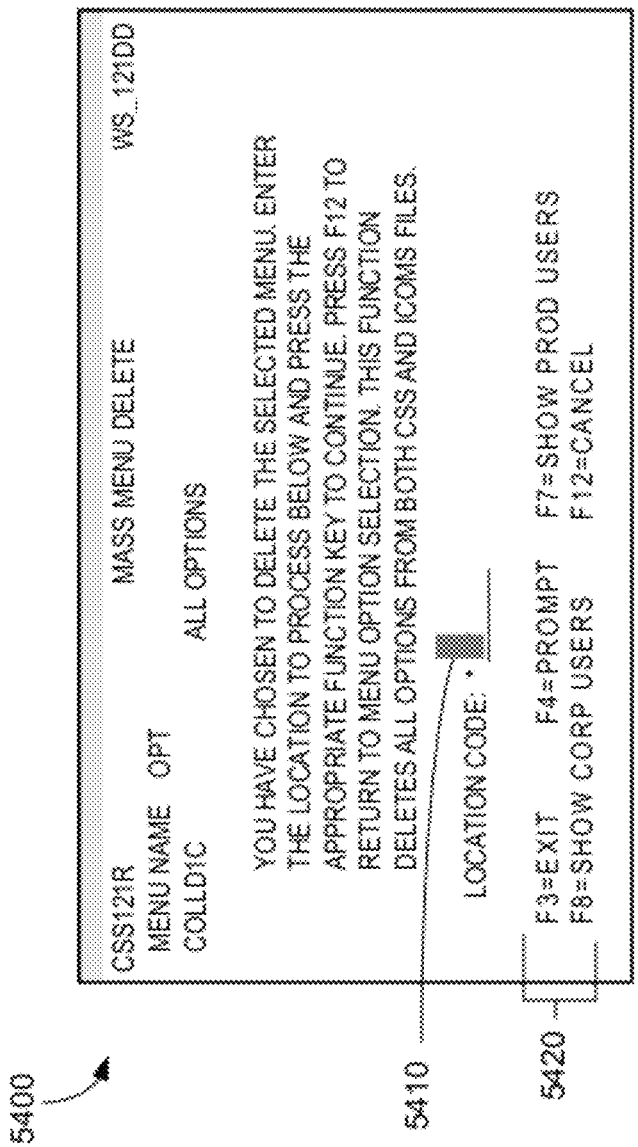
FIG. 54 shows the Mass Menu Delete screen according to one embodiment.

FIG. 54 shows the Mass Menu Delete screen 5400 according to one embodiment which will delete an entire Mass Menu from user or group profiles. This screen is accessed from the Mass Menu Option Add/Delete (see FIG. 51) by typing 9 in the Opt field of the menu to be deleted and pressing [Enter]. The user may place the cursor in the Location Code field 5410 and press F4 from the Function key menu selections 5420 to prompt the Location Selection screen (see FIG. 60) to open in order to choose the locations to delete.

Figure 55:
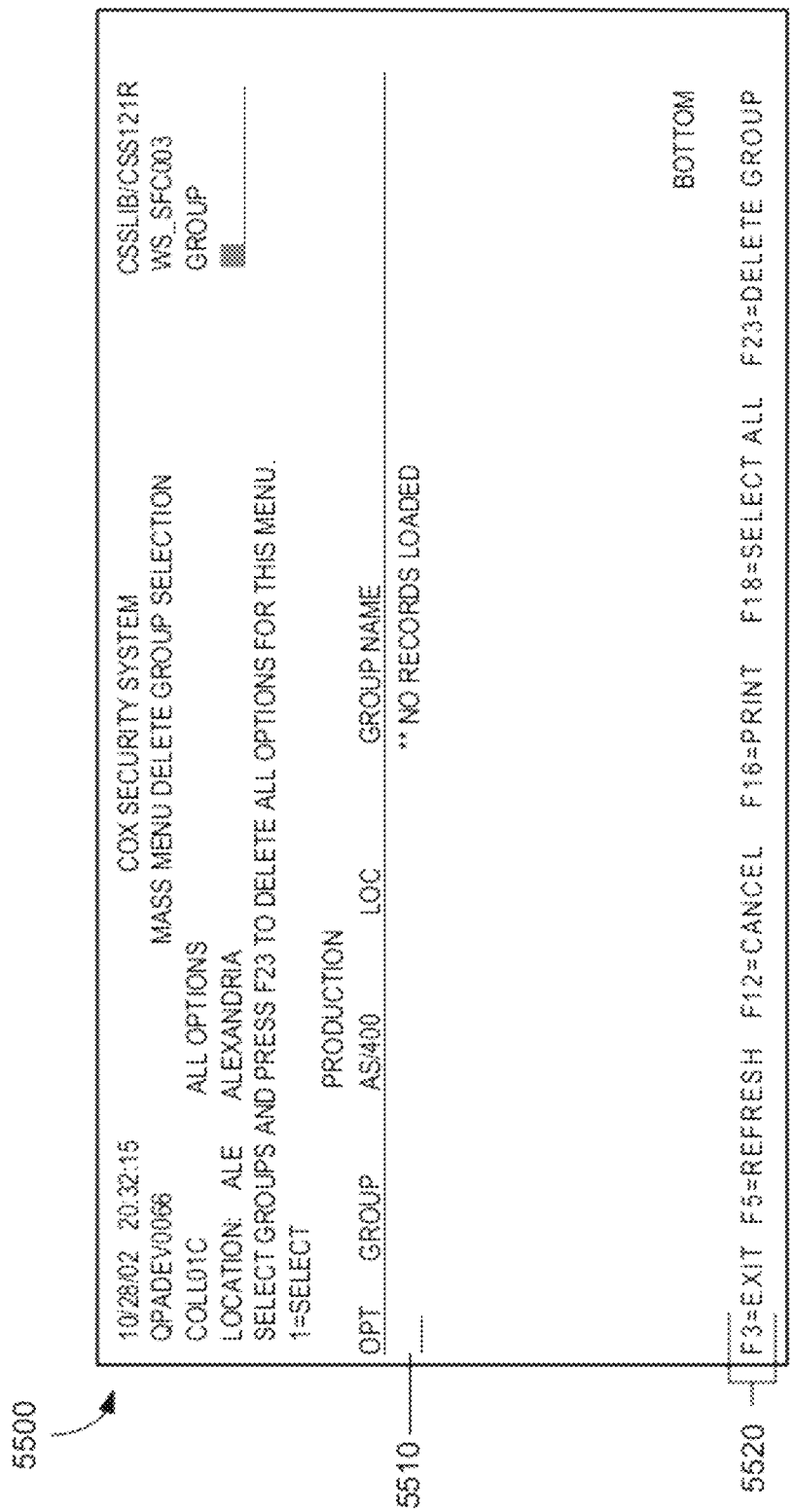
FIG. 55 shows the Mass Menu DELETE Group Selection screen according to one embodiment.

FIG. 55 shows the Mass Menu DELETE Group Selection screen 5500 according to one embodiment that displays a list of group profiles to delete. To delete a profile from a group, enter a 1 to select the profile in the Opt field line 5510. To select all users, press the F18 function key from the menu options 5520. The user will then press the F23 function key to delete the group. The users may also print the subfile by selecting the profile and pressing F16 from the function key menu 5520.

Figure 56:
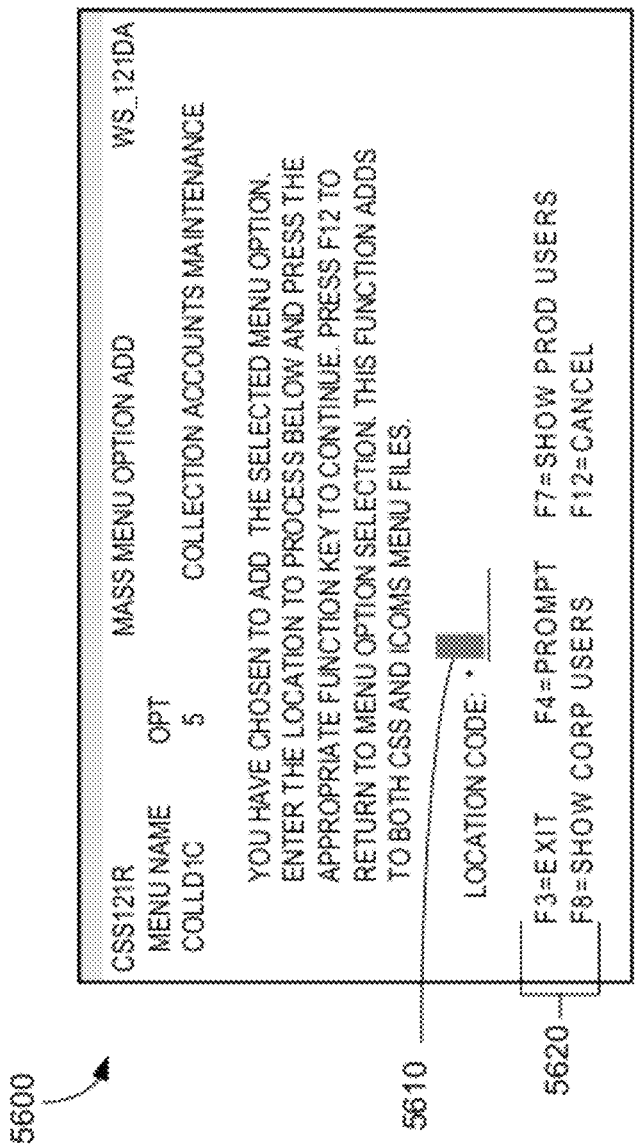
FIG. 56 shows the Mass Menu Option Add screen according to one embodiment.

FIG. 56 shows the Mass Menu Option Add screen 5600 according to one embodiment which will add an entire Mass menu to user or group profiles. This screen is accessed from the Mass Menu Option Add/Delete (see FIG. 51) by typing 1 in the Opt field of any of the menus. The user may place the cursor in the Location Code field 5610 and press F4 from the Function key menu selections 5220 to prompt the Location Selection screen (see FIG. 60) to open in order to choose the locations to add.

FIG. 57 shows the Mass Menu Option ADD Group Selection screen 5700 according to one embodiment that displays users or groups to add to another group. To add a profile to a group, enter a 1 for select in the Opt field line 5710. To select all users, press the F18 function key. The user will then press the F10 function key to add the group. The users may also print the subfile by selecting the profile and pressing F16 (Print) from the function key menu 5720.

Figure 58:
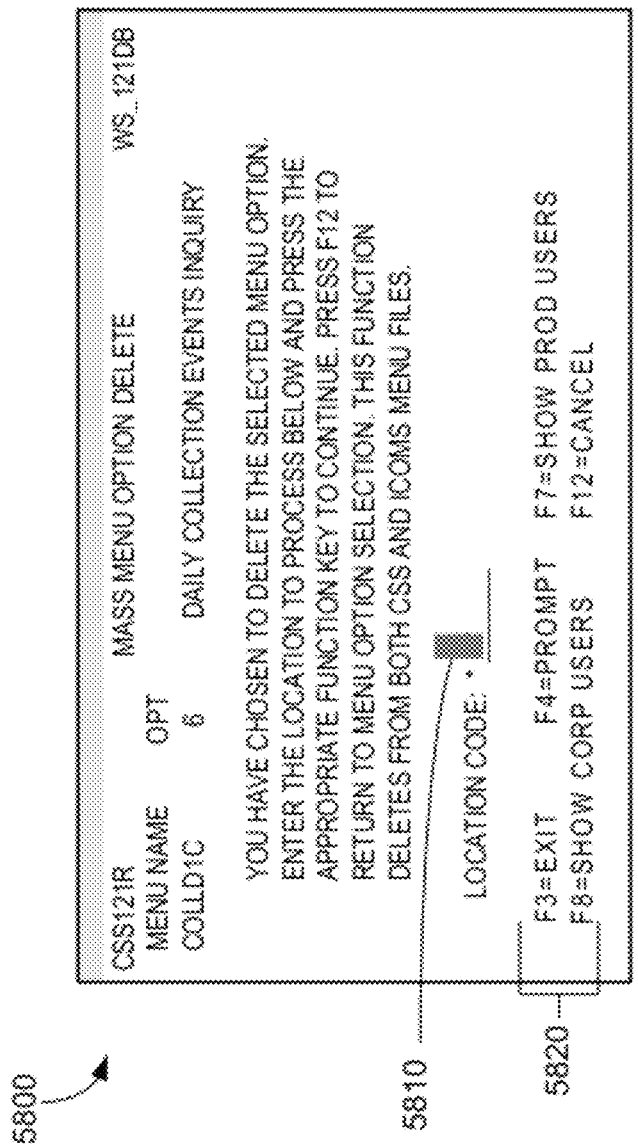
FIG. 58 shows the Mass Menu Option Delete screen according to one embodiment.

FIG. 58 shows the Mass Menu Option Delete screen 5800 according to one embodiment which will delete an entire Mass Menu from user or group profiles. This screen is accessed from the Mass Menu Option Add/Delete (see FIG. 51) by typing 4 in the Opt field of the menu to be deleted and pressing [Enter]. The user may place the cursor in the Location Code field 5810 and press F4 from the Function key menu selections 5820 to prompt the Location Selection screen (see FIG. 60) to open in order to choose the locations to delete.

Figure 59:
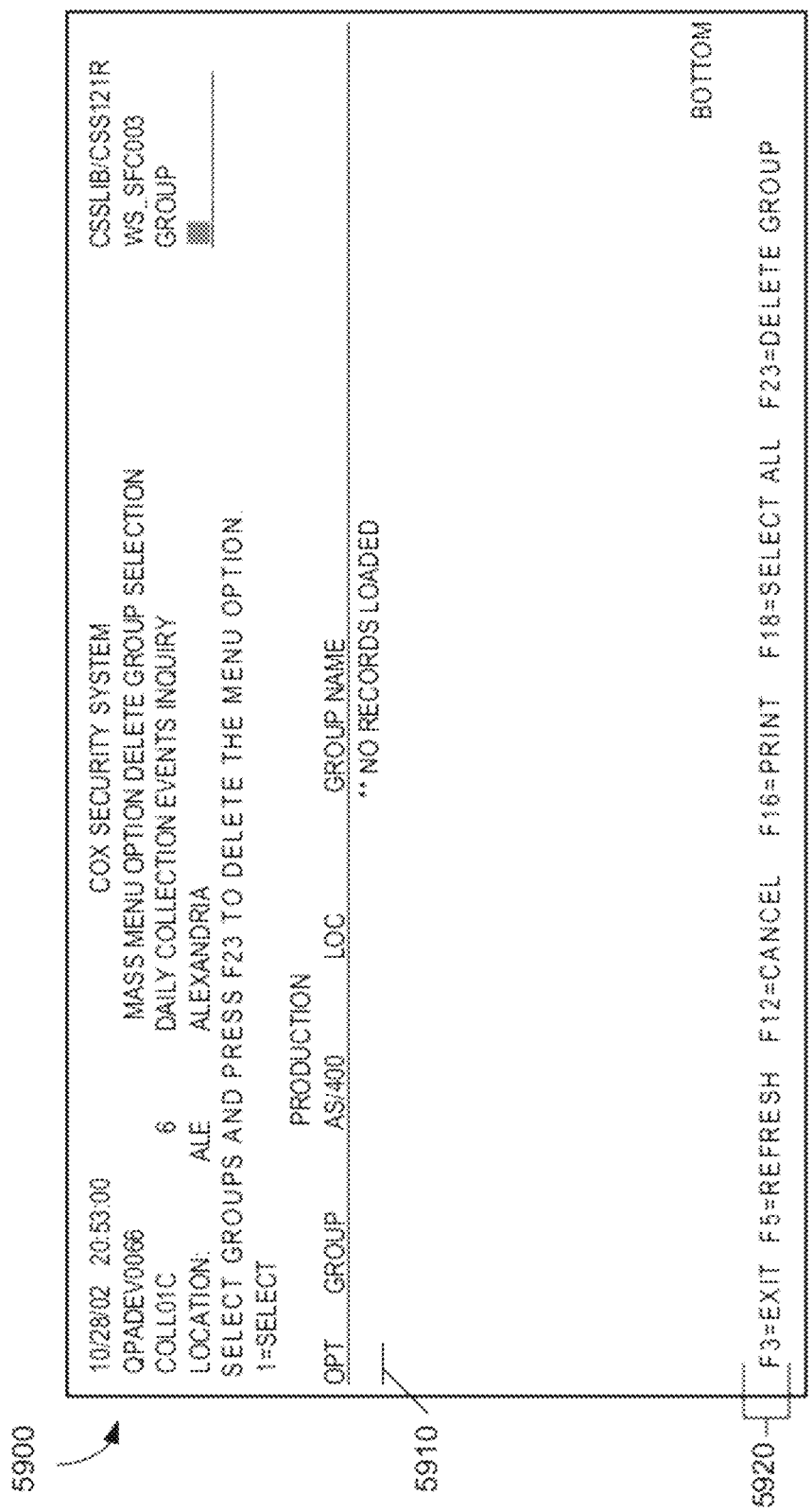
FIG. 59 shows the Mass Menu Option DELETE Group Selection screen according to one embodiment.

FIG. 59 shows the Mass Menu Option DELETE Group Selection screen 5900 according to one embodiment that displays users or groups to delete. To delete a profile from a group, enter a 1 for select in the Opt field line 5910. To select all users, press the F18 function key. The user will then press the F23 function key to delete the group. The users may also print the subfile by selecting the profile and pressing F16 (Print) from the function key menu 5920.

Figure 60:
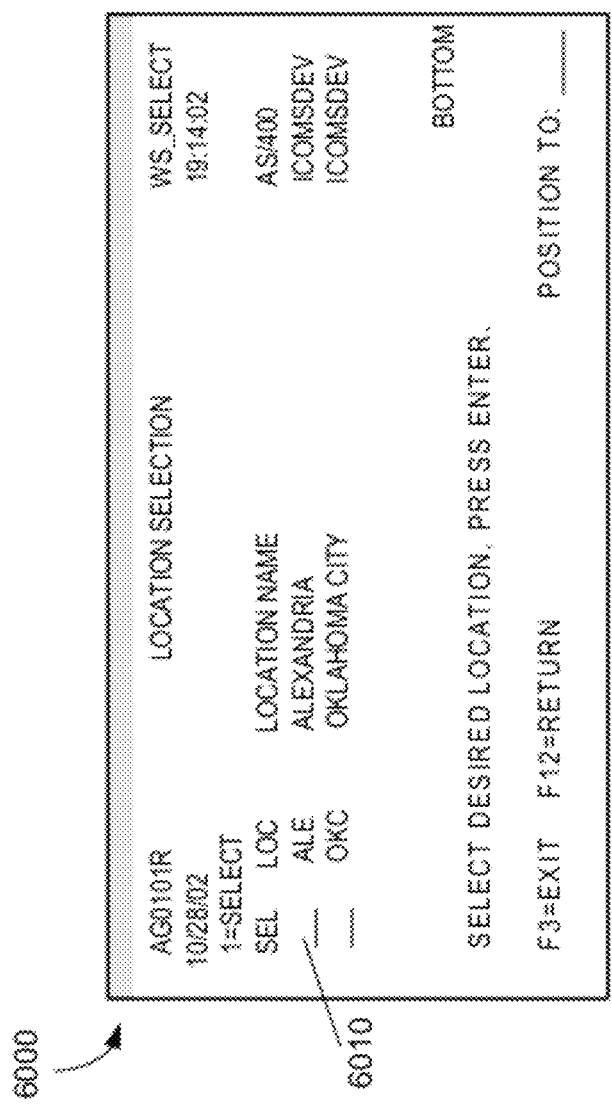
FIG. 60 shows the Location Selection screen according to one embodiment.

FIG. 60 shows the Location Selection screen 6000 according to one embodiment. The user will type 1 to select the locations to add and press [Enter] to return to the screen from which it was prompted.

FIG. 61 shows the Mass Function Option Add/Delete screen 6100 according to one embodiment that allows the user to add or delete functions to/from several users at one time rather than having to update the individual users one by one. The Mass Function Option Add/Delete screen 6100 is accessed from the CSS Main Menu (see FIG. 1) by selecting option 12. The screen displays all the options valid for the ICOMS Mass Functions file. The user will enter an option number in the Opt field 6110 from the Option selections 6120 and press [Enter]. For example, to add an entire Mass Function the user will type a 7 in the Opt field 6110 of any of the menus. The user will then enter the new function in the Char Value field 6130 and press [Enter] to display the Mass Function Add screen (see FIG. 62).

Figure 62:
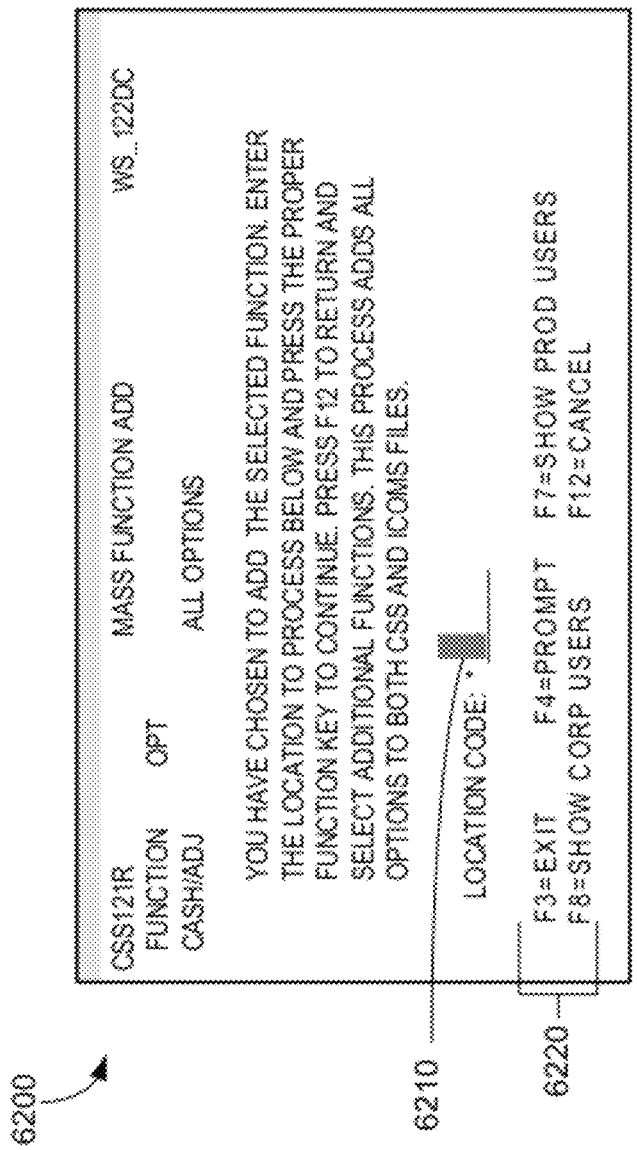
FIG. 62 shows the Mass Function Add screen 6200 according to one embodiment.

FIG. 62 shows the Mass Function Add screen 6200 according to one embodiment which will add the selected function. The user may place the cursor in the Location Code field 6210 and press F4 from the Function key menu selections 6220 to prompt the Location Selection screen (see FIG. 60) to open in order to choose the locations to add.

FIG. 63 shows the Mass Function ADD Group Selection screen 6300 according to one embodiment that displays a list of group profiles for selection to add to another group. To add a profile to a group, enter a 1 in the Opt field line 6310 to select the group. To select all groups, press the F18 function key from the menu 6320. The user will then press the F10 function key to add the group. The users may also print the subfile by selecting the group profile and pressing F16 from the function key menu 6320.

Figure 64:
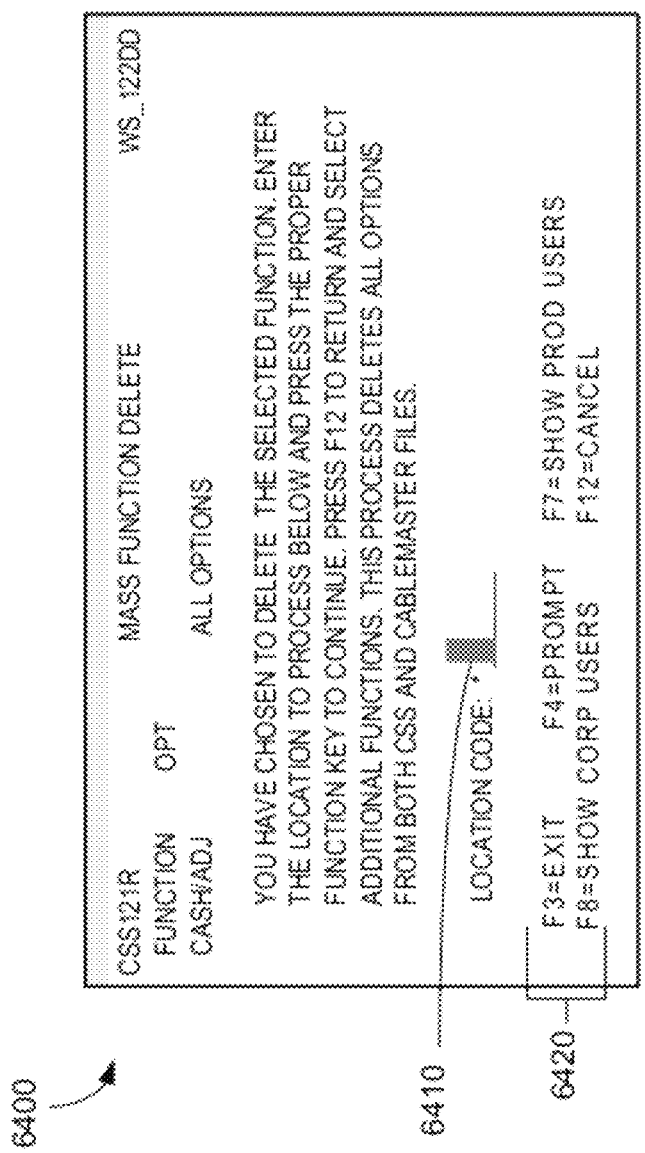
FIG. 64 shows the Mass Function Delete screen according to one embodiment.

FIG. 64 shows the Mass Function Delete screen 6400 according to one embodiment which will delete an entire Mass Function from user or group profiles. This screen is accessed from the Mass Menu Option Add/Delete (see FIG. 61) by typing 9 in the Opt field of the menu to be deleted and pressing [Enter]. The user may place the cursor in the Location Code field 6410 and press F4 from the Function key menu selections 6420 to prompt the Location Selection screen (see FIG. 60) to open in order to choose the locations to delete.

Figure 65:
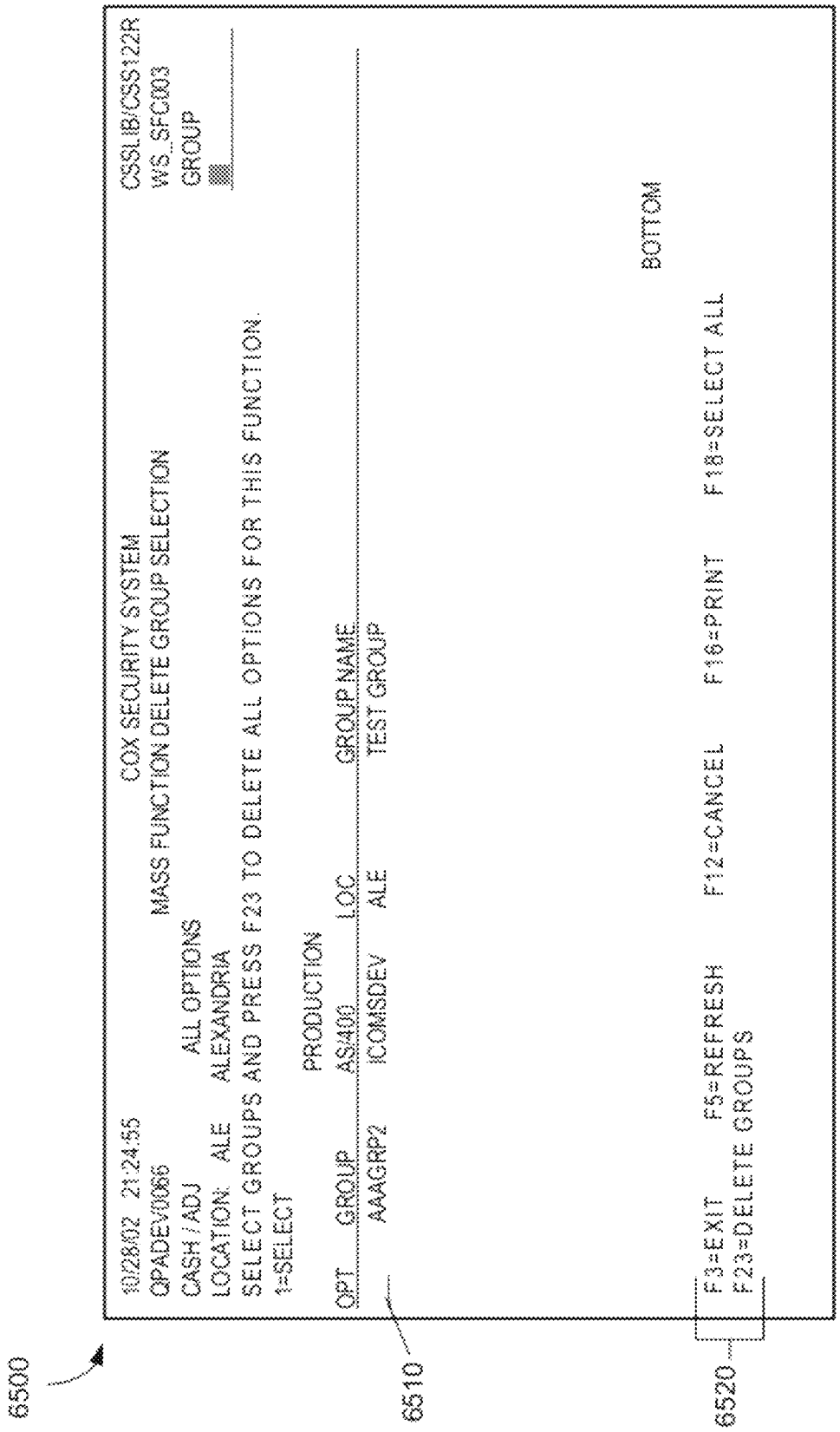
FIG. 65 shows the Mass Function DELETE Group Selection screen according to one embodiment.

FIG. 65 shows the Mass Function DELETE Group Selection screen 6500 according to one embodiment that displays user or group profiles to delete. To delete a profile from a group, enter a 1 select in the Opt field line 6510 to select the group. To select all groups, press the F18 function key from the function key menu 6520. The user will then press the F23 function key from the menu 6520 to delete the group. The user may also print the subfile by selecting the group profile and pressing F16 from the function key menu 6520.

Figure 66:
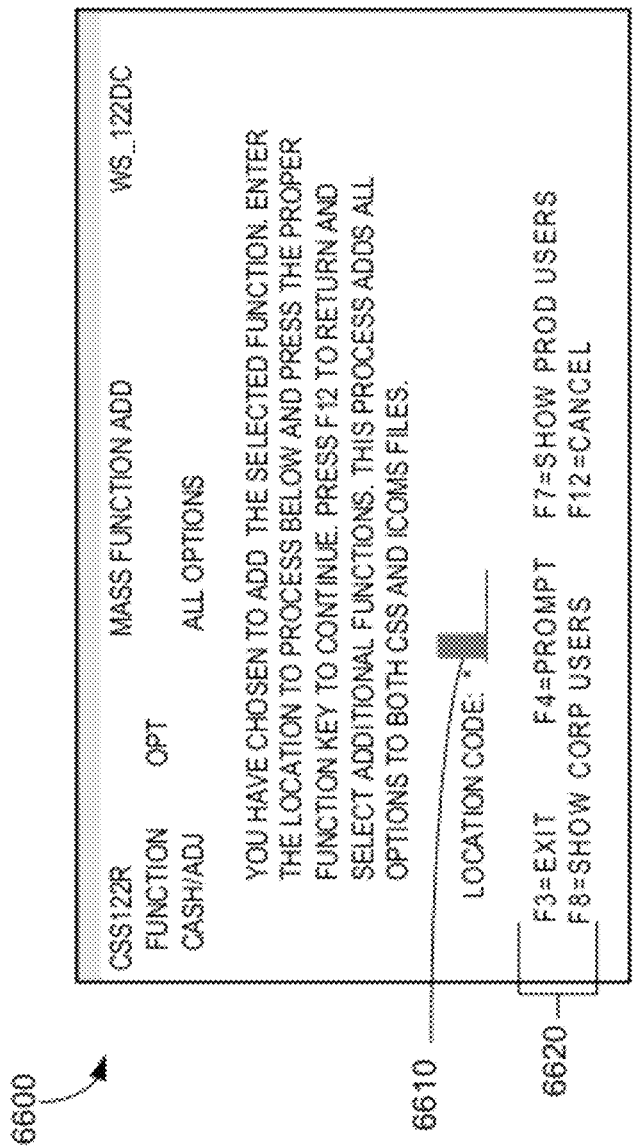
FIG. 66 shows the Mass Function Option Add screen according to one embodiment.

FIG. 66 shows the Mass Function Option Add screen 6600 according to one embodiment which will add a Function Option to user or group profiles. This screen is accessed from the Mass Menu Option Add/Delete (see FIG. 61) by typing 1 in the Opt field of any of the menus. The user may place the cursor in the Location Code field 6610 and press F4 from the Function key menu selections 6620 to prompt the Location Selection screen (see FIG. 60) to open in order to choose the locations to add.

FIG. 67 shows the Mass Auth Opt ADD Group Selection screen 6700 according to one embodiment that displays users or groups that do not have the function in question. This screen is displayed when the user chooses the F7 or F8 function key from the Mass Function ADD screen (see FIG. 66). To add a profile to a group, enter a 1 in the Opt field line 5710 to select the profile. To select all users, press the F18 function key. The user will then press the F10 function key to add the group. The users may also print the subfile by selecting the profile and pressing F16 (Print) from the function key menu 6720.

Figure 68:
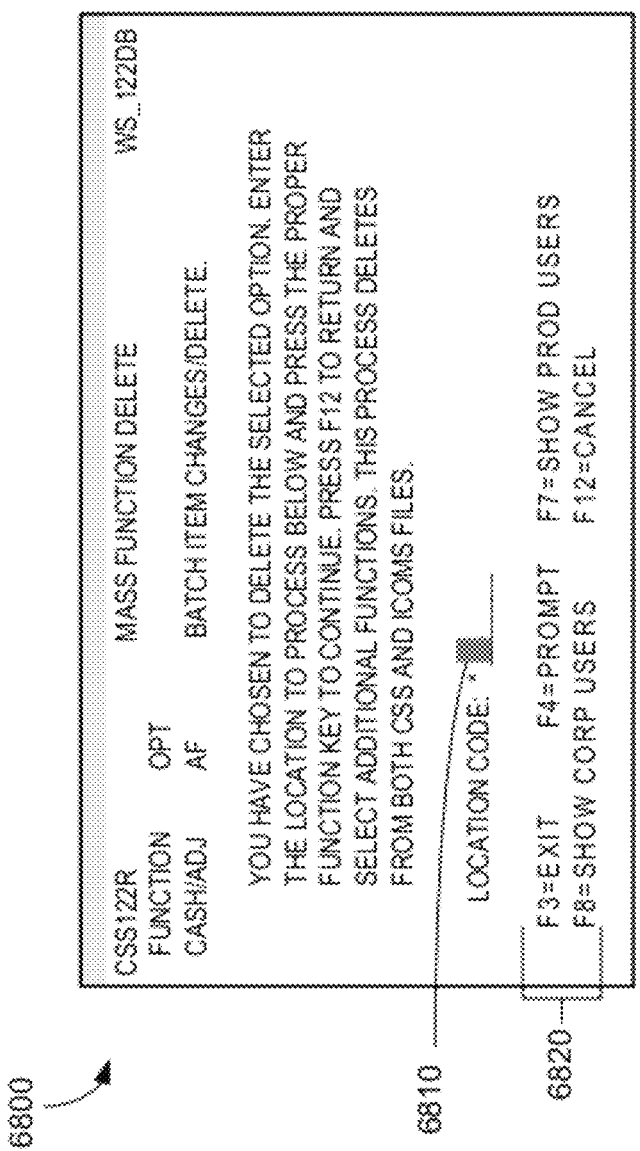
FIG. 68 shows the Mass Function Option Delete screen according to one embodiment.

FIG. 68 shows the Mass Function Option Delete screen 6800 according to one embodiment which will delete an entire Mass Menu from user or group profiles. This screen is accessed from the Mass Function Option Add/Delete (see FIG. 61) by typing 9 in the Opt field of the menu to be deleted and pressing [Enter]. The user may place the cursor in the Location Code field 5810 and press F4 from the Function key menu selections 6820 to prompt the Location Selection screen (see FIG. 60) to open in order to choose the locations to delete.

FIG. 69 shows the Mass Function Add/Delete screen 6900 according to one embodiment with an override code of three values added to a function. The override code '123' is entered in the Char. Value field 6910.

Figure 70:
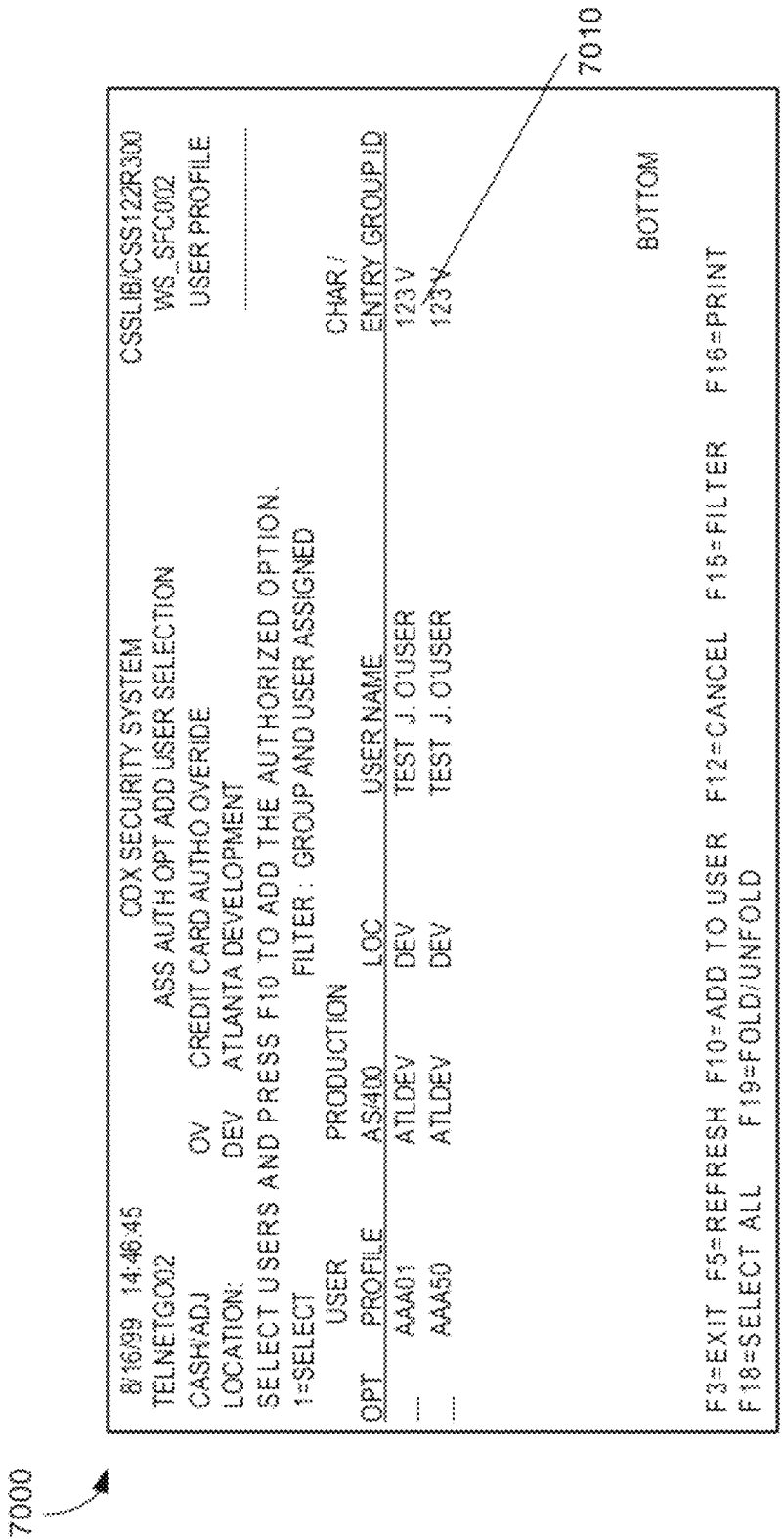
FIG. 70 shows the Mass Auth Opt ADD User Selection screen with the three value override code displayed.

FIG. 70 shows the Mass Auth Opt ADD User Selection screen 7000 with the three value override code displayed. The three values '123' are displayed in the Char/Entry field 7010.

FIG. 71 shows the Mass Function Add/Delete screen 7100 according to one embodiment with an override code of more than three values. He override code is entered in the Char. Value field 7110.

FIG. 72 shows the Mass Auth Opt ADD User Selection screen 7200 with the override code of more than three values displayed. Only two characters with a plus sign, +, are displayed in the Char/Entry field 7210 to indicate there are more than three values.

FIG. 73 shows the Selection Filter screen 7300 according to one embodiment. The user will type the desired Selection Filter number 7310 and press [Enter].

Figure 74:
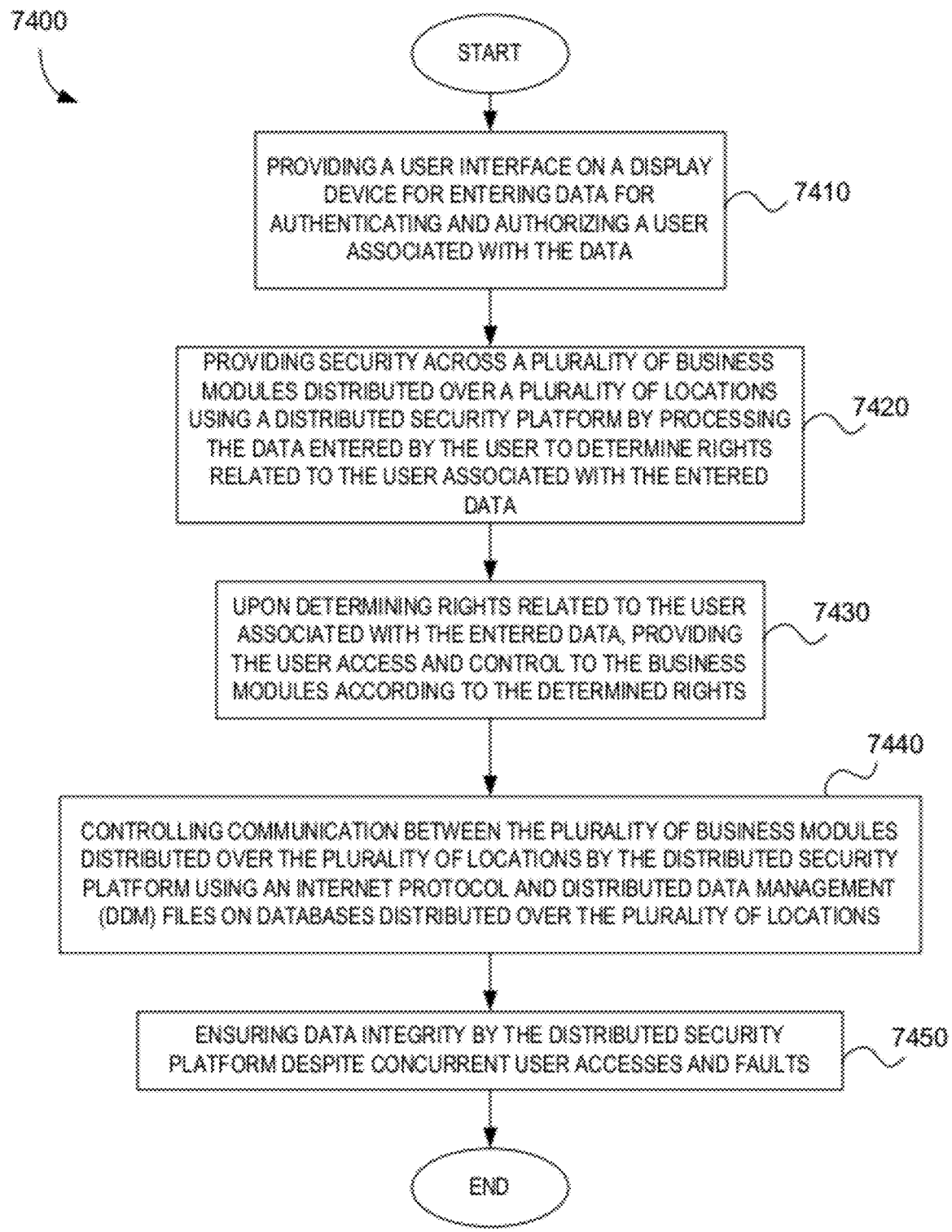
FIG. 74 is a flow chart of a method for securing business systems accessed by a plurality of users over a plurality of locations according to an embodiment of the invention.

FIG. 74 is a flow chart 7400 of a method for securing business systems accessed by a plurality of users over a plurality of locations according to an embodiment of the invention. In FIG. 74, a user interface is provided on a display device for entering data for authenticating and authorizing a user associated with the data 7410. Security across a plurality of business modules distributed over a plurality of locations is provided using a distributed security platform by processing the data entered by the user to determine rights related to the user associated with the entered data 7420. Upon determining rights related to the user associated with the entered data, the user is provided access and control to the business modules according to the determined rights 7430.

Communication between the plurality of business modules distributed over the plurality of locations by the distributed security platform using an Internet Protocol and distributed data management (DDM) files on databases distributed over the plurality of locations are controlled 7440. Data integrity is ensured by the distributed security platform despite concurrent user accesses and faults 7450.

Referring back to FIG. 2, a suitable computing environment 200 is shown for implementing a system as described above in FIGS. 2-74 according to embodiments of the present invention. In FIG. 2, a distributed security system 215 includes a processor 220 and memory 230. Embodiments may also be implemented in combination with other types of computer systems and program modules. Generally, program modules include routines, programs, components, data structures, and other types of structures that perform particular tasks or implement particular abstract data types. By way of example, computer readable media 290 can include computer storage media or other tangible media. Computer storage media 290 includes volatile and nonvolatile, removable and non-removable media implemented in any method or technology for storage of information 292, such as computer readable instructions, data structures, program modules or other data. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 290 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 290 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 220 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 230 thus may store the computer-executable instructions that, when executed by processor 220, cause the processor 220 to implement a system as illustrated above in FIGS. 2-74 according to an embodiment of the invention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for securing business systems accessed by a plurality of users over a plurality of locations, comprising:
providing, by a computer, a user interface of a distributed security platform on a display device for entry of data by a user;
receiving a selection, via the user interface, of a plurality of locations within a network of a business data system;
receiving data entered by the user, via the user interface, for authenticating and authorizing the user to access and control databases distributed over the selected plurality of locations;
providing, by a computer, security across the databases using the distributed security platform by processing the received entered data to determine rights related to the user associated with the entered data;
upon determining the rights related to the user associated with the entered data, authorizing and providing the user access to and control of the databases according to the determined rights by:
controlling communication according to the determined rights, by a computer, using an Internet Protocol, directly between the databases distributed over the selected plurality of locations using distributed data management (DDM) files on the databases; and
synchronizing the DDM files to logically interrelate the databases, thereby maintaining a complete and single version of data in each database via communication using the Internet Protocol, such that each database includes a single version of the data.

2. The method of claim 1, further comprising downloading, using an active directory process, active directory names from each of the plurality of locations to select when new users needing access are setup.

3. The method of claim 2, further comprising assigning users to a new location without waiting for the active directory process to run when users have moved to the new location on the active directory user file.

4. The method of claim 2, further comprising converting active directory names using a global process across the plurality of databases in the plurality of locations.

5. The method of claim 1, wherein providing security across the databases distributed over the selected plurality of locations using a distributed security platform further comprises providing a password reset option to allow security personnel to reset expired or disabled profiles for users.

6. The method of claim 1, wherein providing security across the databases distributed over the selected plurality of locations using a distributed security platform further comprises presenting a security interface for enabling a user to create and manage profiles.

7. The method of claim 1, wherein providing security across the databases distributed over the selected plurality of locations using a distributed security platform further comprises presenting a first interactive user display to a user for creating a multiple location user profile to allow the user to access multiple locations.

8. The method of claim 1, wherein providing security across the databases distributed over the selected plurality of locations using a distributed security platform further comprises presenting a second interactive user display for adding comments to a profile.

9. The method of claim 1, wherein providing security across the databases distributed over the selected plurality of locations using a distributed security platform further comprises presenting a third interactive user display for showing profiles assigned to a particular group.

10. The method of claim 1, wherein providing security across the databases distributed over the selected plurality of locations using a distributed security platform further comprises presenting a fourth interactive user display for performing at least one of setting up user functions, selecting locations, interfacing with a workforce management module, performing maintenance operations, selecting menu options, and selecting filters for listing job control numbers.

11. The method of claim 1, wherein providing security across the databases distributed over the selected plurality of locations using a distributed security platform further comprises presenting a fifth interactive user display for defining authorization rights for single location users and multiple location users at each site.

12. The method of claim 1, wherein providing security across the databases distributed over the selected plurality of locations using a distributed security platform further comprises presenting a sixth interactive user display for manipulating data associated with at least one parameter chosen from the group consisting of locations, profiles, users, group profiles, menus, menu options, functions, and authorization options.

13. The method of claim 1, wherein providing security across the databases distributed over the selected plurality of locations using a distributed security platform further comprises presenting a seventh interactive user display for adding or deleting parameters.

14. The method of claim 13, wherein adding or deleting parameters is for a single parameter or a plurality of parameters.

15. A non-transitory computer-readable storage device having stored thereon computer-executable instructions for implementing a system for securing business systems accessed by a plurality of users over a plurality of locations, the computer-executable instructions, when executed by a computer, cause the computer to:
provide a user interface of a distributed security system on a display device for entry of data by a user;

receive a selection, via the user interface, of a plurality of locations within a network of a business data system;

receive data entered by the user, via the user interface, for authenticating and authorizing the user to access and control databases distributed over the selected plurality of locations;

provide, by a computer, security access across the databases using the distributed security platform by processing the received entered data to determine rights related to the user associated with the entered data;

upon determining the rights related to the user associated with the entered data, authorizing and providing the user access to and control of the databases according to the determined rights by:

controlling communication according to the determined rights, using an Internet Protocol, directly between the databases distributed over the selected plurality of locations using distributed data management (DDM) files on the; and synchronizing the DDM files to logically interrelate the databases, thereby maintaining a complete and single version of data in each database, via communication using the Internet Protocol, such that each database includes a single version of the data.

16. The non-transitory computer-readable storage device of claim 15, the computer is further caused to download, using an active directory process, active directory names from each of the plurality of locations to select when new users needing access are setup.

17. The non-transitory computer-readable storage device of claim 16, the computer is further caused to assign users to a new location without waiting for the active directory process to run when users have moved to the new location on the active directory user file.

18. The non-transitory computer-readable storage device of claim 16, the computer is further caused to convert active directory names using a global process across the plurality of databases in the plurality of locations.

19. The non-transitory computer-readable storage device of claim 15, wherein providing security across the databases distributed over the selected plurality of locations using a distributed security platform further comprises providing a password reset option to allow security personnel to reset expired or disabled profiles for users.

20. The non-transitory computer-readable storage device of claim 15, wherein providing security across the databases distributed over the selected plurality of locations using a distributed security platform further comprises presenting a security interface for enabling a user to create and manage profiles.

21. The non-transitory computer-readable storage device of claim 15, wherein providing security across the databases distributed over the selected plurality of locations using a distributed security platform further comprises presenting a first interactive user display to a user for creating a multiple location user profile to allow the user to access multiple locations.

22. The non-transitory computer-readable storage device of claim 15, wherein providing security across the databases distributed over the selected plurality of locations using a distributed security platform further comprises presenting a second interactive user display for adding comments to a profile.

23. The non-transitory computer-readable storage device of claim 15, wherein providing security across the databases distributed over the selected plurality of locations using a distributed security platform further comprises presenting a third interactive user display for showing profiles assigned to a particular group.

24. The non-transitory computer-readable storage device of claim 15, wherein providing security across the databases distributed over the selected plurality of locations using a distributed security platform further comprises presenting a fourth interactive user display for performing at least one of setting up user functions, selecting locations, interfacing with a workforce management module, performing maintenance operations, selecting menu options, and selecting filters for listing job control numbers.

25. The non-transitory computer-readable storage device of claim 15, wherein providing security across the databases distributed over the selected plurality of locations using a distributed security platform further comprises presenting a fifth interactive user display for defining authorization rights for single location users and multiple location users at each site.

26. The non-transitory computer-readable storage device of claim 15, wherein providing security across the databases distributed over the selected plurality of locations using a distributed security platform further comprises presenting a sixth interactive user display for manipulating data associated with at least one parameter chosen from the group consisting of locations, profiles, users, group profiles, menus, menu options, functions, and authorization options.

27. The non-transitory computer-readable storage device of claim 15, wherein providing security across the databases distributed over the selected plurality of locations using a distributed security platform further comprises presenting a seventh interactive user display for adding or deleting parameters.

28. The non-transitory computer-readable storage device of claim 27, wherein adding or deleting parameters is for a single parameter or a plurality of parameters.

29. A distributed security system, comprising:
a memory storing computer-executable instructions for implementing the distributed security system; and
a processor, coupled to the memory, the processor executing the computer-executable instructions for providing a user interface of a distributed security platform on a display device for entry of data by a user, for receiving a selection, via the user interface, of a plurality of locations within a network of a business data system, for receiving data entered by the user for authenticating and authorizing the user to access and control databases distributed over the selected plurality of locations, for providing security across the databases using the distributed security platform by processing the received entered data to determine rights related to the user associated with the entered data, upon determining the rights related to the user associated with the entered data, authorizing and providing the user access to and control of the databases according to the determined rights by controlling communication according to the determined rights directly between the databases distributed over the selected plurality of locations using an Internet Protocol and distributed data management (DDM) files on the plurality of databases, and synchronizing the DDM files to logically interrelate the databases including the centralized database, thereby maintaining a complete and single version of data in each database, such that each database includes a single version of the data.

30. The system of claim 29, wherein the processor implements an active directory process to download active directory names from each of the plurality of locations to select when new users needing access are setup.

31. The system of claim 30, wherein the processor assigns users to a new location without waiting for the active directory process to run when users have moved to the new location on the active directory user file.

32. The system of claim 31, wherein the processor converts active directory names using a global process across the plurality of databases in the plurality of locations.

33. The system of claim 29, wherein the processor provides a password reset option to allow security personnel to reset expired or disabled profiles for users.

34. The system of claim 29, wherein the processor presents a security interface for enabling a user to create and manage profiles.

35. The system of claim 29, wherein the processor causes a user interface to be displayed allowing a user to create a multiple location user profile to allow the user to access multiple locations.

36. The system of claim 29, wherein the processor causes a user interface to be displayed allowing a user to add comments to a profile.

37. The system of claim 29, wherein the processor causes a user interface to be displayed allowing a user to view profiles assigned to a particular group.

38. The system of claim 29, wherein the processor causes a user interface to be displayed allowing a user to perform at least one of setting up user functions, selecting locations, interfacing with a workforce management module, performing maintenance operations, selecting menu options, and selecting filters for listing job control numbers.

39. The system of claim 29, wherein the processor causes a user interface to be displayed allowing a user to define authorization rights for single location users and multiple location users at each site.

40. The system of claim 29, wherein the processor causes a user interface to be displayed allowing a user to manipulate data associated with at least one parameter chosen from the group consisting of locations, profiles, users, group profiles, menus, menu options, functions, and authorization options.

41. The system of claim 29, wherein the processor causes a user interface to be displayed allowing a user to add or delete parameters.

42. The system of claim 41, wherein the processor causes a user interface to be displayed allowing a user to add or delete a single parameter or a plurality of parameters.

* * * * *